United States Patent
Han et al.

(10) Patent No.: US 10,250,839 B2
(45) Date of Patent: *Apr. 2, 2019

(54) MOBILE TERMINAL AND OPERATING METHOD FOR PROVIDING A SCREEN OF AN OPTIMIZED VIEWING ANGLE

(71) Applicant: LG ELECTRONICS INC., Seoul (KR)

(72) Inventors: Miran Han, Seoul (KR); Seunghyun Yang, Seoul (KR); Kyungin Oh, Seoul (KR); Jongyoon Ahn, Seoul (KR); Shinjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,572

(22) Filed: Dec. 29, 2016

(65) Prior Publication Data

US 2017/0195615 A1    Jul. 6, 2017

(30) Foreign Application Priority Data

Dec. 30, 2015 (KR) .................. 10-2015-0189504

(51) Int. Cl.
*H04N 5/45* (2011.01)
*G09G 5/00* (2006.01)
(Continued)

(52) U.S. Cl.
CPC .......... *H04N 5/45* (2013.01); *G06F 3/04815* (2013.01); *G06F 3/04883* (2013.01); *G06F 3/147* (2013.01); *G09G 5/003* (2013.01); *G09G 5/14* (2013.01); *H04N 21/41407* (2013.01); *H04N 21/4316* (2013.01); *H04N 21/47217* (2013.01); *H04N 21/816* (2013.01); *G06F 3/0488* (2013.01); *G09G 2320/068* (2013.01); *G09G 2340/045* (2013.01); *G09G 2340/14* (2013.01);
(Continued)

(58) Field of Classification Search
CPC ................................. G02B 2027/014
USPC ......... 348/565, 564, 569; 345/156, 427, 419
See application file for complete search history.

(56) References Cited

U.S. PATENT DOCUMENTS 8,411,091 B2 * 4/2013 Horri ..................... G06N 3/006
345/419
2012/0257025 A1    10/2012 Kim et al.
(Continued)

OTHER PUBLICATIONS

International Search Report in International Application No. PCT/KR2016/015541, dated Mar. 10, 2017, 3 pages (with English translation).

*Primary Examiner* — Paulos M Natnael
(74) *Attorney, Agent, or Firm* — Fish & Richardson P.C.

(57) ABSTRACT

A mobile terminal includes: a display unit; a sensing unit configured to detect an input signal; and a control unit configured to display a 360-degree video on the display unit and control the sensing unit to detect the input signal. In correspondence to a first input signal for playing the 360-degree video at a first playing angle, the control unit displays a first image played at the first playing angle on the display unit. When a second input signal for changing a playing angle of the 360-degree video to a second playing angle different from the first playing angle is detected, the control unit displays a second image played at the second playing angle as a main screen on the display unit and displays the first image played at the first playing angle as a PIP screen on the display unit.

18 Claims, 42 Drawing Sheets

(51) Int. Cl.

| | | |
|---|---|---|
| *H04N 21/414* | (2011.01) | |
| *H04N 21/431* | (2011.01) | |
| *H04N 21/81* | (2011.01) | |
| *G06F 3/147* | (2006.01) | |
| *G09G 5/14* | (2006.01) | |
| *H04N 21/472* | (2011.01) | |
| *G06F 3/0481* | (2013.01) | |
| *G06F 3/0488* | (2013.01) | |

(52) U.S. Cl.
CPC ... *G09G 2340/145* (2013.01); *G09G 2370/10* (2013.01); *G09G 2370/16* (2013.01); *G09G 2380/02* (2013.01)

(56) References Cited

U.S. PATENT DOCUMENTS

| | | |
|---|---|---|
| 2014/0267546 A1 | 9/2014 | Kwon et al. |
| 2014/0375760 A1 | 12/2014 | Lee et al. |
| 2015/0105123 A1 | 4/2015 | Song et al. |
| 2015/0312478 A1 | 10/2015 | Barcovschi et al. |
| 2016/0134808 A1* | 5/2016 | Fang ............... H04N 5/23238 348/36 |
| 2016/0291688 A1* | 10/2016 | Hirota ................... G06F 3/14 |
| 2016/0300392 A1* | 10/2016 | Jonczyk ............. G06T 19/003 |
| 2016/0378178 A1* | 12/2016 | Wei ..................... G06F 3/012 345/156 |
| 2017/0053675 A1* | 2/2017 | Dickerson ........... G11B 27/102 |
| 2017/0118475 A1* | 4/2017 | Chang ............... H04N 19/159 |

* cited by examiner

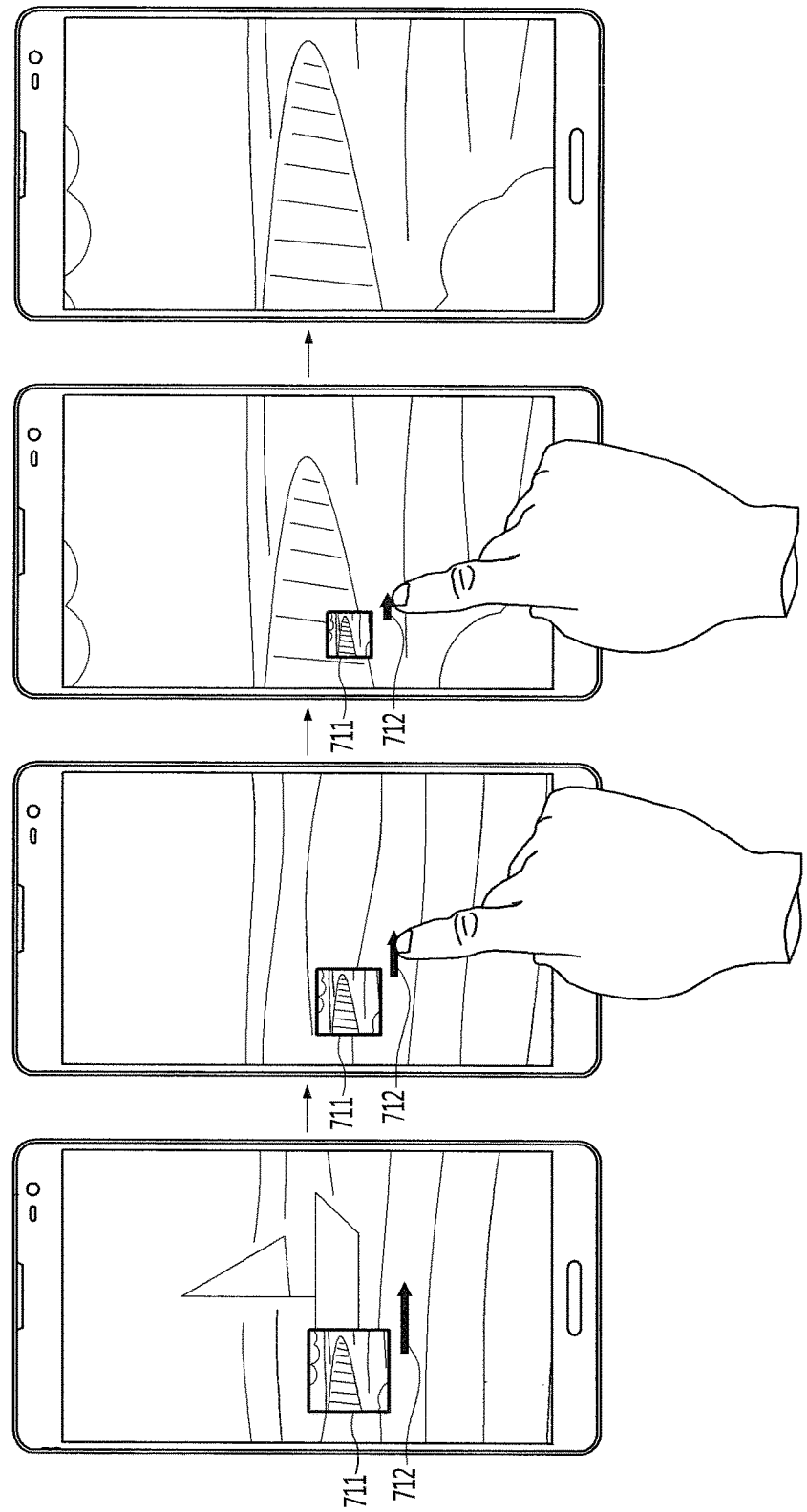

FIG. 14B
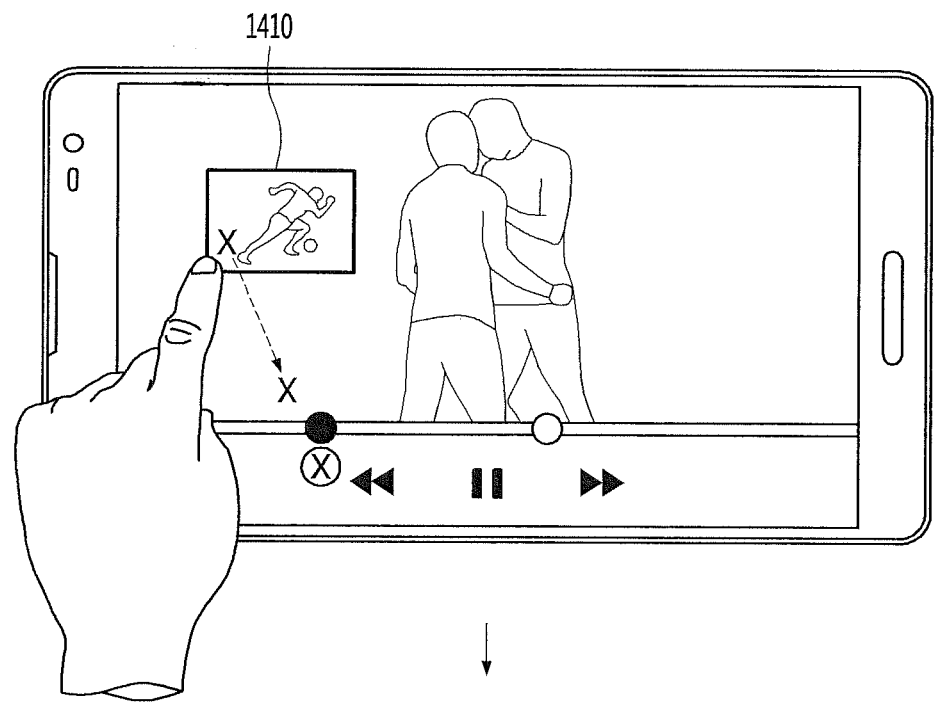
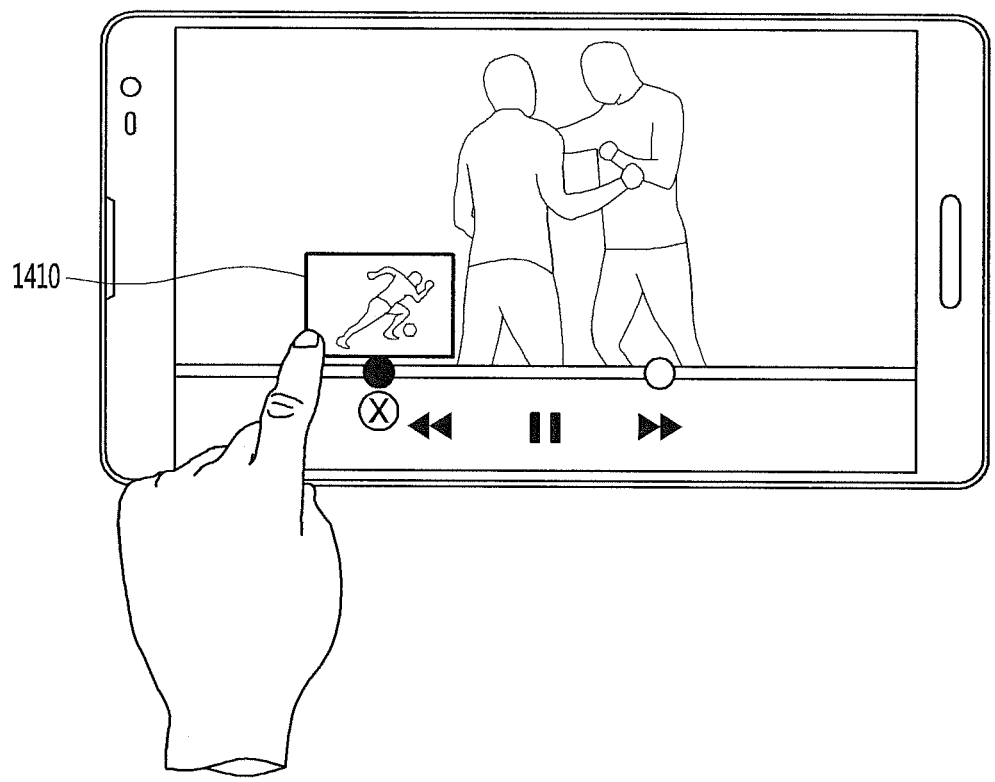

FIG. 14D
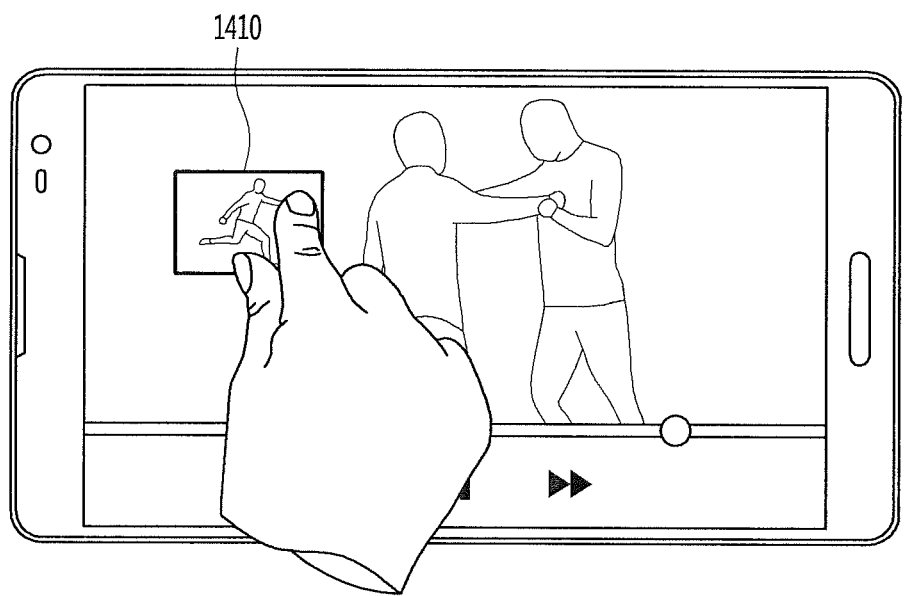
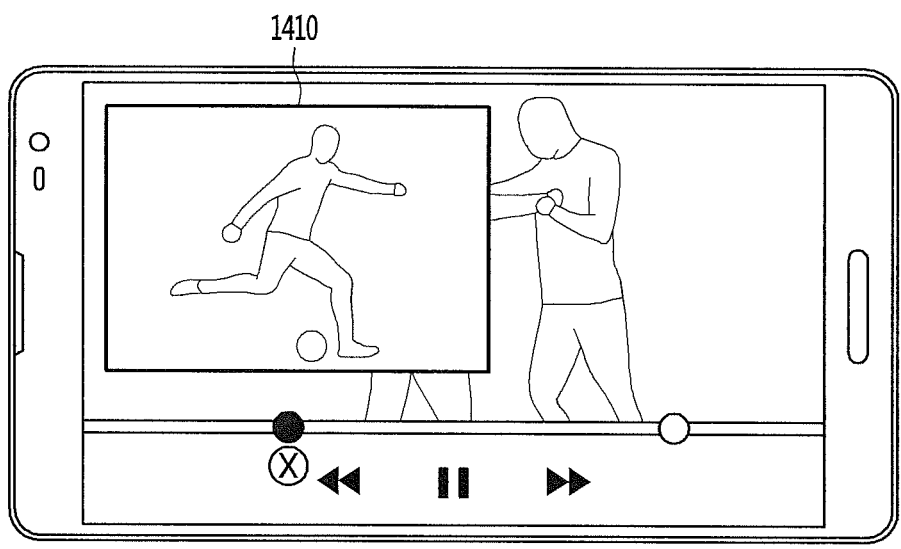

FIG. 15A
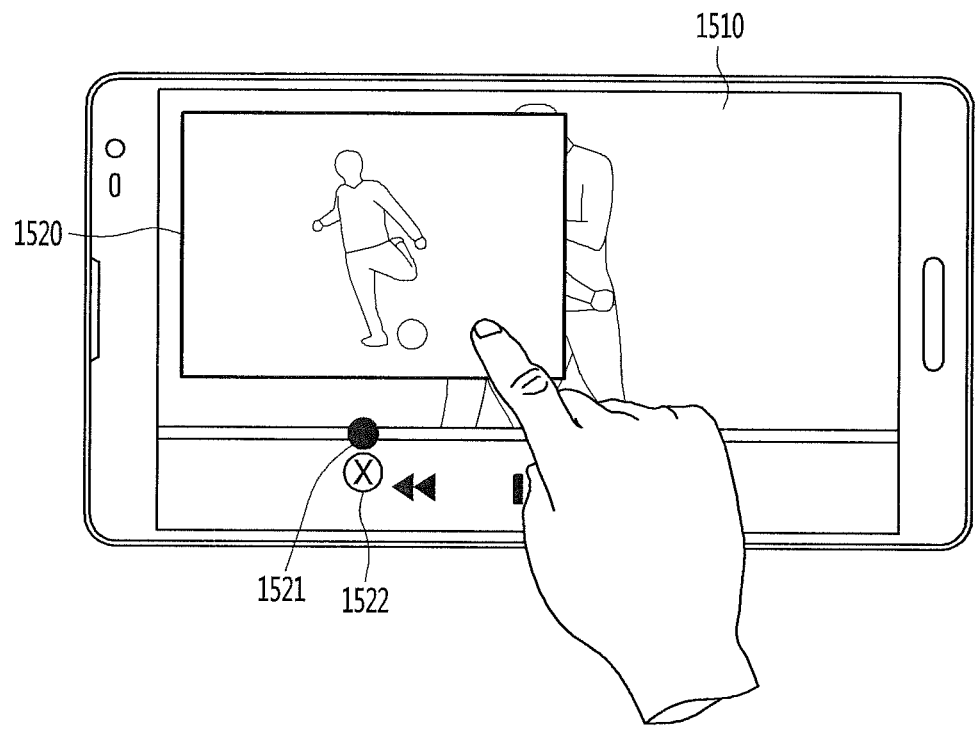
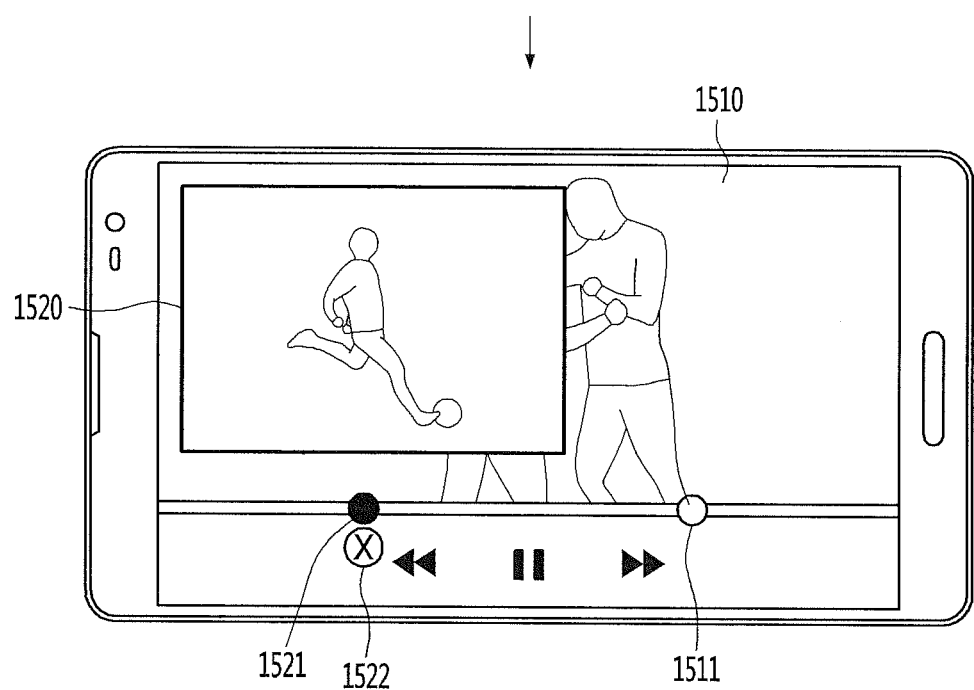

FIG. 15B
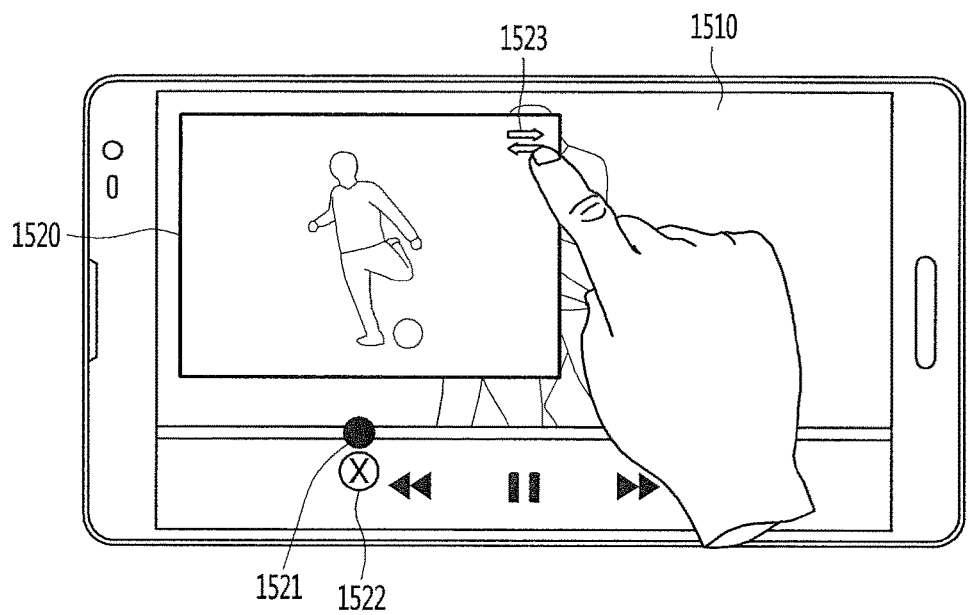
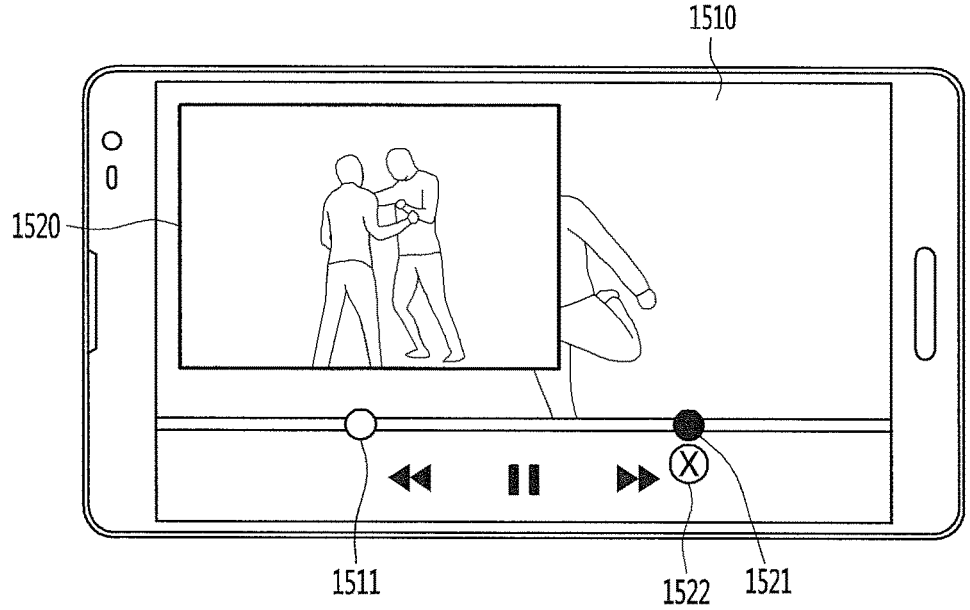

FIG. 17A
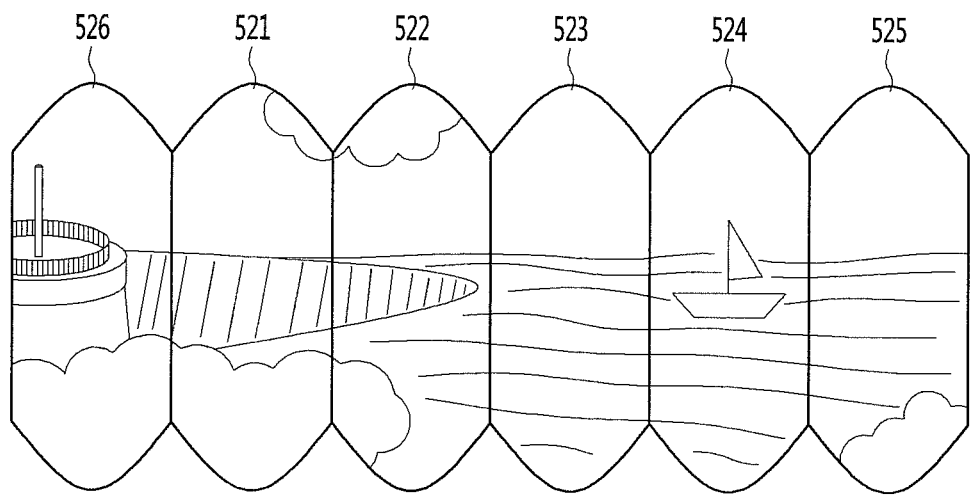
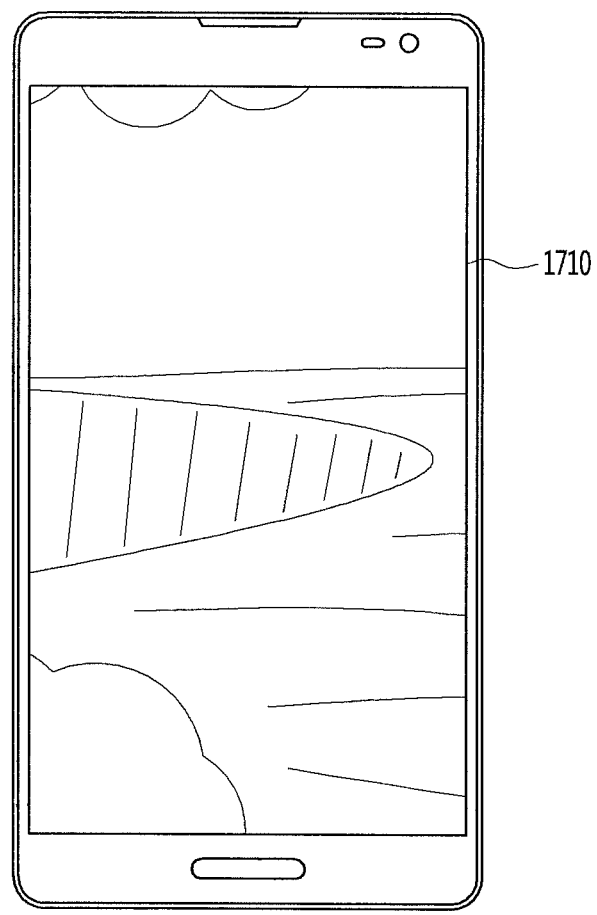

FIG. 20A
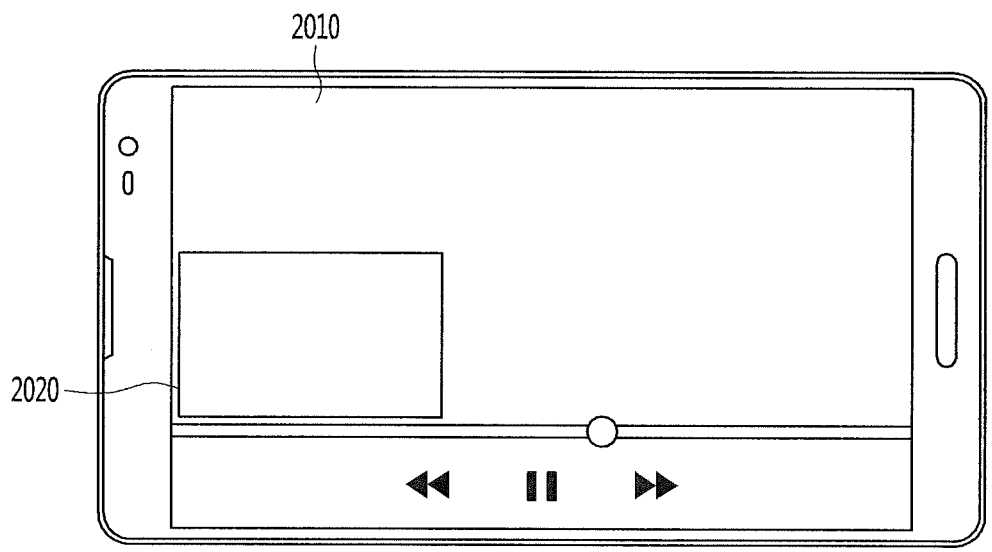
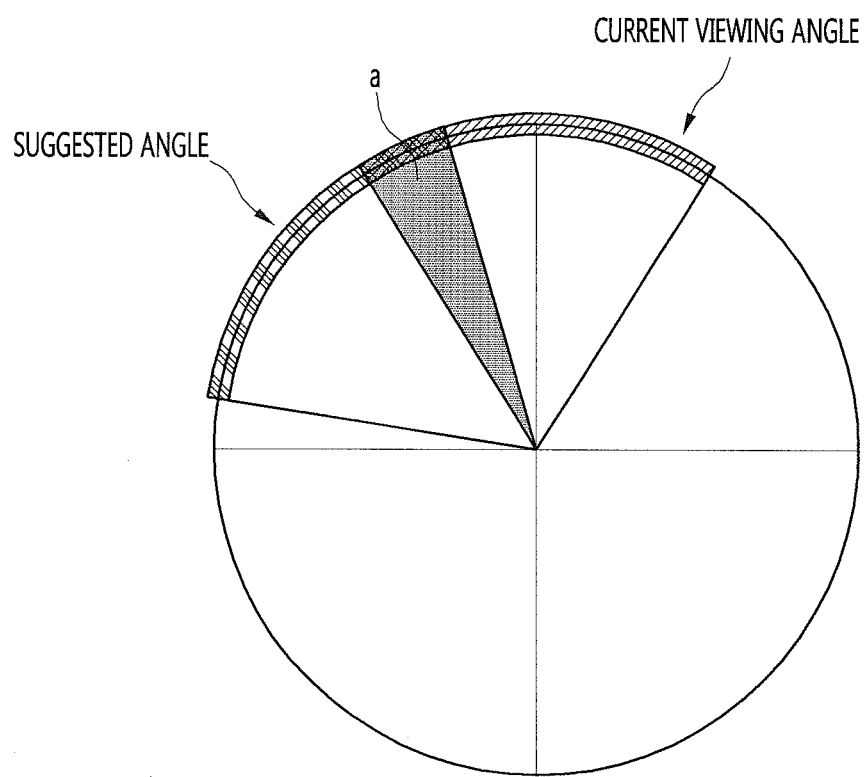

FIG. 20B
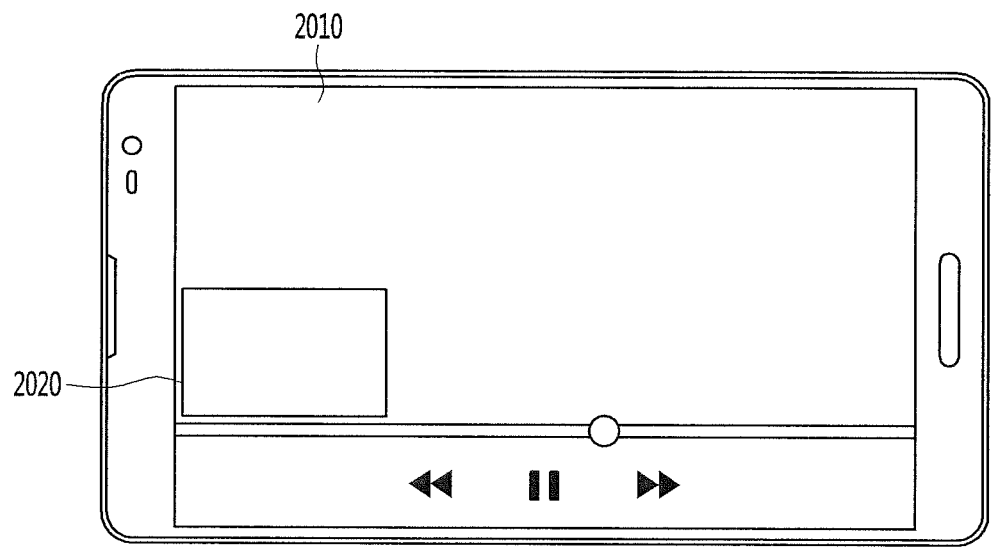
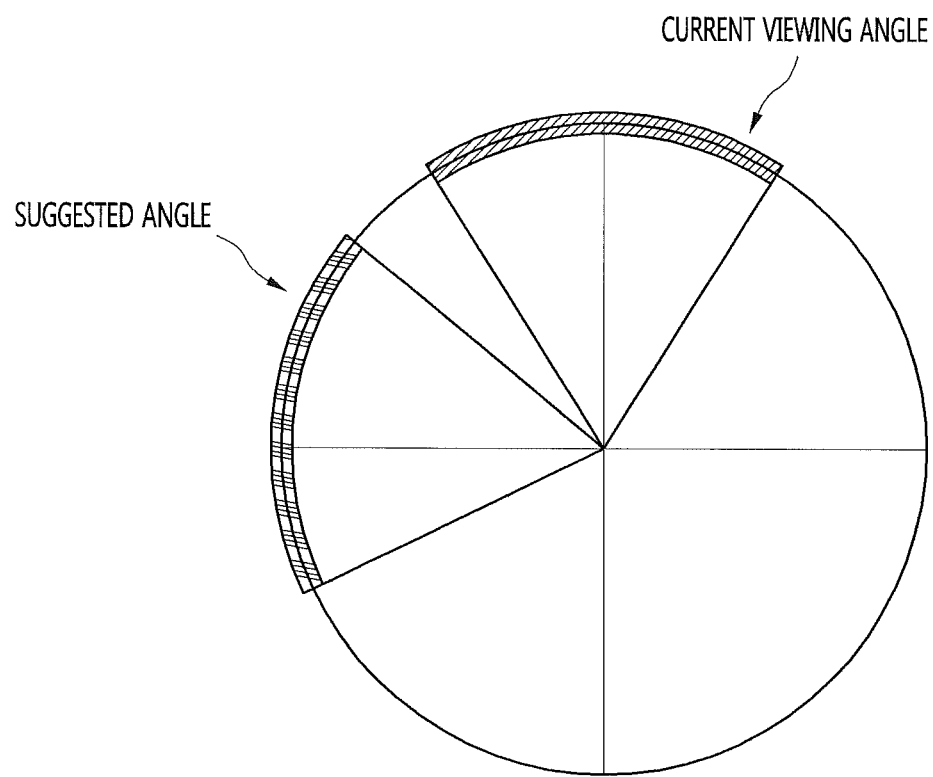

FIG. 20C
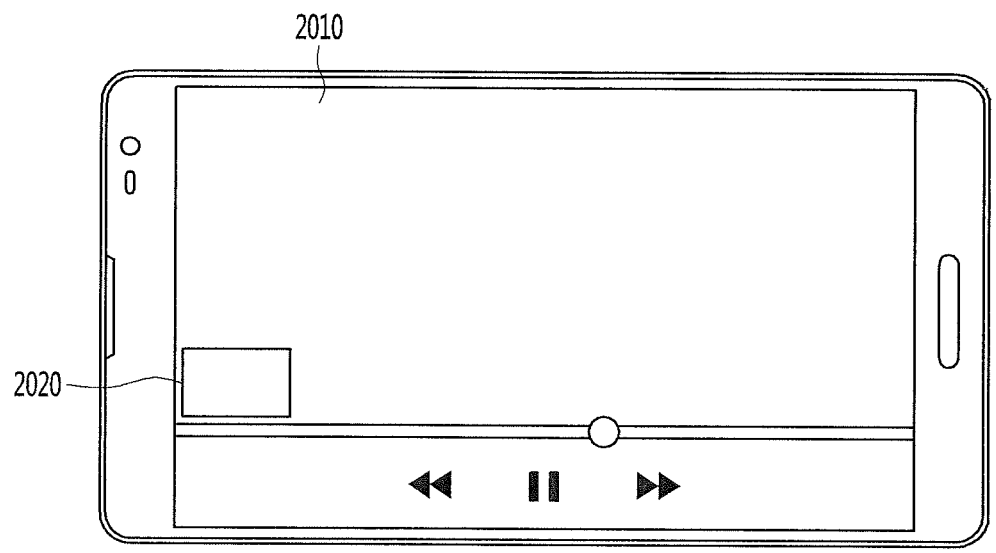
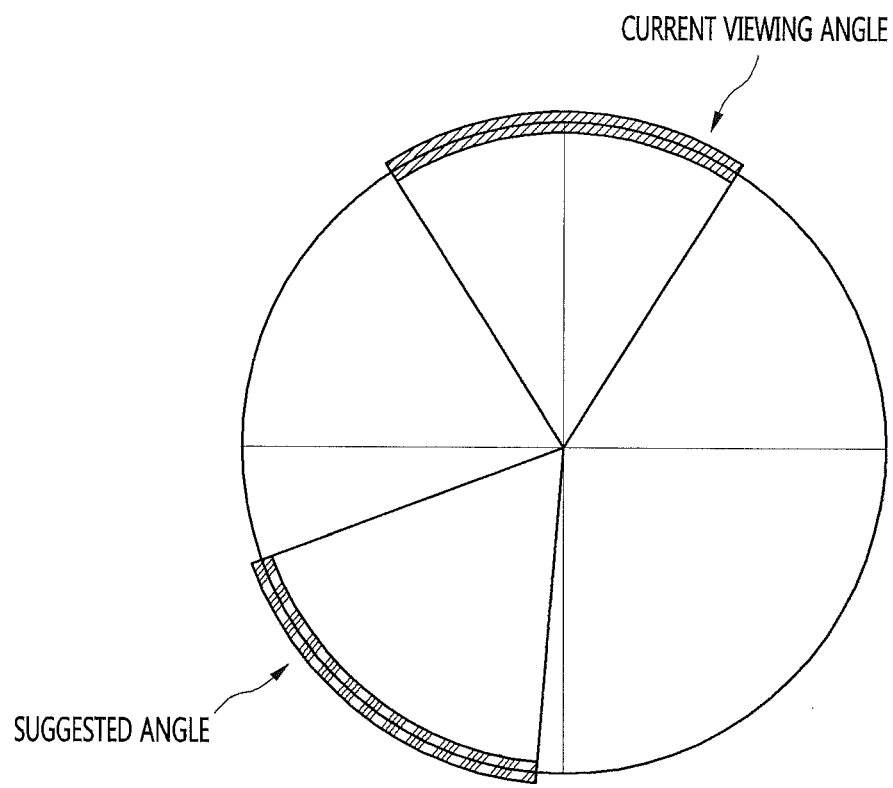

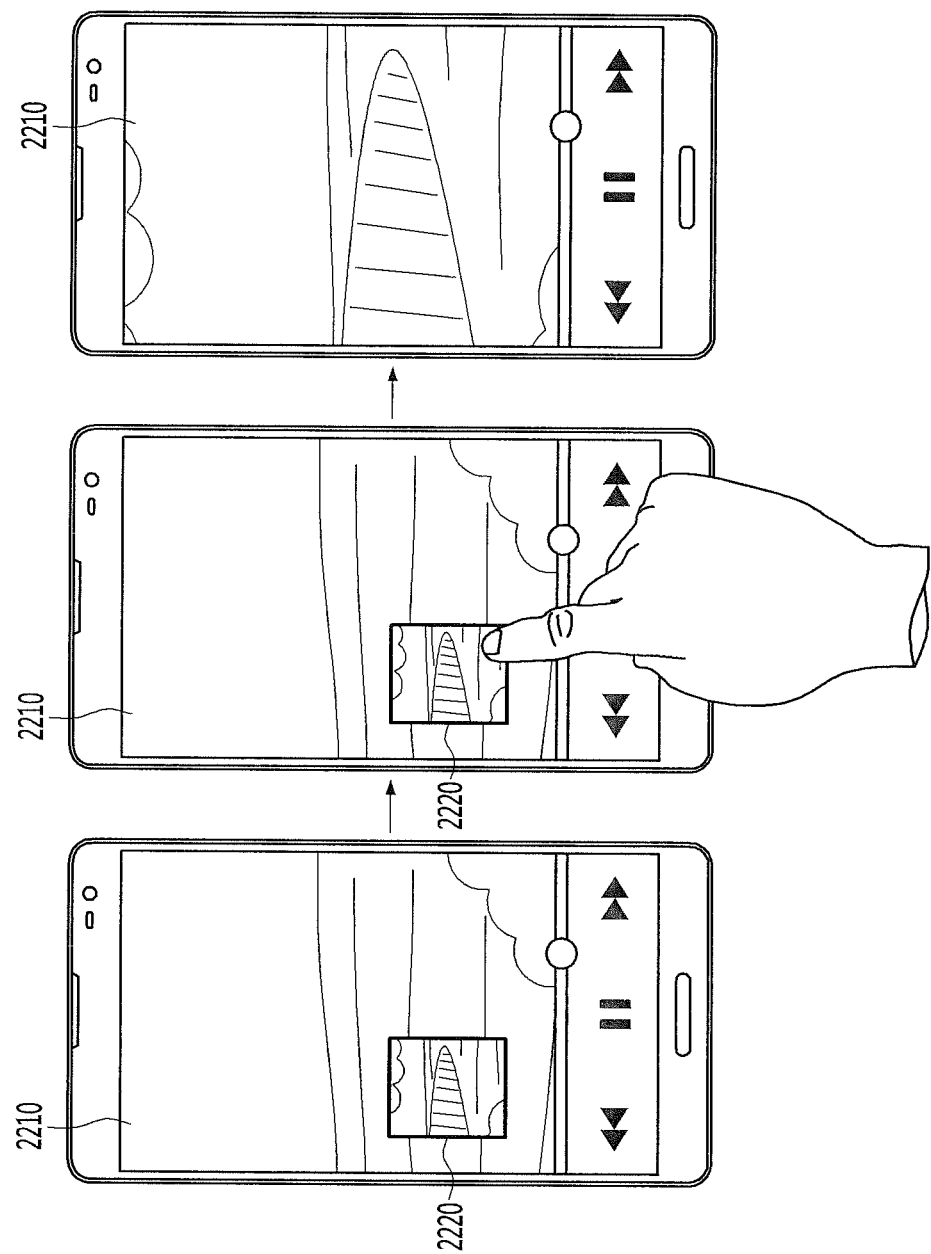

FIG. 24B
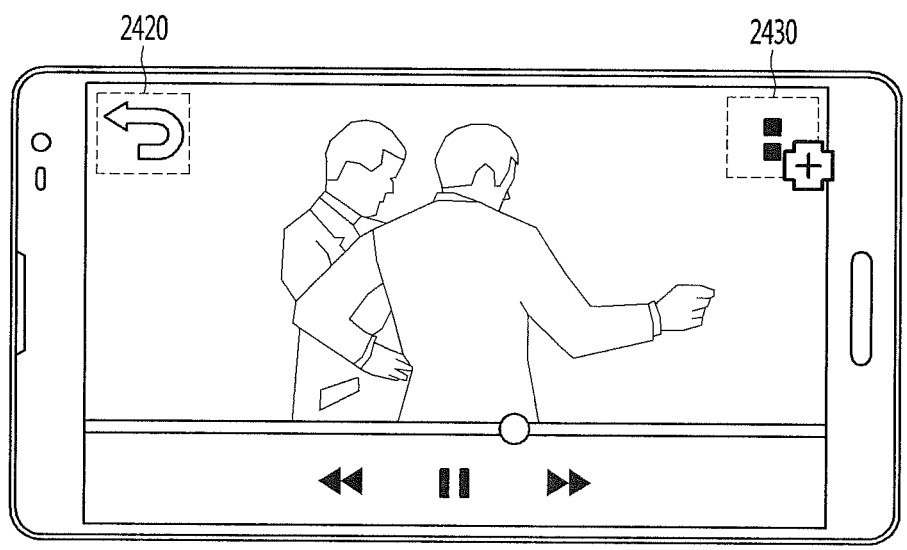
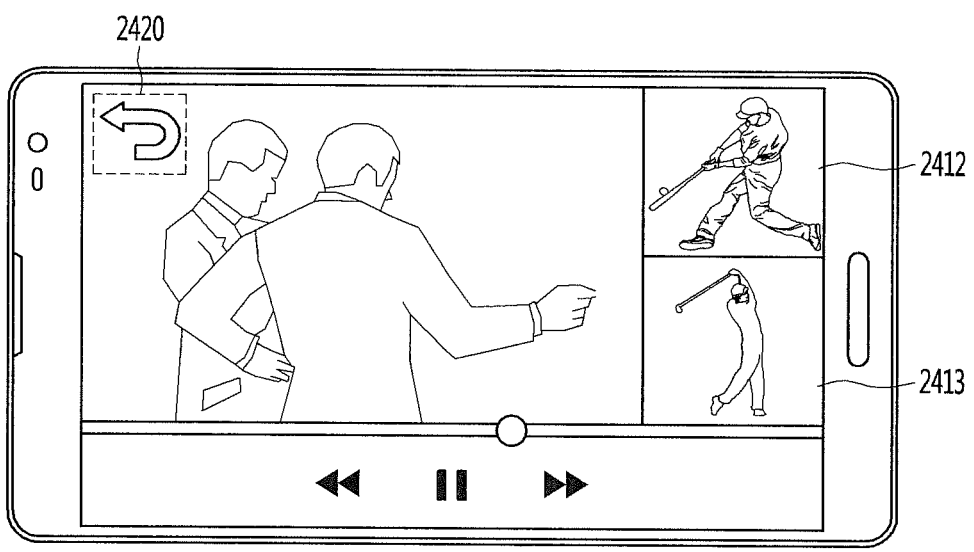

MOBILE TERMINAL AND OPERATING METHOD FOR PROVIDING A SCREEN OF AN OPTIMIZED VIEWING ANGLE

CROSS-REFERENCE TO RELATED APPLICATIONS

The present application claims priority under 35 U.S.C. 119 and 35 U.S.C. 365 to Korean Patent Application No. 10-2015-0189504 (filed on Dec. 30, 2015), which is hereby incorporated by reference in its entirety.

BACKGROUND

The present disclosure relates to a mobile terminal and an operating method thereof, and particularly, to a mobile terminal for effectively providing a screen of an optimized viewing angle to a user when a 360-degree video is played at an angle out of the optimal viewing angle and an operating method thereof.

Depending on whether terminals are movable, the terminals are divided into mobile/portable terminals and stationary terminals. Again, the mobile terminals may be divided into handheld terminals and vehicle mounted terminals depending on whether users can carry the mobile terminals personally.

Functions of the mobile terminals become diversified. For example, the functions include data and voice communication, image capturing and video recording through a camera, voice recording, music file playback through a speaker system, and an image or video output to a display unit. Some terminals may have an additional electronic game play function or a multimedia player function. Especially, recent mobile terminals may receive multicast signals for providing visual contents such as broadcasts and video or television programs.

As functions of a terminal are diversified, such a terminal may be implemented in a form of a multimedia player with multi-functions, for example, image or video capturing, playback of music or video files, game plays, and broadcast reception.

Mobile terminals may play 360-degree video files. The 360-degree video means a Virtual Reality (VR) video having the view angle of 360 degrees. Unlike an existing video that shows only a view point selected by a photographer, the 360-degree video may reproduce an image in a direction or at a point, selected by a user. Additionally, since the 360-degree video has the angle of view of 360 degrees, it shows all directions to a user while rotating 360 degrees. A user may select and view a desired direction or point by using a keyboard or a mouse during the reproduction of a 360-degree video.

Such a 360-degree video includes an optimal viewing angle that is a playing angle of an image, which is intended by an original producer who makes a video. However, due to characteristics of a 360-degree video having a playback direction or point selected by a user, a 360-degree video may be played at an angle out of an optimized viewing angle. Therefore, when a 360-degree video is played at an angle out of an optimized viewing angle, a method of effectively providing a screen of an optimized viewing angle to a user is required.

SUMMARY

Embodiments provide a mobile terminal for effectively providing a screen of an optimized viewing angle to a user when a 360-degree video is played at an angle out of the optimized viewing angle and an operating method thereof.

In one embodiment, a mobile terminal includes: a display unit; a sensing unit configured to detect an input signal; and a control unit configured to display a 360-degree video on the display unit and control the sensing unit to detect the input signal, wherein in correspondence to a first input signal for playing the 360-degree video at a first playing angle, the control unit displays a first image played at the first playing angle on the display unit, and when a second input signal for changing a playing angle of the 360-degree video to a second playing angle different from the first playing angle is detected, the control unit displays a second image played at the second playing angle as a main screen on the display unit and displays the first image played at the first playing angle as a PIP screen on the display unit.

In further another embodiment, an operating method of a mobile terminal includes: in correspondence to a first input signal for playing a 360-degree video at a first playing angle, displaying a first image played at the first playing angle; detecting a second input signal for changing a playing angle of the 360-degree video to a second playing angle different from the first paying angle; and displaying a second image played at the second playing angle as a main screen and displaying the first image played at the first playing angle as a PIP screen.

The details of one or more embodiments are set forth in the accompanying drawings and the description below. Other features will be apparent from the description and drawings, and from the claims.

BRIEF DESCRIPTION OF THE DRAWINGS

FIGS. 7A and 7B are views of recommending an optimized viewing angle for a 360-degree video by a mobile terminal according to an embodiment of the present invention.

FIGS. 14A to 14D are views of playing an image at a recommended playing angle during the playback of a 360-degree video by a mobile terminal according to an embodiment of the present invention.

FIGS. 15A to 15C are views of playing an image at a recommended playing angle during the playback of a 360-degree video by a mobile terminal according to an embodiment of the present invention.

FIGS. 17A to 17E are views of recommending an image during a playing angle change of a 360-degree video by a mobile terminal according to an embodiment of the present invention.

FIGS. 20A to 20C are views of changing the size of a thumbnail or a PIP screen according to a viewing angle during a playing angle change of a 360-degree video by a mobile terminal according to an embodiment of the present invention.

FIG. 22 is a view of switching to a playing angle of a recommended image during the playback of a 360-degree video by a mobile terminal according to an embodiment of the present invention.

FIGS. 24A and 24B are views of providing a replay function relating to a recommended image after the playback of a 360-degree video ends by a mobile terminal according to an embodiment of the present invention.

DETAILED DESCRIPTION OF THE EMBODIMENTS

Figure 1:
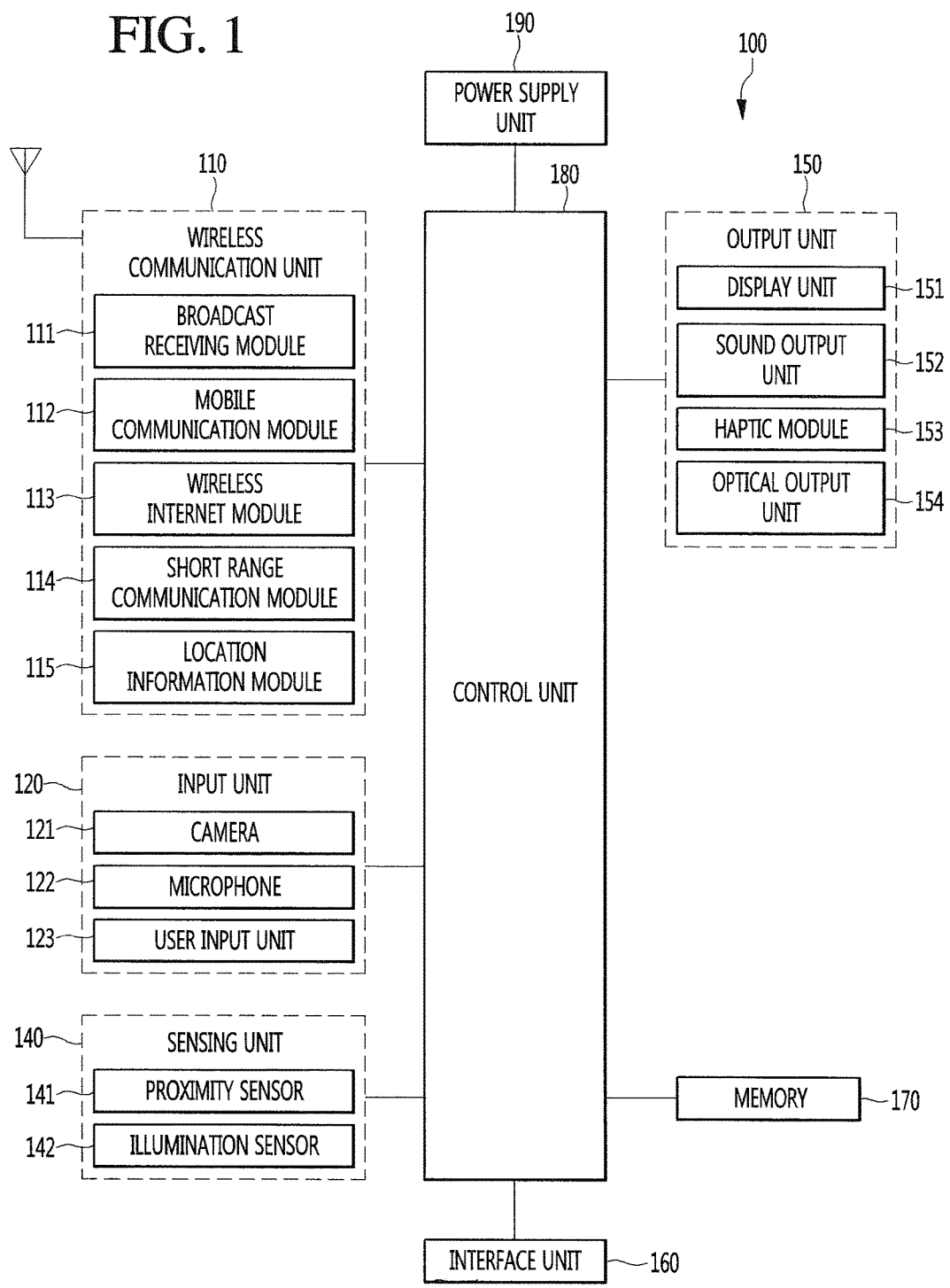
FIG. 1 is a block diagram illustrating a mobile terminal according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smart watches, smart glasses, and head mounted displays (HMDs)).

However, it is apparent to those skilled in the art that configurations according to embodiments of the present invention disclosed in this specification are applicable to stationary terminals such as digital TVs, desktop computers, and digital signage, except for the case applicable to only mobile terminals.

FIG. 1 is a block diagram illustrating a mobile terminal according to an embodiment of the present invention.

The mobile terminal 100 may include a wireless communication unit 110, an input unit 120, a sensing unit 140, an output unit 150, an interface unit 160, a memory 170, a control unit 180, and a power supply unit 190. In implementing a mobile terminal, components shown in FIG. 1 are not necessary, so that a mobile terminal described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for image signal input, a microphone 122 or an audio input unit for receiving audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information inputted/outputted through the above components or executing application programs stored in the memory 170.

Additionally, in order to execute an application program stored in the memory 170, the control unit 180 may control at least part of the components shown in FIG. 1. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present invention described below. Additionally, the operations, controls, or control methods of a mobile terminal 100 may be implemented on the mobile terminal 100 by executing at least one application program stored in the memory 170.

Hereinafter, prior to examining various embodiments implemented through the mobile terminal 100, the above-listed components are described in more detail with reference to FIG. 1.

First, in describing the wireless communication unit 110, the broadcast receiving module 111 of the wireless communication unit 110 may receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching may be provided to the mobile terminal 100.

The broadcast management server may refer to a server for generating and transmitting broadcast signals and/or broadcast related information or a server for receiving pre-generated broadcast signals and/or broadcast related information and transmitting them to a terminal. The broadcast signals may include TV broadcast signals, radio broadcast signals, and data broadcast signals and also may include broadcast signals in a combination format thereof.

The broadcast signal may be encoded according to at least one of technical standards (or broadcast methods, for example, ISO, IEC, DVB, and ATSC) for transmitting/receiving digital broadcast signals and the broadcast reception module 111 may receive the digital broadcast signals by using a method appropriate to the technical specifications set by the technical standards.

The broadcast related information may refer to information relating to broadcast channels, broadcast programs, or broadcast service providers. The broadcast related information may be provided through a mobile communication network. In such a case, the broadcast related information may be received by the mobile communication module 112.

The broadcast related information may exist in various formats such as Electronic Program Guide (EPG) of Digital Multimedia Broadcasting (DMB) or Electronic Service Guide (ESG) of Digital Video Broadcast-Handheld (DVB-H). Broadcast signals and/or broadcast related information received through the broadcast reception module 111 may be stored in the memory 170.

The mobile communication module 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission/reception.

The wireless internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSDPA), Long Term Evolution (LTE), and Long Term Evolution-Advanced (LTE-A) and the wireless internet module 113 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between the mobile terminal 100 and networks including another mobile terminal 100 (or an external server) through wireless area networks. The wireless area networks may be wireless personal area networks.

Here, the other mobile terminal 100 may be a wearable device (for example, a smart watch, a smart glass, and an HMD) that is capable of exchanging data (or interworking) with the mobile terminal 100. The short-range communication module 114 may detect (or recognize) a wearable device around the mobile terminal 100, which is capable of communicating with the mobile terminal 100 Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user of the wearable device may use the data processed in the mobile terminal 100 through the wearable device. For example, according thereto, when a call is received by the mobile terminal 100, a user may perform a phone call through the wearable device or when a message is received by the mobile terminal 100, a user may check the received message through the wearable device.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position on the basis of information of a wireless access point (AP) transmitting/receiving a wireless signal to/from the Wi-Fi module, through the Wi-Fi module. If necessary, the position information module 115 may perform a function of another module in the wireless communication unit 110 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 120 is used for inputting image information (or signal), audio information (or signal), data, or information inputted from a user and the mobile terminal 100 may include at least one camera 121 in order for inputting image information. The camera 121 processes image frames such as a still image or a video obtained by an image sensor in a video call mode or a capturing mode. The processed image frame may be displayed on the display unit 151 or stored in the memory 170. Moreover, a plurality of cameras 121 equipped in the mobile terminal 100 may be arranged in a matrix structure and through the camera 121 having such a matrix structure, a plurality of image information having various angles or focuses may be inputted to the mobile terminal 100. Additionally, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the control unit 180 may control an operation of the mobile terminal 100 to correspond to the inputted information. The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and may be displayed on a touch screen and for example, may include graphic, text, icon, video, or a combination thereof.

Moreover, the sensing unit 140 may sense at least one of information in a mobile terminal, environmental information around a mobile terminal, and user information and may then generate a sensing signal corresponding thereto. On the basis of such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor detects a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressured when touched, and a capacitance when touched. Here, the touch target, as an object applying a touch on the touch sensor, may be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-mentioned touch sensor and proximity sensor are provided separately or combined and may thus sense various types of touches, for example, short (or tap) touch, long touch, multi touch, drag touch, flick touch, pinch-in touch, pinch-out touch, swipe touch, and hovering touch for the touch screen.

The ultrasonic sensor may recognize position information of a detection target by using ultrasonic waves. Moreover, the control unit 180 may calculate the position of a wave source through information detected by an optical sensor and a plurality of ultrasonic sensors. The position of the wave source may be calculated by using the property that light is much faster than ultrasonic wave, that is, a time that light reaches an optical sensor is much shorter than a time that ultrasonic wave reaches an ultrasonic sensor. In more detail, the position of the wave source may be calculated by using a time difference with a time that ultrasonic wave reaches by using light as a reference signal.

Moreover, the camera 121 described as a configuration of the input unit 120 may include at least one of a camera sensor (for example, CCD and CMOS), a photo sensor (or an image sensor), and a laser sensor.

The camera 121 and the laser sensor may be combined to detect a touch of a detection target for a three-dimensional image. The photo sensor may be stacked on a display element and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Additionally, the display unit 151 may be configured as a three-dimensional display unit displaying a three-dimensional image.

A three-dimensional display method, for example, a stereoscopic method (a glasses method), an autostereoscopic (no glasses method), a projection method (a holographic method) may be applied to the three-dimensional display unit In general, a 3D image includes a left image (for example, an image for the left eye) and a right image (for example, an image for the right eye). Depending on a method of combining a left image and a right image into a 3D image, the method includes a top-down method of disposing a left image and a right vertically in one frame, a left-to-right (or side by side) method of disposing a lift image and a right image horizontally in one frame, a checker board method of disposing pieces of a left image and a right image in a tile form, an interlaced method of disposing a left image and a right image in a column unit or a row unit alternately, and a time sequential (or frame by frame) method of displaying a left image and a right image alternately at each time.

Additionally, a 3D thumbnail image may generate a left image thumbnail and a right image thumbnail respectively from the left image and the right image of an original image frame, and as they are combined, one image may be generated. In general a thumbnail means a reduced image or a reduced still image. The left image thumbnail and the right image thumbnail, generated in such a way, are displayed with a left and right distance difference on a screen by a depth corresponding to a time difference of a left image and a right image, and thereby express three-dimensional depth.

A left image and a right image, necessary for the implantation of a 3D image may be displayed on a 3D display unit through a 3D processing unit. The 3D processing unit receives a 3D image (that is, an image at a reference time point and an image at an extended time point) and sets a left image and a right image by using it, or receives a 2D image and switches it into a left image and a right image.

The sound output unit 152 may output audio data received from the wireless communication unit 110 or stored in the memory 170 in a call signal reception or call mode, a recording mode, a voice recognition mode, or a broadcast reception mode. The sound output unit 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a element absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal outputted from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal 100 is accurately mounted on the cradle.

The memory 170 may store a program for an operation of the control unit 180 and may temporarily store input/output data (for example, a phone book, a message, a still image, and a video). The memory 170 may store data on various patterns of vibrations and sounds outputted during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an input of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various embodiments described below on the mobile terminal 100.

The power supply unit 190 may receive external power or internal power under a control of the control unit 180 and may then supply power necessary for an operation of each component. The power supply unit 190 includes a battery. The battery is a rechargeable built-in battery and may be detachably coupled to a terminal body in order for charging.

Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Moreover, various embodiments below may be implemented in a computer or device similar thereto readable medium by using software, hardware, or a combination thereof.

Then, a communication system using the mobile terminal 100 is described according to an embodiment of the present invention.

First, the communication system may use different wireless interfaces and/or physical layers. For example, a wireless interface available to the communication system may include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system may include at least one terminal 100, at least one base station (BS) (it may be referred to as Node B or Evolved Node B), at least one base station controllers (BSCs), and a mobile switching center (MSC). MSC may be configured to be connected to Public Switched Telephone Network (PSTN) and BSCs. BSCs may be connected being paired with a BS through a backhaul line. The backhaul line may be provided according to at least one of E1/T1, ATM, IP, PPP, Frame Relay, HDSL, ADSL, and xDSL. Accordingly, a plurality of BSCs may be included in a CDMA wireless communication system.

Each of a plurality of BSs may include at least one sector and each sector may include an omni-directional antenna or an antenna indicating a specific radial direction from a BS. Additionally, each sector may include at least two antennas in various forms. Each BS may be configured to support a plurality of frequency allocations and each of the plurality of frequency allocations may have a specific spectrum (for example, 1.25 MHz, 5 MHz, and so on).

The intersection of a sector and a frequency allocation may be referred to as a CDMA channel. A BS may be referred to as a Base Station Transceiver Subsystem (BTS). In such a case, one BSC and at least one BS together may be referred to as "BS". A BS may also represent "cell site". Additionally, each of a plurality of sectors for a specific BS may be referred to as a plurality of cell sites.

A Broadcasting Transmitter (BT) transmits broadcast signals to the terminals 100 operating in a system. The broadcast reception module 111 shown in FIG. 1 is provided in the terminal 100 for receiving broadcast signals transmitted from the BT.

Additionally, GPS may be linked to a CDMA wireless communication system in order to check the location of the mobile terminal 100. Then, a satellite helps obtaining the location of the mobile terminal 100. Useful location information may be obtained by at least one satellite. Herein, the location of the mobile terminal 100 may be traced by using all techniques for tracing the location in addition to GPS tracking technique. Additionally, at least one GPS satellite may be responsible for satellite DMB transmission selectively or additionally.

The location information module 115 in a mobile terminal is for detecting and calculating the position of the mobile terminal and its representative example may include a GPS module and a WiFi module. If necessary, the position information module 115 may perform a function of another module in the wireless communication unit 110 in order to obtain data on the location of the mobile terminal substitutionally or additionally.

The GPS module 115 may calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 may calculate speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) may be utilized.

WPS is a technique for tracking the location of the mobile terminal 100 by using a WiFi module in the mobile terminal 100 and a wireless Access Point (AP) for transmitting or receiving wireless signals to or from the WiFi module and may mean a Wireless Local Area Network (WLAN) based location measurement technique using WiFi.

A WiFi location tracking system may include a WiFi location measurement server, a mobile terminal 100, a wireless AP connected to the mobile terminal 100, and a database for storing arbitrary wireless AP information.

The mobile terminal 100 in access to a wireless AP may transmit a location information request message to a WiFi location measurement server.

The WiFi location measurement server extracts information of a wireless AP connected to the mobile terminal 100 on the basis of a location information request message (or signal) of the mobile terminal 100. Information of a wireless AP connected to the mobile terminal 100 may be transmitted to the WiFi location measurement server through the mobile terminal 100 or may be transmitted from a wireless AP to a WiFi location measurement server.

Based on the location information request message of the mobile terminal 100, the extracted information of a wireless AP may be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server may extract wireless AP information corresponding to a wireless AP that the mobile terminal 100 access from a pre-established database by receiving information of the wireless AP connected to the mobile terminal 100. At this point, information of arbitrary wireless APs stored in the database may information such as MAC Address, SSID, channel information, Privacy, Network Type, latitude and longitude coordinates of a wireless AP, a building name where a wireless AP is located, the number of floors, indoor detailed location information (GPS coordinates available), the address of the owner of an AP, and phone numbers. At this point, in order to remove a mobile AP or a wireless AP provided using illegal MAC address during a measurement process, a WiFi location measurement server may extract only a predetermined number of wireless AP information in high RSSI order.

Then, the WiFi location measurement server may extract (or analyze) the location information of the mobile terminal 100 by using at least one wireless AP information extracted from the database. By comparing the included information and the received wireless AP information, location information of the mobile terminal 100 is extracted (or analyzed).

As a method of extracting (or analyzing) the location information of the motile terminal 100, a Cell-ID method, a finger-print method, a triangulation method, and a landmark method may be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but when the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) may be used.

The landmark method is a method for measuring the location of a mobile terminal by using a landmark transmitter knowing the location.

In addition to the listed methods, a variety of algorithms may be utilized as methods for extracting (or analyzing) the location information of a mobile terminal.

As the extracted location information of the mobile terminal 100 is transmitted to the mobile terminal 100 through the WiFi location measurement server, the mobile terminal 100 may obtain the location information.

As connected to at least one wireless AP, the mobile terminal 100 may obtain location information. At this point, the number of wireless APs, which are required for obtaining the location information of the mobile terminal 100, may vary according to a wireless communication environment where the mobile terminal 100 is located.

Figure 2:
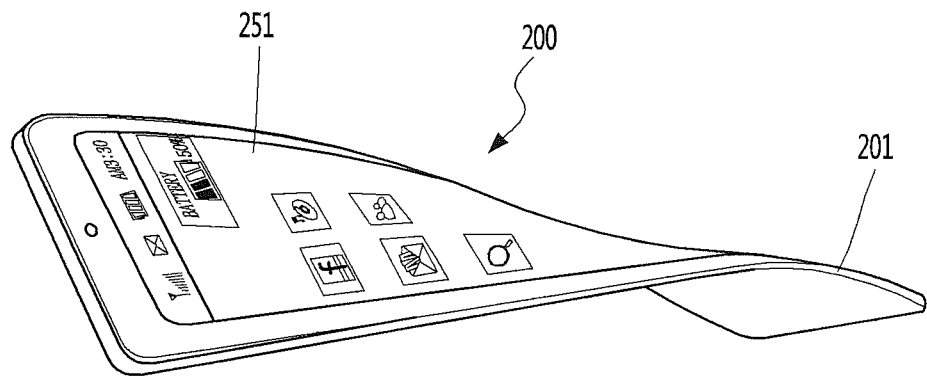
FIG. 2 is a conceptual diagram illustrating a transformable mobile terminal 200 according to an embodiment of the present invention.

FIG. 2 is a conceptual diagram illustrating a transformable mobile terminal 200 according to an embodiment of the present invention.

As shown in the drawing, a display unit 251 may be transformed by external force. The transformation may be at least one of warping, bending, folding, twisting, and curling of the display unit 251. Additionally, the transformable display unit 251 may be referred to as a flexible display. Herein, the flexible display unit 251 may include a general flexible display, an e-paper, and a combination thereof. In general, the mobile terminal 200 may have the same or similar features to the mobile terminal of FIG. 1.

The general flexible display is a light and durable display maintaining the feature of an existing flat panel display and manufactured on a thin flexible substrate where warping, bending, folding, twisting, and curling are possible, such as paper.

Additionally, the e-paper uses a display technique applying the feature of a general ink and is different from an existing flat panel display in that it uses reflected light. The e-paper may change information by using electrophoresis with a twist ball or a capsule.

When the flexible display unit 251 is not transformed (for example, a state having an infinite curvature radius, hereinafter referred to as a first state), the display area of the flexible display unit 251 becomes flat. When the flexible display unit 251 is transformed by external force in the first state (for example, a state having a finite curvature radius, hereinafter referred to as a second state), the display area of the flexible display unit 251 becomes a curved surface. As shown in the drawing, information displayed in the second state may be visual information outputted on the curved surface. Such visual information may be implemented by independently controlling the light emission of a sub-pixel disposed in a matrix. The sub-pixel means a minimum unit for implementing one color.

The flexible display unit 251 may be in a warping state (for example, a vertically or horizontally warped state) instead of a flat state during the first state. In this case, when external force is applied to the flexible display unit 251, the flexible display unit 251 may be transformed into a flat state (or a less warped state) or a more warped state.

Moreover, the flexible display unit 251 may be combined with a touch sensor to implement a flexible touch screen. When a touch is made on the flexible touch screen, the control unit 180 of FIG. 1 may perform a control corresponding to such a touch input. The flexible touch screen may be configured to detect a touch input in both the first state and the second state.

Moreover, the mobile terminal 200 according to a modified embodiment of the present invention may include a transformation detection means for detecting the transformation of the flexible display unit 251. Such a transformation detection means may be included in the sensing unit 140 of FIG. 1.

The transformation detection means may be provided at the flexible display unit 251 or the case 201, so that it may detect information relating to the transformation of the flexible display unit 251. Herein, the information relating to transformation may include a direction in which the flexible display unit 251 is transformed, the degree of transformation, a position where the flexible display unit 251 is transformed, a time that the flexible display unit 251 is transformed, and a restoring acceleration of the flexible display unit 251 and may further include various detectable information due to the warping of the flexible display unit 251.

Additionally, on the basis of information relating to the transformation of the flexible display unit 251 detected by the transformation detection means, the control unit 180 may change the information displayed on the display unit 251 or may generate a control signal for controlling a function of the mobile terminal 200.

Moreover, the mobile terminal 200 according to a modified embodiment of the present invention may include a case 201 for accommodating the flexible display unit 251. The case 201 may be configured to be transformed together with the flexible display unit 251 by external force in consideration of characteristics of the flexible display unit 251.

Furthermore, a battery (not shown) equipped in the mobile terminal 200 may be configured to be transformed together with the flexible display unit 251 by external force in consideration of characteristics of the flexible display unit 251. In order to implement the battery, a stack and folding method for stacking up battery cells may be applied.

A transformed state of the flexible display unit 251 is not limited to external force. For example, when the flexible display unit 251 has the first state, it is transformed into the second state by a command of a user or an application.

Moreover, a mobile terminal may expand to a wearable device that can be worn on the body beyond the level that a user mainly grabs the mobile terminal by a hand. Such an wearable device may include a smart watch, a smart glass, and an HMD. Hereinafter, examples of a mobile terminal expanding to a wearable device are described.

The wearable device may exchange data (or interoperate) with another mobile terminal 100. The short-range communication module 114 may detect (or recognize) a wearable device around the mobile terminal 100, which is capable of communicating with the mobile terminal 100. Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user may use the data processed in the mobile terminal 100 through the wearable device. For example, when a call is received by the mobile terminal 100, a user may perform a phone call through the wearable device or when a message is received by the mobile terminal 100, a user may check the received message through the wearable device.

Figure 3:
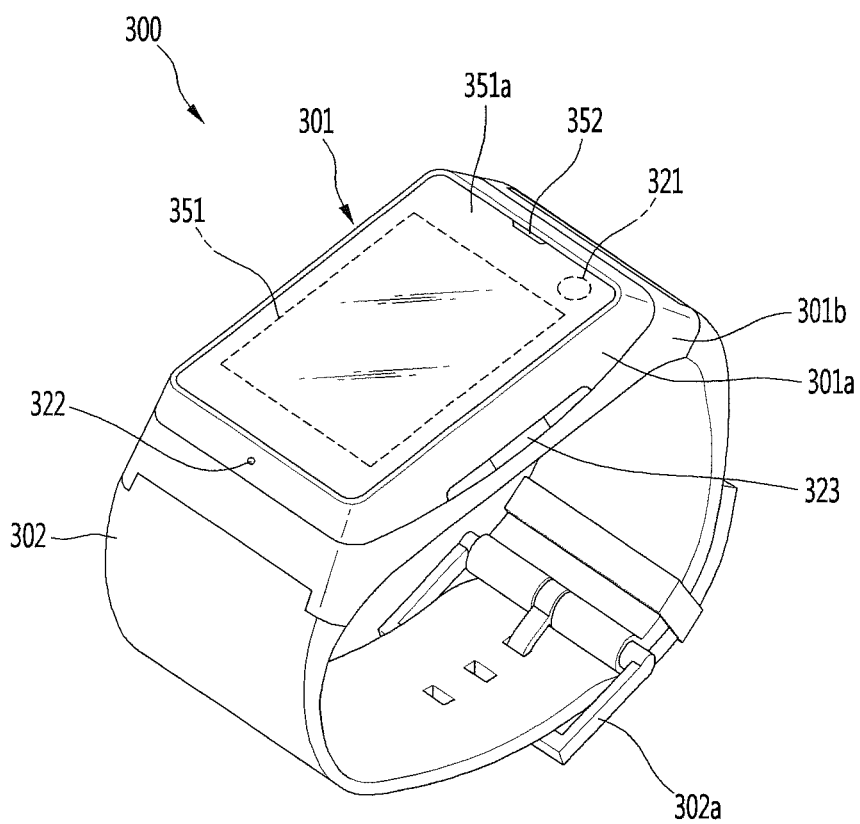
FIG. 3 is a perspective view illustrating a watch type mobile terminal 300 according to another embodiment of the present invention.

FIG. 3 is a perspective view illustrating a watch type mobile terminal 300 according to another embodiment of the present invention.

Referring to FIG. 3, the watch type mobile terminal 300 includes a body 301 including a display unit 351 and a band 302 connected to the body 301 to be worn on a wrist. In general, the mobile terminal 300 may have the same or similar features to the mobile terminal of FIG. 1.

The main body 301 includes a case for forming the appearance. As shown in the drawings, the case includes a first case 301a and a second case 301b preparing an inner space that accommodates various electronic components. However, the present invention is not limited thereto and one case may be configured to prepare the inner space so that the unibody mobile terminal 300 may be implemented.

The watch type mobile terminal 300 may be configured to allow wireless communication and an antenna for the wireless communication may be installed at the body 301. Moreover, the antenna may expand its performance by using a case. For example, a case including a conductive material may be configured to be electrically connected to an antenna in order to expand a ground area or a radiation area.

The display unit 351 is disposed at the front of the body 301 to output information and a touch sensor is equipped at the display unit 351 to be implemented as a touch screen. As shown in the drawing, a window 351a of the display unit 351 is mounted at the first case 301a to form the front of the terminal body together with the first case 301a.

The body 301 may include a sound output unit 352, a camera 321, a microphone 322, and a user input unit 323. When the display unit 351 is implemented as a touch screen, it may function as the user input unit 323 and accordingly, there is no additional key at the body 301.

The band 302 is worn on a wrist to wrap it and may be formed of a flexible material in order for easy wearing. As such an example, the band 302 may be formed of leather, rubber, silicon, and synthetic resin. Additionally, the band 302 may be configured to be detachable from the body 301, so that it may be replaced with various forms of bands according to user preferences.

Moreover, the band 302 may be used to expand the performance of an antenna. For example, a ground expansion unit (not shown) electrically connected to an antenna to expand a ground area may be built in a band.

The band 302 may include a fastener 302a. The fastener 302a may be implemented by a buckle, a snap-fit available hook structure, or velcro (a brand name) and may include a stretchable interval or material. This drawing illustrates an example that the fastener 302a is implemented in a buckle form.

Figure 4:
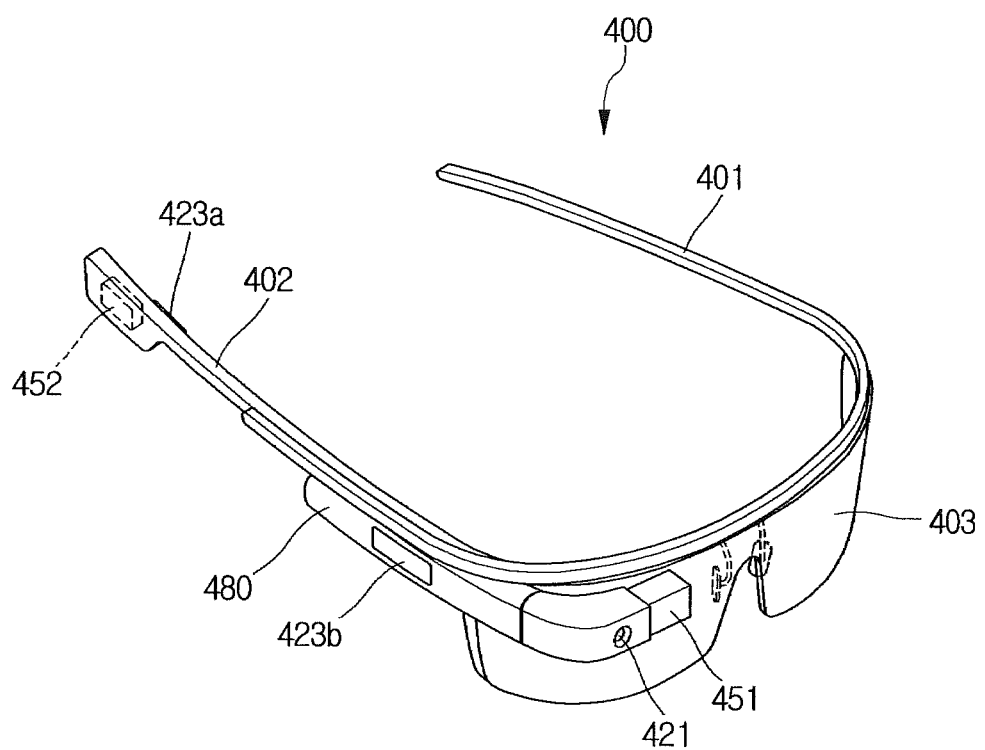
FIG. 4 is a perspective view illustrating a glass type mobile terminal according to another embodiment of the present invention.

FIG. 4 is a perspective view illustrating a glass type mobile terminal according to another embodiment of the present invention.

The glass type mobile terminal 400 may be configured to be worn on the head portion of a human body and for this, may include a frame part (for example, a case and a housing). The frame part may be formed of a flexible material in order for easy wearing. In this drawing, the frame part includes a first frame 401 and a second frame 402 formed of different materials. In general, the mobile terminal 400 may have the same or similar features to the mobile terminal of FIG. 1.

The frame part is supported by the head portion and provides a space for mounting various components. As shown in the drawing, electronic components such as a control module 480 and a sound output module 452 may be mounted at the frame part. Additionally, a lens 403 covering at least one of the left eye and the right eye may be detachably mounted at the frame part.

The control module 480 may be configured to control various electronic components equipped at the mobile terminal 400. The control module 480 may be understood as a component corresponding to the above-described control unit 180. In this drawing, the control module 480 is installed at the frame part on one side of the head portion. However, the position of the control module 480 is not limited thereto.

The display unit 451 may be implemented in an HMD form. The HMD form refers to a display method for displaying an image directly in front of the user's eyes, to be worn on the head portion of the human body. When a user wears a glass type mobile terminal 400, in order to provide an image directly in front of the user's eyes, the display unit 451 may be disposed in correspondence to at least one of the left eye and the right eye. In this drawing, in order to output an image toward the user's right eye, the display unit 451 is disposed in correspondence to a portion corresponding to the right eye.

The display unit 451 may project an image to the user's eye by using a prism. Additionally, in order to allow a user to see the projected image and a general front view (that is, a range that the user can see through the eyes), the prism may be transparent.

In such a way, an image outputted through the display unit 451 may be overlapped with a general view and displayed. The mobile terminal 400 may provide augmented reality (AR) superimposing a virtual image on a real image or a background and displaying it as one image by using characteristics of such a display.

The camera 421 is disposed adjacent to at least one of the left eye and the right eye to capture a front image. Since the camera 421 is disposed adjacent to the eye, it may obtain an image of a scene that a user sees.

In this drawing, the camera 421 is equipped at the control module 480 but the present invention is not limited thereto. The camera 421 may be installed at the frame part and may be provided in plurality to obtain a three-dimensional image.

The glass type mobile terminal 400 may include user input units 423a and 423b manipulated to receive a control command. The user input units 423a and 423b may adopt any method if it is a tactile manner that a user manipulates touch and push with tactile feeling. In this drawing, the user input units 423a and 423b of a push and touch input method are equipped at the frame part and the control module 480, respectively.

Additionally, the glass type mobile terminal 400 may include a microphone (not shown) receiving sound and processing it electrical voice data and a sound output module 452 outputting sound. The sound output module 452 may be configured to deliver sound through a general sound output method or a bone conduction method. When the sound output module 452 is implemented with a bone conduction and a user wears the mobile terminal 400, the sound output module 452 closely contacts the head portion and delivers sound by vibrating the skull.

A mobile terminal that implements embodiments described below may include a display unit, a sensing unit, and a control unit.

A 360-degree video may be displayed on the display unit. The 360-degree video may be a video having the angle of view of 360 degrees through omni-directional capturing. Herein, the display unit may be implemented in a touch screen form.

The sensing unit may correspond to the user input unit 123 or the sensing unit 140 shown in FIG. 1. In this case, the sensing unit may detect an input signal from a user. The input signal from a user may include short touch, long touch, drag touch, pinch-out touch, pinch-in touch, and double-tap touch.

The control unit may play and display a 360-degree video on a display unit and control a sensing unit to detect an input signal for the 360-degree video.

In more detail, in correspondence to a first input signal for playing a 360-degree video at a first playing angle, the control unit may display a first image played at the first playing angle on the display unit. Then, when a second input signal for changing the first playing angle of the 360-degree video into a second playing angle different from the first playing angle is detected, the control unit may display a second image played at the second playing angle on the display unit as a main screen, and display the first image played at the first playing angle on the display unit as a PIP screen.

Hereinafter, embodiments relating to a control method implemented in such a configured mobile terminal are described with reference to the accompanying drawings. It is apparent to those skilled in the art that the present invention may be specified in a different deformable form without departing from the scope and essential features of the present invention.

Figure 5A:
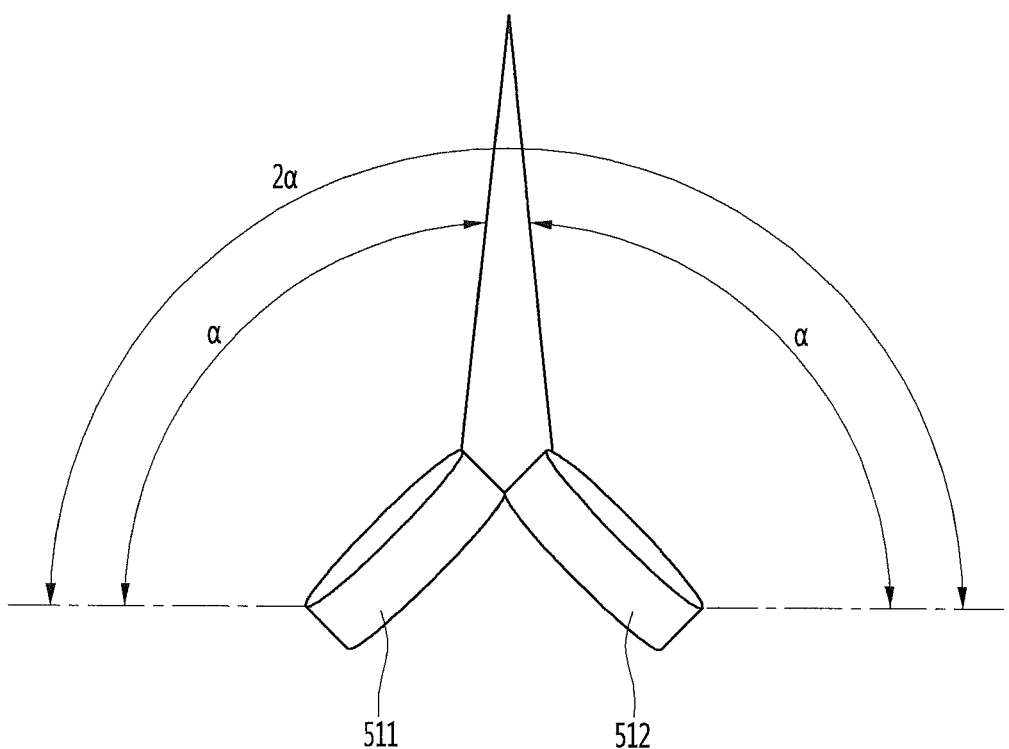
FIGS. 5A to 5C are views illustrating a 360-degree video displayed by a mobile terminal according to an embodiment of the present invention.
Figure 5B:
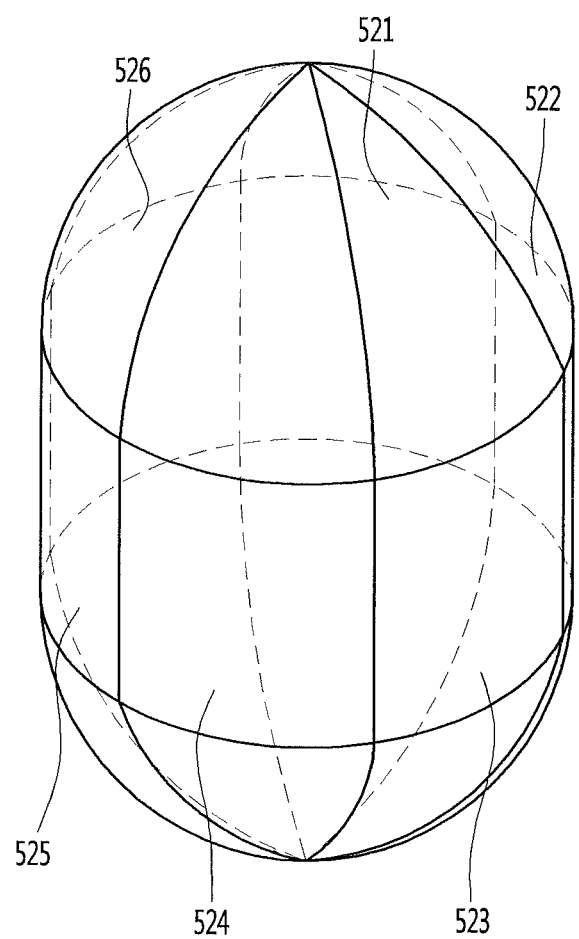
Figure 5C:
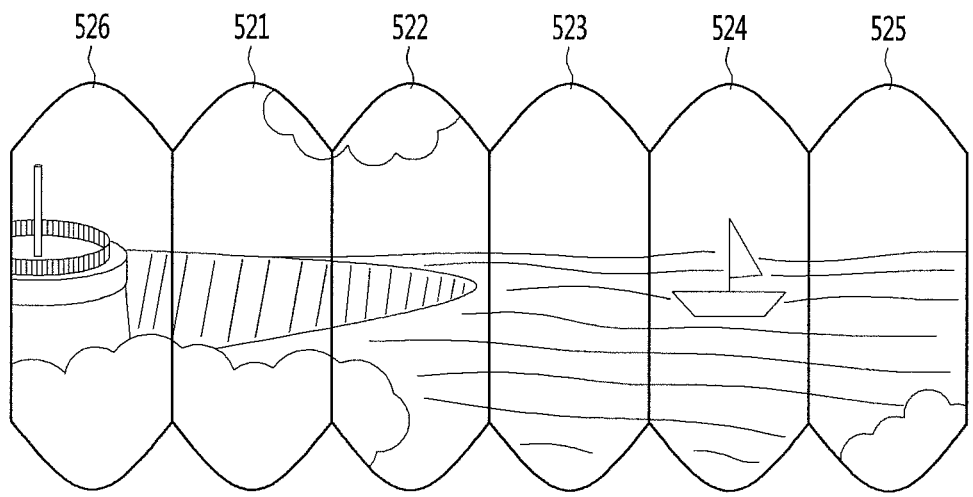

FIGS. 5A to 5C are views illustrating a 360-degree video displayed by a mobile terminal according to an embodiment of the present invention.

The 360-degree video is a video having the angle of view of 360 degrees. All directions of 360 degrees are captured by using a plurality of cameras having a predetermined angle of view or rotating a camera having a predetermined angle of view by 360 degrees, so that a 360-degree video may be produced. In this present invention, it is assumed that a 360-degree video is captured by using a plurality of cameras. Herein, an angle of view or a field of view means a horizontal or vertical viewing angle for capturing an image by a camera through a lens.

When an image is captured simultaneously at the same view point through a plurality of cameras, it is possible to capture a wide angle video or a wide angle image having a wider angle of view compared to when one camera is provided.

As shown in FIG. 5A, cameras 511 and 512 may capture an image of up to the maximum a degree on space. Accordingly, the angle of view of each of the cameras 511 and 512 is a degree. In this case, by simultaneously using the two cameras 511 and 512 having the angle of view of a degree, a video or image having the maximum angle of view of $2a$ degree may be captured. In such a method, a video having the maximum angle of view of 360 degrees may be captured.

The 360-degree video may include a plurality of playback areas. Each playback area may correspond to a predetermined playing angle in 360 degrees.

The 360-degree video may include a plurality of playback areas played at the same time point. Each playback area may play an image corresponding to a predetermined range of a playing angle in 360 degrees. In this case, each of the plurality of playback areas may be captured by each corresponding camera.

As shown in FIG. 5B, a 360-degree video may include a first playback area 521, a second playback area 522, a third playback area 523, a fourth playback area 524, a fifth playback area 525, and a sixth playback area 526. The first playback area 521 may play an image corresponding to a playing angle of 0° to 60°, the second playback area 522 may play an image corresponding to a playing angle of 60° to 120°, the third playback area 523 may play an image corresponding to a playing angle of 120° to 180°, the fourth playback area 524 may play an image corresponding to a playing angle of 180° to 240°, the fifth playback area 525 may play an image corresponding to a playing angle of 240° to 300°, and the sixth playback area 526 may play an image corresponding to a playing angle of 300° to 360°.

Herein, each of the six playback areas 521, 522, 523, 524, 525, and 526 may be captured by a camera having the angle of view of 60°. However, the present invention is not limited thereto. Accordingly, a 360-degree video may be captured by a plurality of cameras having the angle of view different from the above and in this case, the number of playback areas included in the 360-degree video may vary.

A 360-degree video may be displayed in various forms. In more detail, a 360-degree video may be displayed in a cylindrical or hexahedral shape to correspond to an image of a spherical form captured in all directions of 360 degrees. Alternatively, a 360-degree video may be displayed in a rectangular form that is obtained by dividing and expanding a spherical image to correspond to the screen of a mobile terminal. In this present invention, it is assumed that a 360-degree video is displayed in a rectangular form.

When a mobile terminal displays a 360-degree video in a rectangular form, the 360-degree video, as shown in FIG. 5C, may be displayed as a rectangular image where the plurality of playback areas 521, 522, 523, 524, 525, and 526 in the 360-degree video are expanded on a plane.

Recommendation of Optimized Viewing Angle During Content Playback

Figure 6:
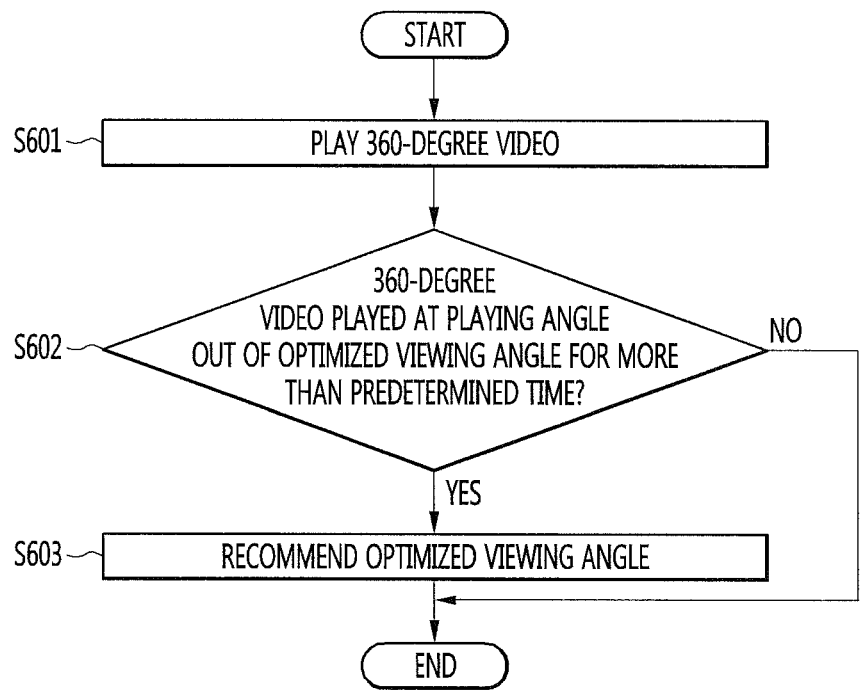
FIG. 6 is a flowchart illustrating a process for recommending an optimized viewing angle for a 360-degree video by a mobile terminal according to an embodiment of the present invention.

FIG. 6 is a flowchart illustrating a process for recommending an optimized viewing angle for a 360-degree video by a mobile terminal according to an embodiment of the present invention.

The playing angle of an image intended by a producer during production may exist in a 360-degree video. Hereinafter, in this present invention, the playing angle of an image which is a producer intended is defined as an optimized viewing angle.

Due to characteristics of a 360-degree video having a playback direction or playing angle selected by a user, a 360-degree video may be played at an angle out of an optimized viewing angle. In this case, the mobile terminal 100 may recommend the optimized viewing angle of a 360-degree video.

The mobile terminal 100 plays a 360-degree video in operation S601.

The mobile terminal 100 determines whether the 360-degree video is played for a predetermined time at a playing angle out of an optimized viewing angle in operation S602.

In more detail, the mobile terminal 100 may determine whether a specific screen or playback area, which is out of an optimized viewing angle intended by an original producer, is displayed and maintained for more than a predetermined time.

When it is determined that the specific screen or playback area is played at a playing angle out of an optimized viewing angle for more than a predetermined time in operation S602—Yes, the mobile terminal 100 recommends an optimized viewing angle in operation S603.

The recommendation of an optimized viewing angle may be provided in various forms. According to an embodiment, the mobile terminal 100 may provide an image played at the optimized viewing angle in a PIP screen form. According to another embodiment, the mobile terminal 100 may provide an image played at the optimized viewing angle in a floating area form. An embodiment provided in a PIP screen form is described with reference to FIGS. 7A and 7B and an embodiment provided in a floating area form is described with reference to FIGS. 8A and 8B.

Moreover, in operation S602, when it is determined that the specific screen or playback area is not played at a playing angle out of an optimized viewing angle for more than a predetermined time in operation S602—No, the mobile terminal 100 determines that the 360-degree video is displayed at the optimized viewing angle and terminates a corresponding procedure.

Figure 7A:
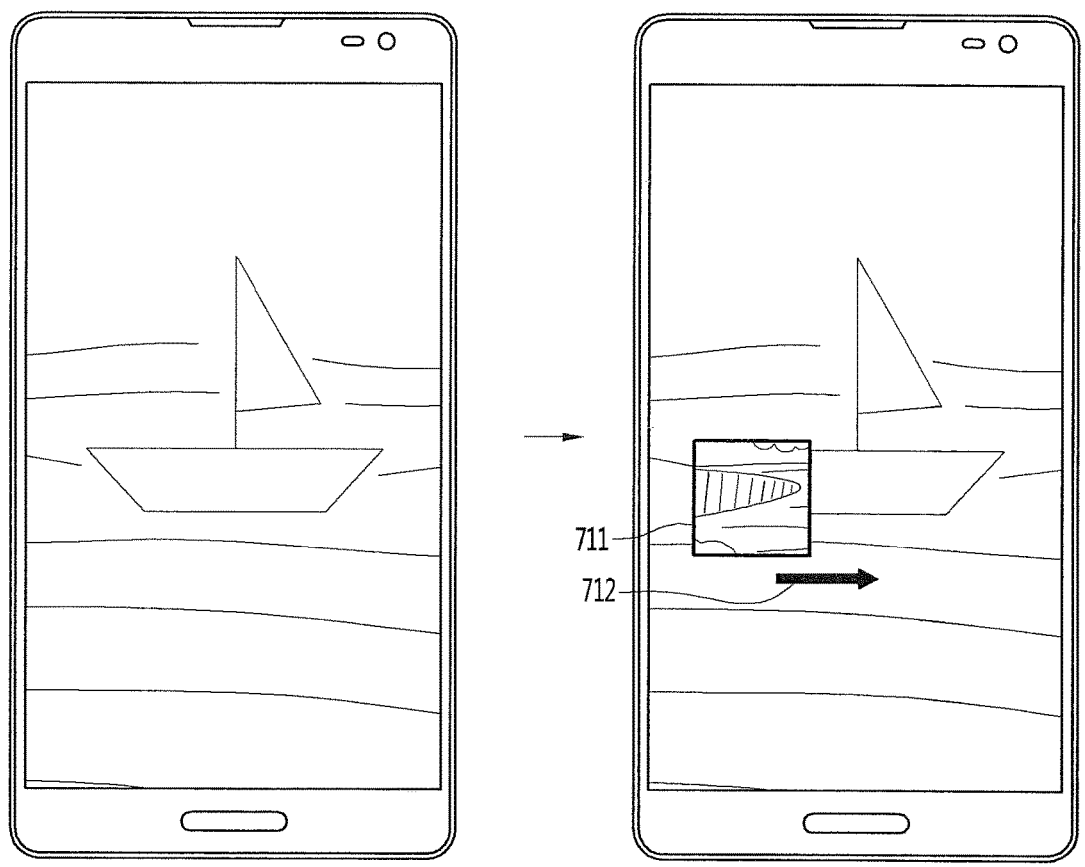

FIGS. 7A and 7B are views of recommending an optimized viewing angle for a 360-degree video by a mobile terminal according to an embodiment of the present invention.

The mobile terminal 100 may provide recommendation for an optimized viewing angle in a PIP screen form. In more detail, when a 360-degree video is played at a playing angle out of more than a predetermined range from an optimized viewing angle, the mobile terminal 100 may display an image played at the optimized viewing angle as a PIP screen.

The Picture In Picture (PIP) screen may be added to a screen in playback and displayed. In this case, the screen in playback is defined as a main screen. The PIP screen may be displayed smaller than the size of the main screen and displayed in a form of being inserted to the main screen.

The size of the PIP screen may vary based on a degree that the playing angle of a 360-degree video is out of from the optimized viewing angle. In more detail, as the playing angle is closer to the optimized viewing angle, the size of the PIP screen becomes smaller gradually and as the playing angle is far way from the optimized viewing angle, the size of the PIP screen becomes larger gradually. When the 360-degree video is played at an optimized viewing angle, the PIP screen may disappear from the main screen in playback.

The mobile terminal 100 may display a direction indicator together with the PIP screen. The direction indicator may represent a direction or movement degree for moving a screen in order to display an image of an optimized viewing angle. According to an embodiment, the direction indicator may represent the position of an image played at an optimized viewing angle.

The length of the direction indicator may vary based on a degree that the playing angle of a 360-degree video is out of from the optimized viewing angle. In more detail, as the playing angle is closer to the optimized viewing angle, the length of the direction indicator becomes shorter gradually and as the playing angle is far way from the optimized viewing angle, the length of the direction indicator becomes longer gradually. When the 360-degree video is played at an optimized viewing angle, the direction indicator may disappear from the main screen in playback.

For convenience of description, it is assumed in FIGS. 7A and 7B that the mobile terminal 100 displays the fourth playback area 524 in the 360-degree video shown in FIG. 5C. Additionally, it is assumed that an image played at an optimized viewing angle in the 360-degree image shown in FIG. 5C is the second playback area 522. In this case, as described above, the playing angle of the second playback area 522 is from about 60° to about 120° and the playing angle of the fourth playback area 524 is from about 180° to about 240°.

As shown in FIG. 7A, a 360-degree video plays the image of the fourth playback area 524 corresponding to the playing angle from about 180° to about 240°. Since the optimized viewing angle is in a range of about 60° to about 120°, in this case, the 360-degree video is played at a playing angle out of the optimized viewing angle.

When the 360-degree video is displayed for a predetermined time in a state of being out of the optimized viewing angle, the mobile terminal 100 displays a PIP screen 711 and a direction indicator 712 on a screen.

An image played at the optimized viewing angle is displayed on the PIP screen 711. That is, the image of the second playback area 522 played at a playing angle from about 60° to about 120° may be displayed on the PIP screen 711.

The optimized viewing angle is in a range of about 60° to about 120°, but an image is currently played at a playing angle from about 180° to about 240°. Accordingly, in order to display an image played at the optimized viewing angle on the screen of the mobile terminal 100, a 360-degree image is required to be moved from the left to the right. Accordingly, the direction indicator 712 may be displayed by an arrow pointing from the left toward the right. Moreover, according to an embodiment, if the direction indicator 712 indicates the position of an image played at the optimized viewing angle, it may be displayed by an arrow for pointing the left.

A user may change a playing angle into an optimized viewing angle by moving the playback screen of a 360-degree video with reference to the direction indicator 712. As shown in FIG. 7B, the playback screen of a 360-degree video may be moved from the right to the left in correspondence to an input signal. As the playback screen of a 360-degree video is moved and a playing angle is closer to an optimized viewing angle, the size of the PIP screen 711 becomes smaller and the length of the direction indicator 712 becomes shorter. When the 360-degree video starts to be played at an optimized viewing angle, the PIP screen 711 and the direction indicator 712 may disappear from the playback screen.

Figure 8A:
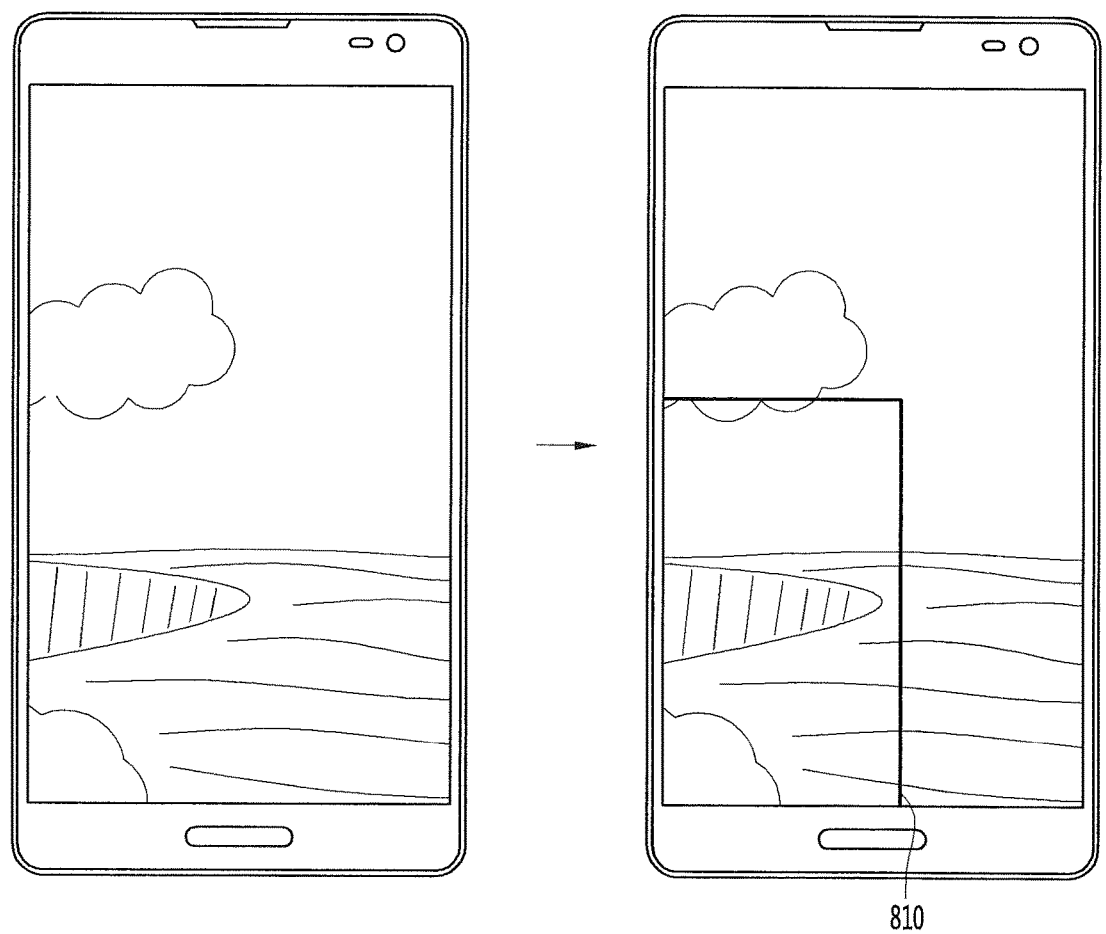
FIGS. 8A and 8B are views of recommending an optimized viewing angle for a 360-degree video by a mobile terminal according to an embodiment of the present invention.
Figure 8B:
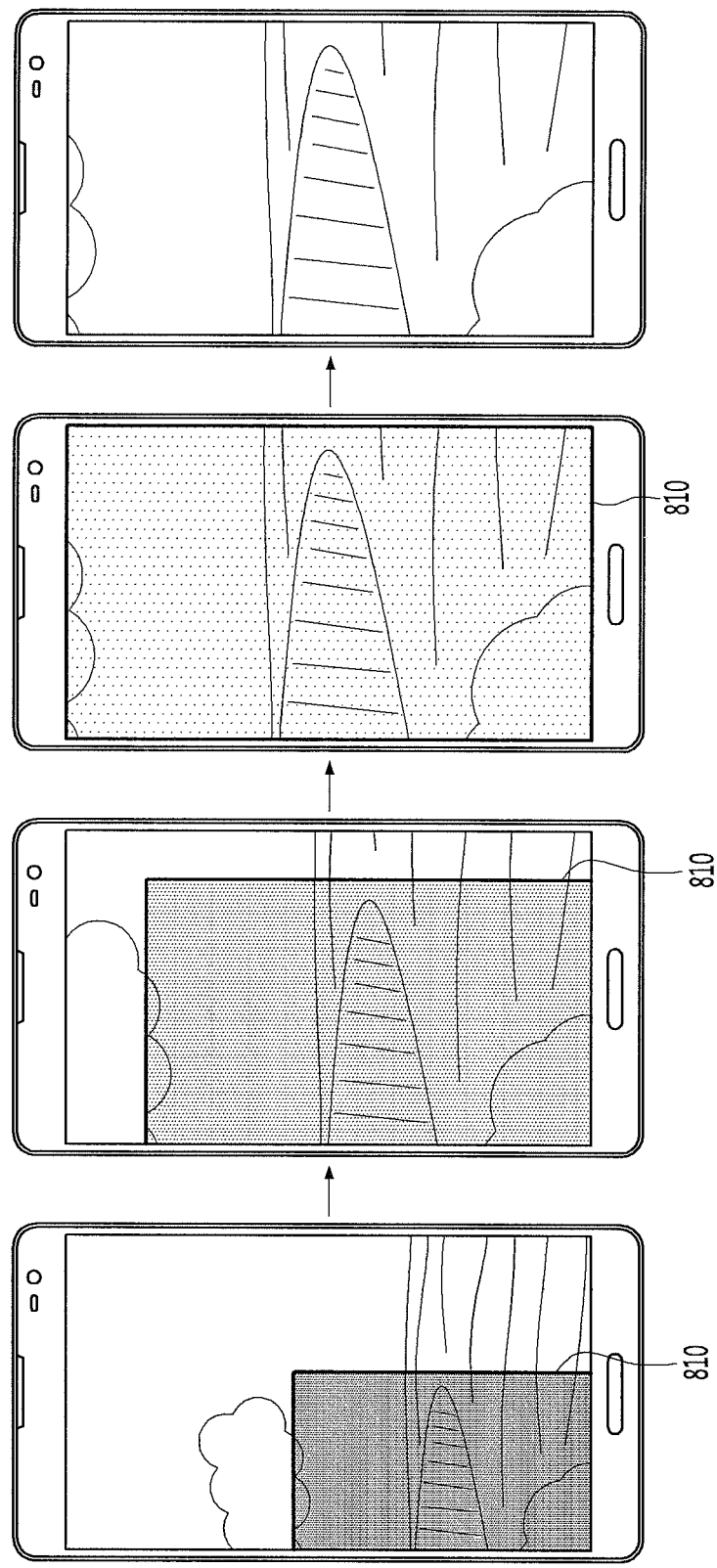

FIGS. 8A and 8B are views of recommending an optimized viewing angle for a 360-degree video by a mobile terminal according to an embodiment of the present invention.

The mobile terminal 100 may provide recommendation for an optimized viewing angle in a floating area form. In more detail, when a 360-degree video is played at a playing angle out of more than a predetermined range from an optimized viewing angle, the mobile terminal 100 may display an image played at the optimized viewing angle as a floating area.

The floating area is to provide a guideline and feedback of fitting for an optimized viewing angle and may be displayed in a box form on a playback screen.

In more detail, the floating area may be displayed in a layered form of overlapping a playback screen. In this case, the screen in playback is defined as a main screen. The floating area may be shaded or displayed with a color different from that of the main screen.

The transparency of the floating area may vary based on a degree that the playing angle of a 360-degree video is out of from the optimized viewing angle. In more detail, as the playing angle is closer to the optimized viewing angle, the transparency of the floating area becomes higher gradually and as the playing angle is far way from the optimized viewing angle, the transparency of the floating area becomes lower gradually. When the 360-degree video is played at an optimized viewing angle, the floating area may disappear from the main screen in playback.

When the playback screen is moved, the floating area is moved together. When the floating area overlaps in correspondence to the screen boundary of the mobile terminal 100, the playing angle of a 360-degree video may correspond to an optimized viewing angle.

When the playing angle corresponds to the optimized viewing angle, if a predetermined time elapses after that, the floating area may disappear from the playback screen.

Moreover, although the floating area is displayed, even when an input signal for adjusting a playback angle to an optimized viewing angle is not detected, if a predetermined time elapses after that, the floating area may disappear from the playback screen.

When a 360-degree video is played for more than a predetermined time at a playing angle out of more than a predetermined range from an optimized viewing angle, as shown in FIG. 8A, a floating area 810 is displayed on a screen.

The floating area 810 may be moved to correspond to the screen boundary of the mobile terminal 100 in correspondence to an input signal. As it is closer to the screen boundary of the mobile terminal 100, the transparency of the floating area 810 becomes higher gradually. Referring to FIG. 8B, the floating area 810 has almost no transparency at an initially displayed time point and thereby, a user may not easily watch a playback image displayed at the floating area 810. However, as it is closer to a screen boundary, the transparency of the floating area 810 becomes higher and thereby, a playback image displayed in the floating area 810 is shown to a user. When the floating area 810 corresponds to the screen boundary, it may disappear from the screen.

Recommendation of Plurality of Playing Angles During Content Playback

Figure 9:
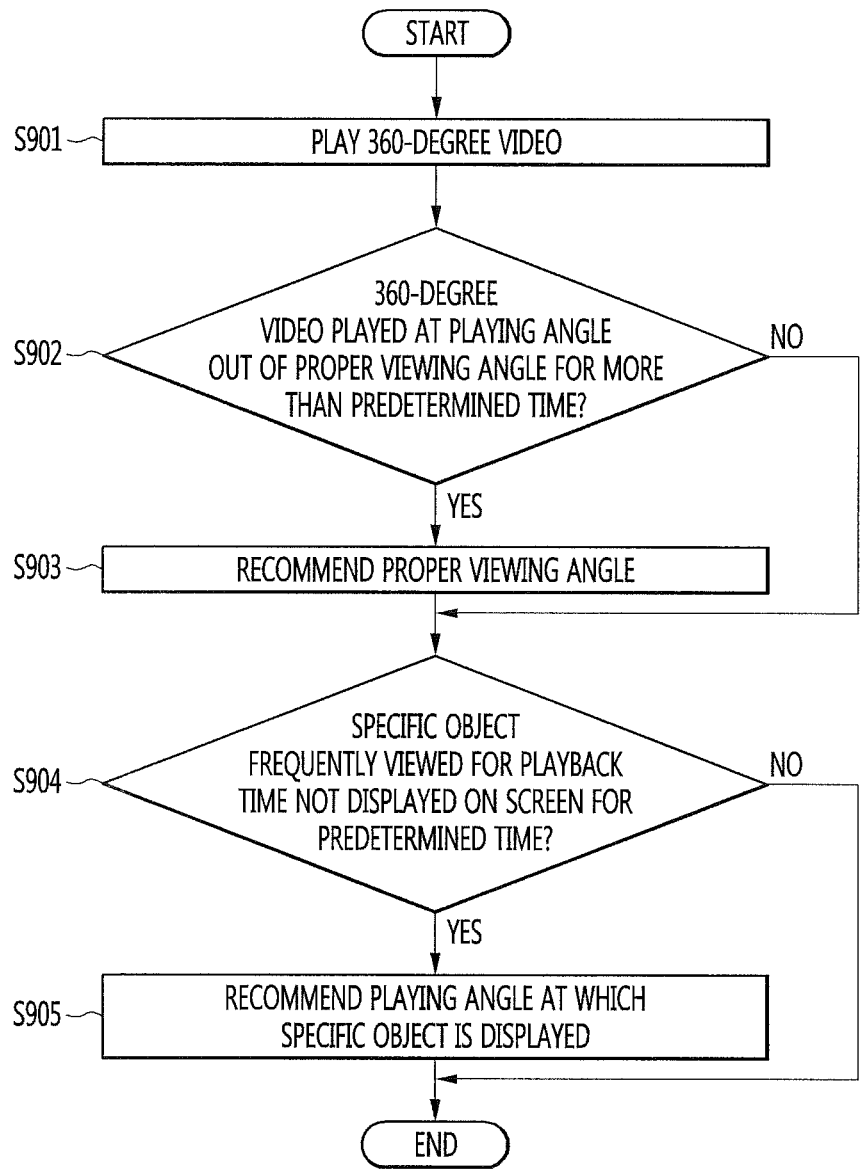
FIG. 9 is a flowchart illustrating a process for recommending a plurality of playing angles for a 360-degree video by a mobile terminal according to an embodiment of the present invention.

FIG. 9 is a flowchart illustrating a process for recommending a plurality of playing angles for a 360-degree video by a mobile terminal according to an embodiment of the present invention.

The 360-degree video may be played at various playing angles, and an image played at each playing angle may include various information. Since the mobile terminal 100 displays only an image played with a predetermined playing angle at one time point on a screen, a user may not see an image played with a different playing angle at a corresponding time point. In this case, even when an image including information useful for a user or information that a user is interested is played at another playing angle, a user misses it.

Accordingly, in this present invention, when an image played with another playing angle at the same time point includes predetermined information, the mobile terminal 100 may recommend another playing angle.

Herein, the predetermined information may be determined based on a user's or other viewers' preference. In more detail, the predetermined information may be a specific object that users or other viewers frequently watch during the entire playback time of a 360-degree video. In this case, when the specific object is not displayed on a screen for a predetermined time, the mobile terminal 100 may recommend a playing angle at which a corresponding object is displayed.

Additionally, the 360-degree video may be out of a proper viewing angle and played for more than a predetermined time. Herein, the proper viewing angle may be defined as a proper playing angle at which a 360-degree video is displayed. The proper viewing angle may be a playing angle within a predetermined range from an optimized viewing angle or may be a playing angle within a predetermined range from the most frequent playing angle at which other viewers watch a 360-degree video frequently. Accordingly, a proper viewing angle is conceptually separated from an optimized viewing angle. When a 360-degree video is out of a proper viewing angle and played, a user may not perform an optimized viewing corresponding to a video's content or an original production intend.

Accordingly, when a 360-degree video is out of a proper viewing angle and played for a predetermined time, the mobile terminal 100 may recommend a proper viewing angel.

Thereby, in some cases, the mobile terminal 100 may recommend a plurality of different playing angles.

The recommendation of a playing angle may be provided in a PIP screen form. In more detail, the mobile terminal 100 may display an image played at a proper viewing angle as a PIP screen. The PIP screen is described above with reference to FIGS. 7A and 7B and its overlapping description is omitted.

The mobile terminal 100 plays a 360-degree video in operation S901.

The mobile terminal 100 determines whether a 360-degree video is played for a predetermined time at a playing angle out of a proper viewing angle in operation S902.

In more detail, the mobile terminal 100 determines whether a 360-degree video is out of a playing angle disposed close to an optimized viewing angle preset by an original producer and played or is out of a playing angle close to the most frequent playing angle watched by other viewers and played, during a time corresponding to 15% of the total playback time of the 360-degree video.

When it is determined that a playing angle out of a proper viewing angle is played for more than a predetermined time in operation S902—Yes, the mobile terminal 100 recommends a proper viewing angle in operation S903.

In more detail, the mobile terminal 100 may provide an image played at a proper viewing angle in a PIP screen form. However, a recommendation form of a proper viewing angle is not limited thereto, and may be provided variously modified forms according to an embodiment.

Moreover, in operation S902, when it is determined that the playing angle out of the proper viewing angle is not played for more than a predetermined time in operation S902—No, the mobile terminal 100 determines that the 360-degree video is displayed at the proper viewing angle and does not perform operation S903.

The mobile terminal 100 determines whether a specific object viewed frequently during a playback time is not displayed on a screen for a predetermined time in operation S904.

In more detail, as a 360-degree video is played at a playing angle out of the playing angle at which the specific object is displayed, the mobile terminal 100 may determine whether the specific object is not displayed on a playback screen for a predetermined time. In this case, a user misses the specific object. Moreover, an object may include a main character, a supporting actor, and a specific thing.

When it is determined a specific object viewed frequently during a playback time is not displayed on a screen for a predetermined time in operation S904—Yes, the mobile terminal 100 recommends a playing angle at which the specific object is displayed in operation S905. In more detail, the mobile terminal 100 may provide an image played at a playing angle at which a specific object is displayed, in a PIP screen form. However, the present invention is not limited thereto and a playing angle at which a specific object is displayed may be provided in an angle indictor form.

Moreover, in operation S904, when it is not a case that a specific object viewed frequently during a playback time is not displayed on a screen for a predetermined time in operation S904—No, the mobile terminal 100 determines that the specific object is displayed on the screen and terminates the procedure without performing operation S905.

Figure 10:
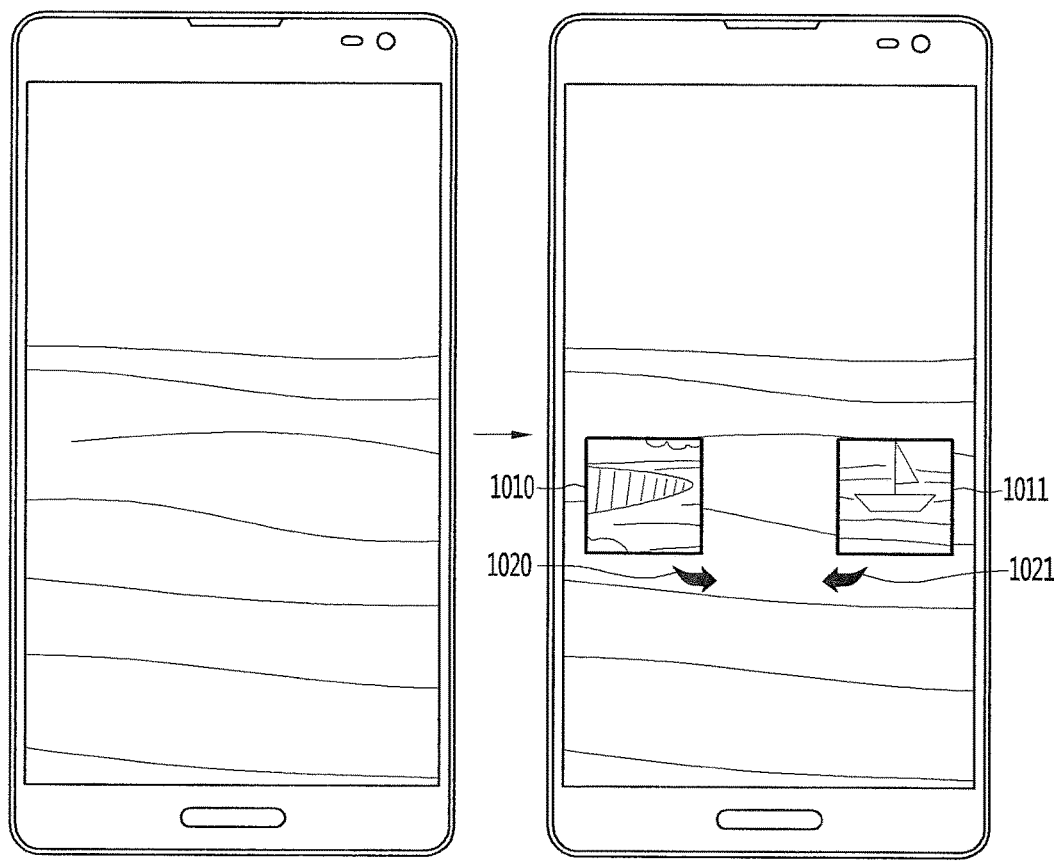
FIG. 10 is a view of recommending a plurality of playing angles for a 360-degree video by a mobile terminal according to an embodiment of the present invention.

FIG. 10 is a view of recommending a plurality of playing angles for a 360-degree video by a mobile terminal according to an embodiment of the present invention.

When a 360-degree video is played at a predetermined playing angle to maintain a specific screen or area for a predetermined time, the mobile terminal 100 may recommend another playing angle. In more detail, the mobile terminal 100 may generate a PIP screen for displaying an image played at another playing angle and display the generated PIP screen on a playback screen. Additionally, the mobile terminal 100 may display a direction indicator for representing a direction that a 360-degree video is to move in order to display an image of an optimized viewing angle.

In more detail, if there is a second playing angle corresponding to a predetermined condition in a state that a 360-degree video is played at a first playing angle, the mobile terminal 100 may recommend an image played at the second playing angle. Herein, the first playing angle, as a predetermined playing angle at which the current 360-degree video is played, may correspond to a playing angle except for an optimized viewing angle. The second playing angle may include an optimized viewing angle and a playing angle at which a specific object is displayed.

A plurality of second playing angles corresponding to a predetermined condition may exist according to some cases, and thereby, a plurality of PIP screens respectively corresponding to the plurality of second playing angles may be displayed. For example, if there is another playing angle corresponding to an additional condition in a state that one second playing angle is recommended, a PIP screen for displaying an image played at a corresponding playing angle may be displayed in a direction that the other playing angle is disposed.

For convenience of description, the third playback area 523 in the 360-degree video shown in FIG. 5C is displayed as shown in FIG. 10, and in this case, it is assumed that the playing angle of the third playing area 523 is not included in a proper viewing angle. Additionally, it is assumed that an image played at the optimized viewing angle of the 360-degree video is the second playback area 522 and an image where displays a specific object that is frequently watched by viewers during the total playback time of the 360-degree video is the fourth playback area 524.

As shown in FIG. 10, the 360-degree video plays the image of the third playback area 523. Since the 360-degree video is not played at a proper viewing angle, in this case, the mobile terminal 100 may recommend an optimized viewing angle. Accordingly, a PIP screen 1010 for displaying the image of the second playback area 522 is displayed on a screen.

The optimized viewing angle is in a range of about 60° to about 120°, but an image is currently played at a playing angle from about 120° to about 180°. Accordingly, in order to display an image played at the optimized viewing angle on the screen of the mobile terminal 100, a 360-degree image is required to be moved from the left to the right. Accordingly, the direction indicator 1020 in an arrow form pointing from the left toward the right may be displayed on a screen.

Additionally, an image where a specific object frequently watched by viewers during the total playback time of the 360-degree video is displayed is currently played at another playing angle. In this case, the mobile terminal 100 recommends an image played at a playing angle that a specific object is displayed. Accordingly, a PIP screen 1011 for displaying the image of the fourth playback area 524 is displayed on a screen.

The playing angle at which a specific object is displayed is in a range of about 180° to about 240°, but an image is currently played at a playing angle from about 120° to about 180°. Accordingly, in order to display an image played at a playing angle that a specific object is displayed on the screen of the mobile terminal 100, a 360-degree image is required to be moved from the right to the left. Accordingly, a direction indicator 1021 in an arrow form pointing from the right toward the left may be displayed on a screen.

Moreover, according to an embodiment, when a 360-degree video is played out of a proper viewing angle for more than a predetermined time in the total playback time of the 360-degree video or more than a predetermined percentage of an image section where a specific object is shown is missed, an image may be played after returning to a missing time point.

Therefore, when watching a 360-degree video at a predetermined playing angle, a user may easily recognize an interesting information or image at another playing angle without missing it.

Change of Playing Angle During Content Playback

Figure 11:
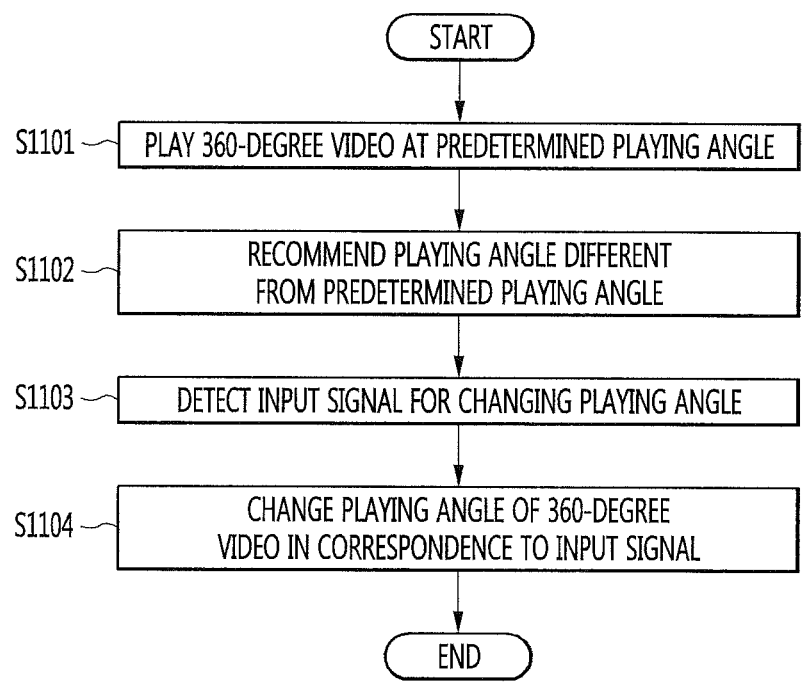
FIG. 11 is a flowchart illustrating a process for changing a playing angle of a 360-degree video by a mobile terminal according to an embodiment of the present invention.

FIG. 11 is a flowchart illustrating a process for changing a playing angle of a 360-degree video by a mobile terminal according to an embodiment of the present invention.

A user may change a playing angle of a 360-degree video on the basis of a recommended optimized viewing angle or another playing angle. In this case, the mobile terminal 100 may change the playing angle of a 360-degree video in correspondence to an input signal.

The mobile terminal 100 plays a 360-degree video at a predetermined playing angle in operation S1101.

The mobile terminal 100 recommends a playing angle different from the predetermined viewing angle in operation S1102.

In more detail, the different playing angle may be a proper viewing angle or may be a playing angle at which a specific object watched by viewers frequently during the total playback time of a 360-degree video is displayed. This is described with reference to FIGS. 9 and 10 above, and thus redundant description is omitted.

The mobile terminal 100 detects an input signal for changing a playing angle in operation S1103.

The input signal for changing a playing angle may include various types of touches such as short (or tap) touch, long touch, multi touch, drag touch, flick touch, pinch-in touch, pinch-out touch, swipe touch, and hovering touch on a touch screen.

The mobile terminal 100 may change the playing angle of a 360-degree video in correspondence to an input signal in operation S1104.

Figure 12:
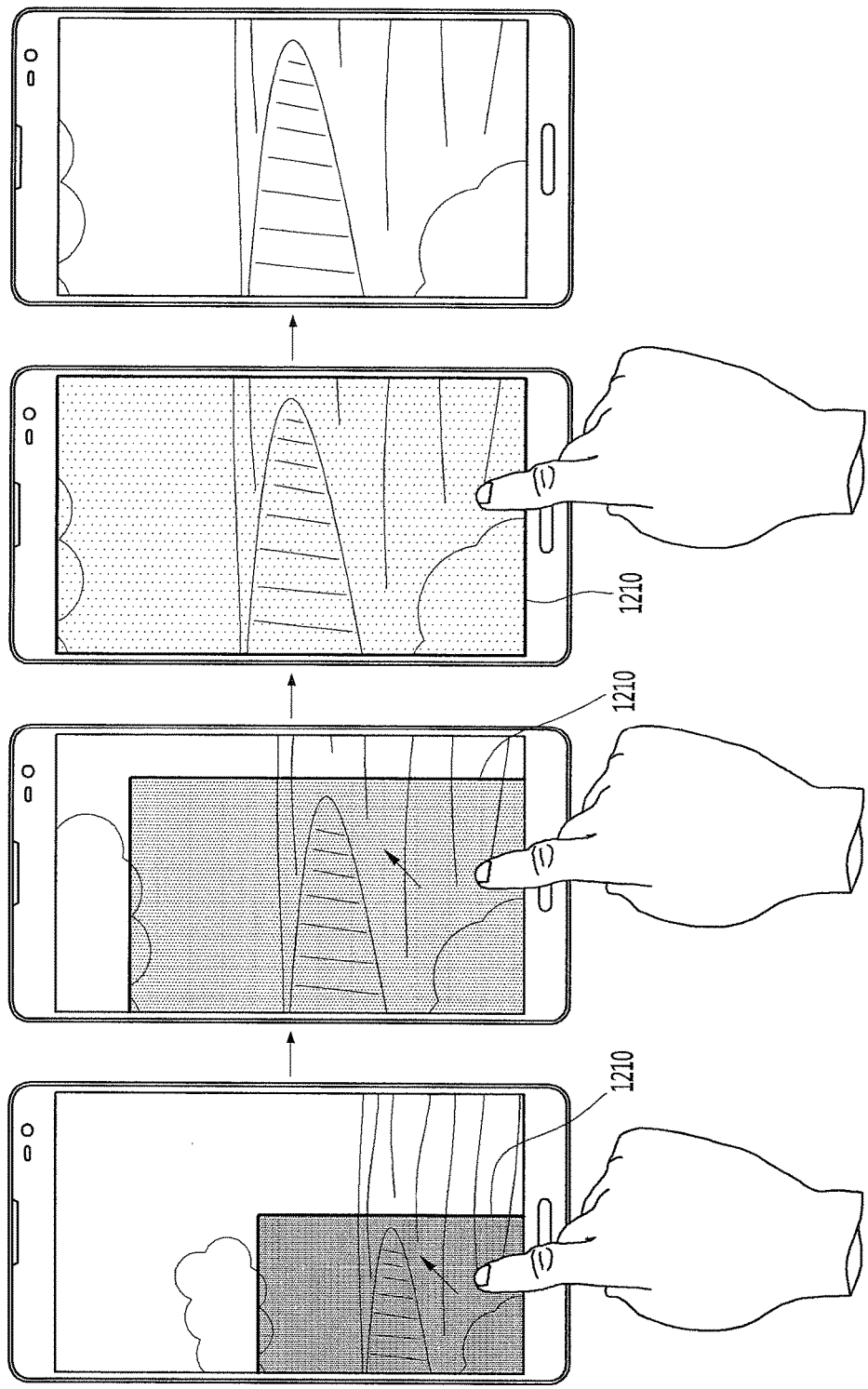
FIG. 12 is a view of changing a playing angle of a 360-degree video by a mobile terminal according to an embodiment of the present invention.

FIG. 12 is a view of changing a playing angle of a 360-degree video by a mobile terminal according to an embodiment of the present invention.

When changing the playing angle of a 360-degree video, the mobile terminal 100 may display an image played at the optimized viewing angle in a floating area form. Thereby, a guideline and feedback for the adjustment of an optimized viewing angle may be provided.

In this embodiment, an image played at an optimized viewing angle may be displayed in a floating area. However, the present invention is not limited thereto and according to an embodiment, an image for a playing angle at which a specific object is displayed or an image played at a proper viewing angle may be displayed in a floating area.

When the floating area is moved and adjusted to correspond to a screen, the mobile terminal 100 may display an image played at an optimized viewing angle.

Accordingly, as the size of a floating area displayed on a screen becomes larger, a playing angle become close to an optimized viewing angle and as the size of a floating area displayed on a screen becomes smaller, a playing angle become away from an optimized viewing angle.

Additionally, as the position of a floating area is adjusted to correspond to a screen boundary, a playing angle become close to an optimized viewing angle and as the position of a floating area is dislocated from a screen boundary, a playing angle become away from an optimized viewing angle.

The transparency of a floating area may vary according to a proximity degree between a playing angle and an optimized viewing angle. In more detail, as a playing angle is closer to an optimized viewing angle, the transparency of a floating area may become higher and as a playing angle is far way from an optimized viewing angle, the transparency of a floating area may become lower.

Moreover, when a floating area is moved and adjusted to correspond to a screen, it may disappear from a main screen in playback. Additionally, when a floating area is displayed on a main screen, if there is no input signal for that for a predetermined time, the floating area may disappear from the main screen.

Thereby, based on at least one of the size, position, and transparency of a displayed floating area, a user may determine a direction that the floating area is to move in order to display an image played at an optimized viewing angle.

As shown in FIG. 12, a floating area 1210 is displayed at a left lower end of a screen. The floating area 1210 is moved and adjusted to correspond to a screen boundary in correspondence to an input signal. As the floating area 1210 is moved, the size of the floating area 1210 displayed on the screen becomes larger and its transparency becomes higher.

When the floating area 1210 is adjusted to correspond to the screen boundary, it disappears from the screen. In this case, an image played at an optimized viewing angle is displayed on the screen of the mobile terminal 100.

Playback of Image at Recommended Playing Angle During Content Playback

Figure 13:
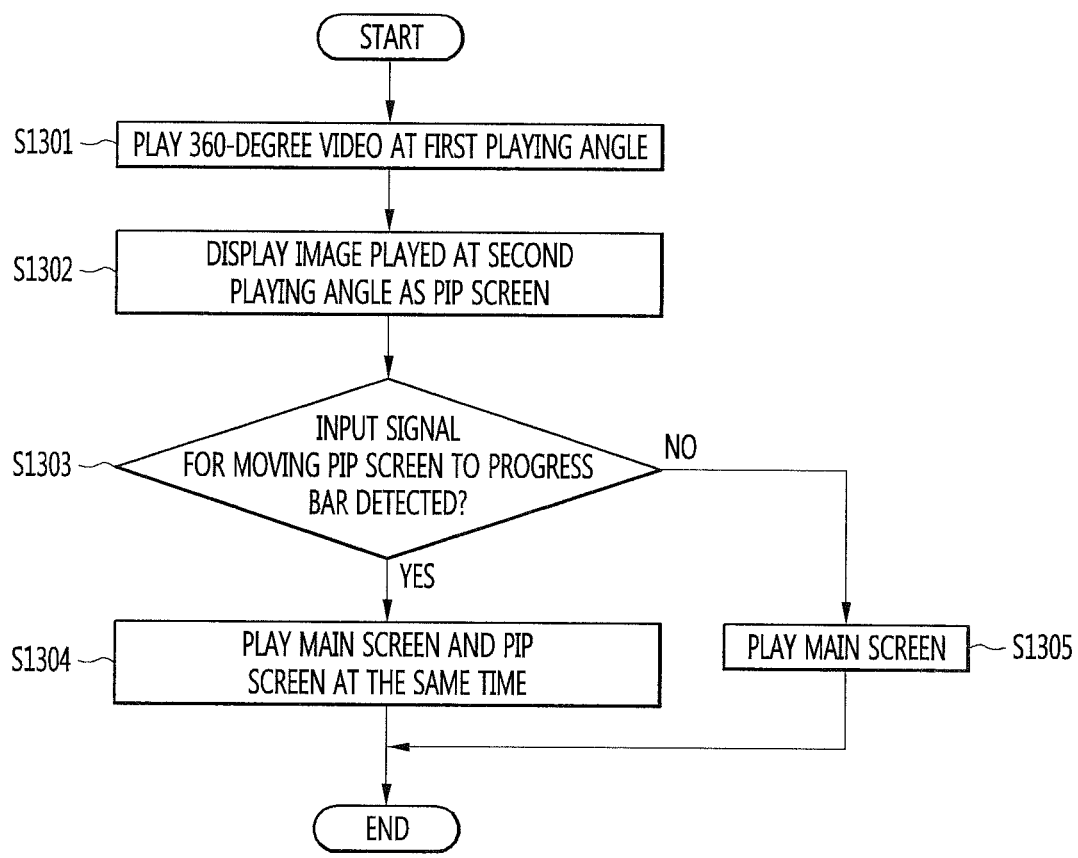
FIG. 13 is a flowchart illustrating a process for playing an image at a recommended playing angle during the playback of a 360-degree video by a mobile terminal according to an embodiment of the present invention.

FIG. 13 is a flowchart illustrating a process for playing an image at a recommended playing angle during the playback of a 360-degree video by a mobile terminal according to an embodiment of the present invention.

The mobile terminal 100 plays a 360-degree video at a first playing angle in operation S1301.

Herein, the first playing angle may correspond to a predetermined playing angle selected by an input signal.

The mobile terminal 100 displays an image played at a second playing angle as a PIP screen in operation S1302.

The second playing angle may be different from the first playing angle. The second playing angle may be one of an optimized viewing angle, a playing angle at which a specific object is displayed, and a proper viewing angle.

There may be a plurality of second playing angles. In this case, the mobile terminal 100 may display a plurality of PIP screens that respectively correspond to the plurality of second playing angles.

The mobile terminal 100 determines whether an input signal for moving a PIP screen to a progress bar is detected in operation S1303.

The progress bar may be an identifier for displaying a progressing degree of an image in playback. The progress bar may include a time point indicator. Herein, the time point indicator may represent the playback time of a 360-degree video.

Herein; an input signal for moving a PIP screen to a progress bar may include various types of touches such as short (or tap) touch, long touch, multi touch, drag touch, flick touch, pinch-in touch, pinch-out touch, swipe touch, and hovering touch on a display area.

If an input signal for moving a PIP screen to a progress bar is detected in operation S1303—Yes, the mobile terminal 100 plays a main screen and a PIP screen at the same time in operation S1304.

In this case, the mobile terminal 100 determines that the input signal for moving a PIP screen to a progress bar is inputted with the intention of playing the PIP screen and plays the PIP screen. Thereby, the main screen and the PIP screen are played simultaneously.

On the other hand, if the input signal for moving a PIP screen to a progress bar is not detected in operation S1303-No, the mobile terminal 100 plays the main screen in operation S1305.

In this case, the mobile terminal 100 determines that there is no intention of playing the PIP screen and does not play the PIP screen. Thereby, only the main screen is played. Thereby, in relation to the PIP screen, an image displayed in operation S1302 is displayed in a still image or thumbnail form.

FIGS. 14A to 14D are views of playing an image at a recommended playing angle during the playback of a 360-degree video by a mobile terminal according to an embodiment of the present invention.

Figure 14A:
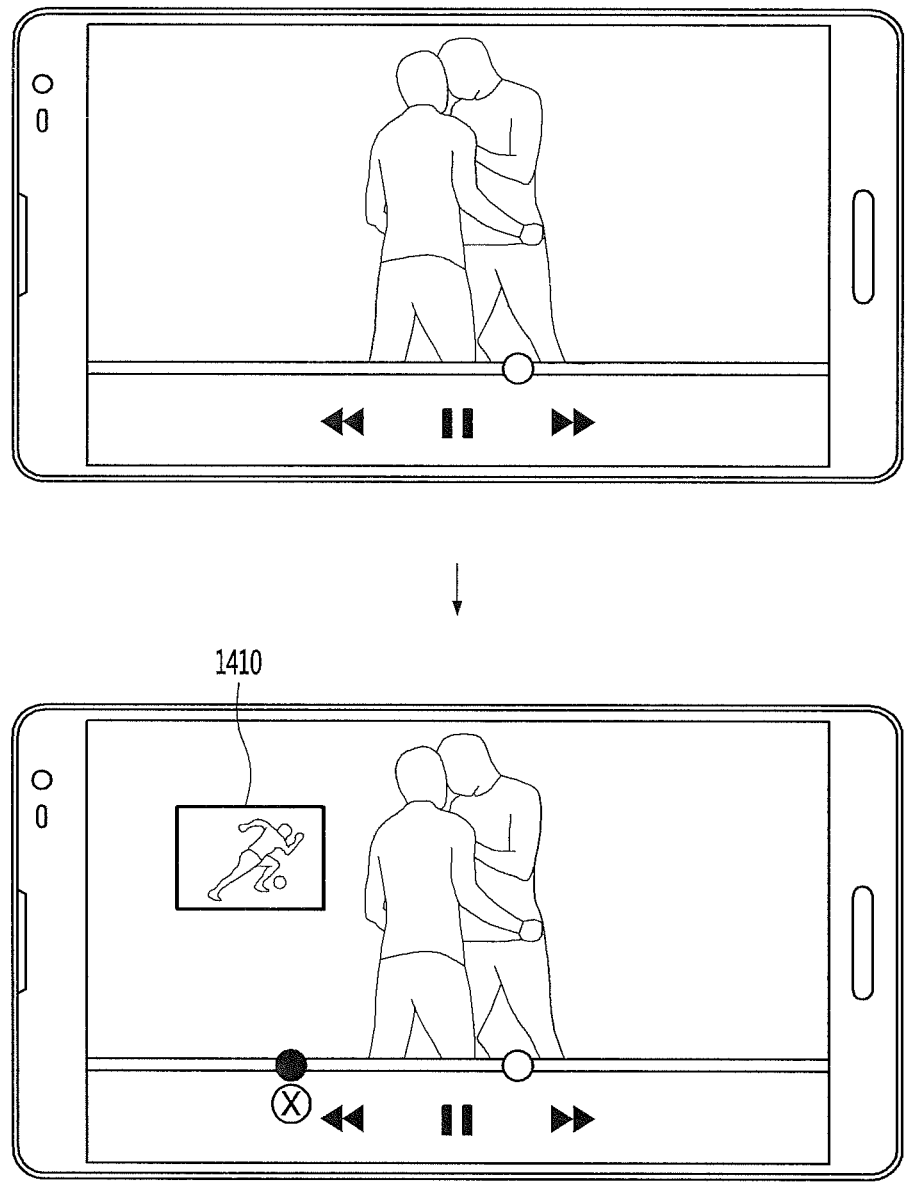

As shown in FIG. 14A, when a 360-degree video is played at a predetermined playing angle and a predetermined time elapses, an image at an angle that a user misses is displayed.

The mobile terminal 100 may display the missed-angle image as PIP screen. The missed-angle image may be an image that is played past from the current time point. In this case, an image displayed on a PIP screen may be displayed in a still image or thumbnail form.

When displaying a PIP screen, the mobile terminal 100 may display a time point indicator corresponding to the PIP screen on a progress bar. Herein, the time point indicator may represent the playback time of an image.

As shown in FIG. 14A, the mobile terminal 100 displays an image at a predetermined playing angle in a 360-degree video. When an image is played at a predetermined playing angle for a predetermined time, an image displayed at another playing angle is missed and past. Accordingly, the mobile terminal 100 displays a missed-angle image, that is, an image at a past time point of kicking a soccer ball, as a PIP screen 1410.

Before the PIP screen 1410 is displayed, only a time point indicator corresponding to a main screen is displayed on a progress bar. After the PIP screen 1410 is displayed, a time point indicator corresponding to the PIP screen 1410 may be displayed on the progress bar in addition to the time point indicator corresponding to the main screen. The time point indicator corresponding to each of the main screen and the PIP screen 1410 is described later with reference to FIG. 15A.

FIG. 14B illustrates a process of moving a PIP screen to a progress bar and playing the PIP screen.

The mobile terminal 100 may display the main screen and PIP screen 1410 for a 360-degree image.

An image played at a predetermined playing angle is displayed on the main screen. In this case, since the main screen is played continuously, as a time elapses, a displayed image is changed. Additionally, as a time elapses, a time point indicator corresponding to the main screen is moved to the right.

A missed-angle image is displayed on the PIP screen 1410. In this case, since the PIP screen 1410 is in a stop state, a still image at a predetermined angle missed at a certain past time point is displayed. Accordingly, even when a time elapses, the displayed image is not changed and the position of a time point indicator corresponding to the PIP screen 1410 is not also moved.

If the PIP screen 1410 is moved to the position of a progress bar, the PIP screen 1410 may be played. In this case, the main screen and the PIP screen 1410 are played simultaneously.

Referring to FIG. 14B, an image played at a predetermined playing angle is displayed on the main screen and an image at a predetermined angle missed at a certain past time point is displayed on the PIP screen 1410. In this state, the PIP screen 1410 is moved to the progress bar in correspondence to an input signal.

In this case, the main screen and the PIP screen 1410 disposed on the progress bar may be played simultaneously.

The main screen is played continuously. Therefore, while the PIP screen 1410 is moved, a displayed image is changed and a time point indicator corresponding to the main screen is moved to the right.

Since the PIP screen 1410 is in a stop state, a still image at a predetermined angle missed at a certain past time point is displayed continuously. Additionally, a time point indicator corresponding to the PIP screen 1410 is not moved. However, when the PIP screen 1410 is disposed on the progress bar, it starts to be played. Accordingly, when a predetermined time elapses in this state, a displayed image is changed and a time point indicator corresponding to the PIP screen 1410 is moved to the right.

When the PIP screen 1410 is out of the progress bar, the PIP screen 1410 is stopped. In this case, only the main screen is played.

Figure 14C:
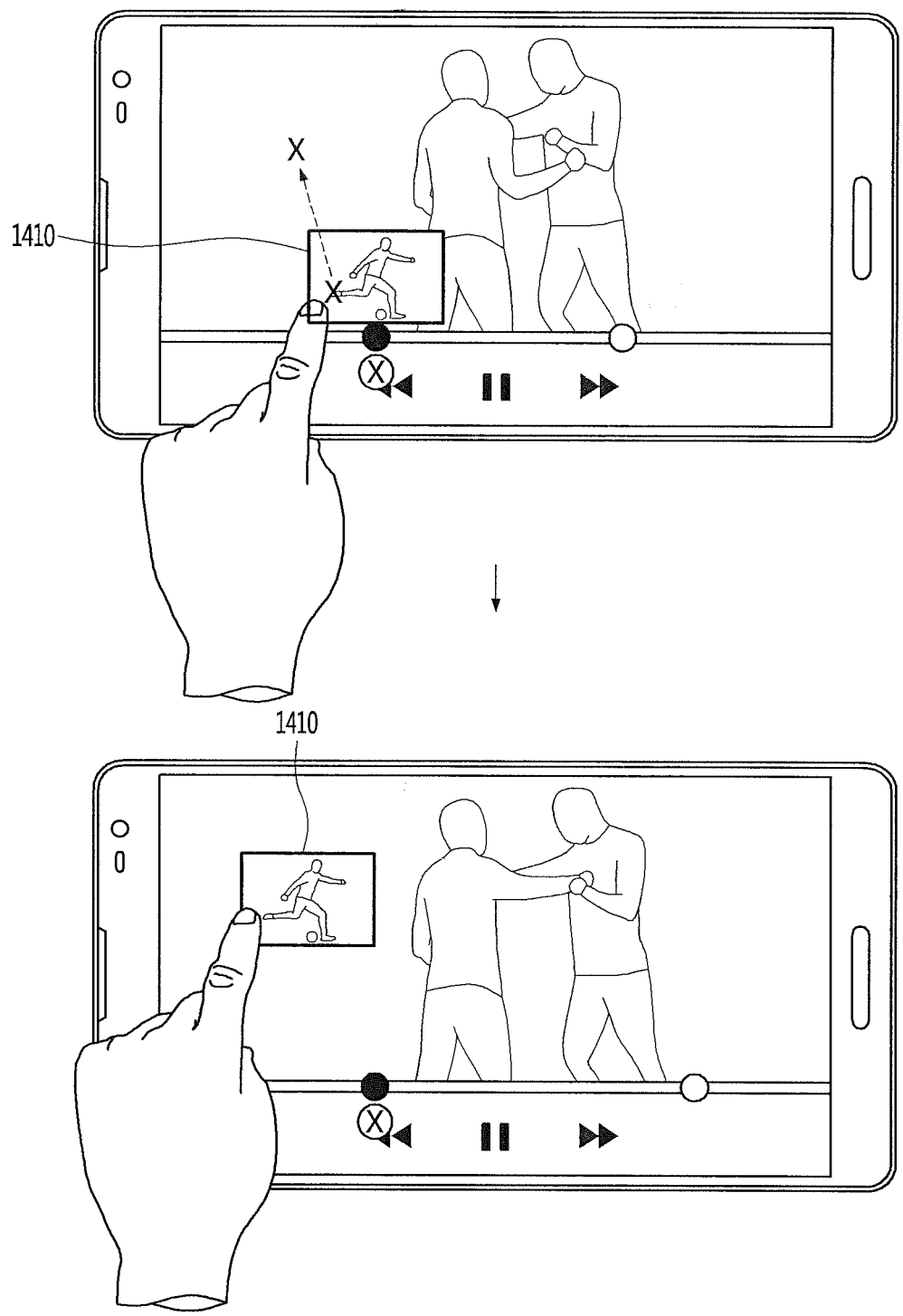

Referring to FIG. 14C, an image played at a predetermined playing angle is displayed on the main screen and an image played at a predetermined angle missed at a certain past time point is displayed on the PIP screen 1410. In above state, a user may drag the PIP screen 1410 and dispose it on the main screen. In this case, the PIP screen 1410 leaves the progress bar and moves to the main screen in correspondence to an input signal.

In this case, the PIP screen 1410 is stopped and only the main screen is played.

In more detail, the main screen is played continuously. Accordingly, while the PIP screen 1410 is moved to the main screen, an image displayed on the main screen is changed and a time point indicator corresponding to the main screen is moved to the right.

The PIP screen 1410 is stopped at a time point of leaving the progress bar. Accordingly, a still image at a time point of leaving the progress bar is continuously displayed on the PIP screen 1410. Additionally, a time point indicator corresponding to the PIP screen 1410 is not moved.

The size of the PIP screen 1410 may be enlarged or reduced.

Referring to FIG. 14D, the size of the PIP screen 1410 is enlarged in correspondence to an input signal. When the size of the PIP screen 1410 is enlarged, an image displayed on the PIP screen 1410 may be enlarged or displayed in more detail.

Moreover, although not shown in FIG. 14D, the size of the PIP screen 1410 may be reduced in such a similar way.

Figure 15C:
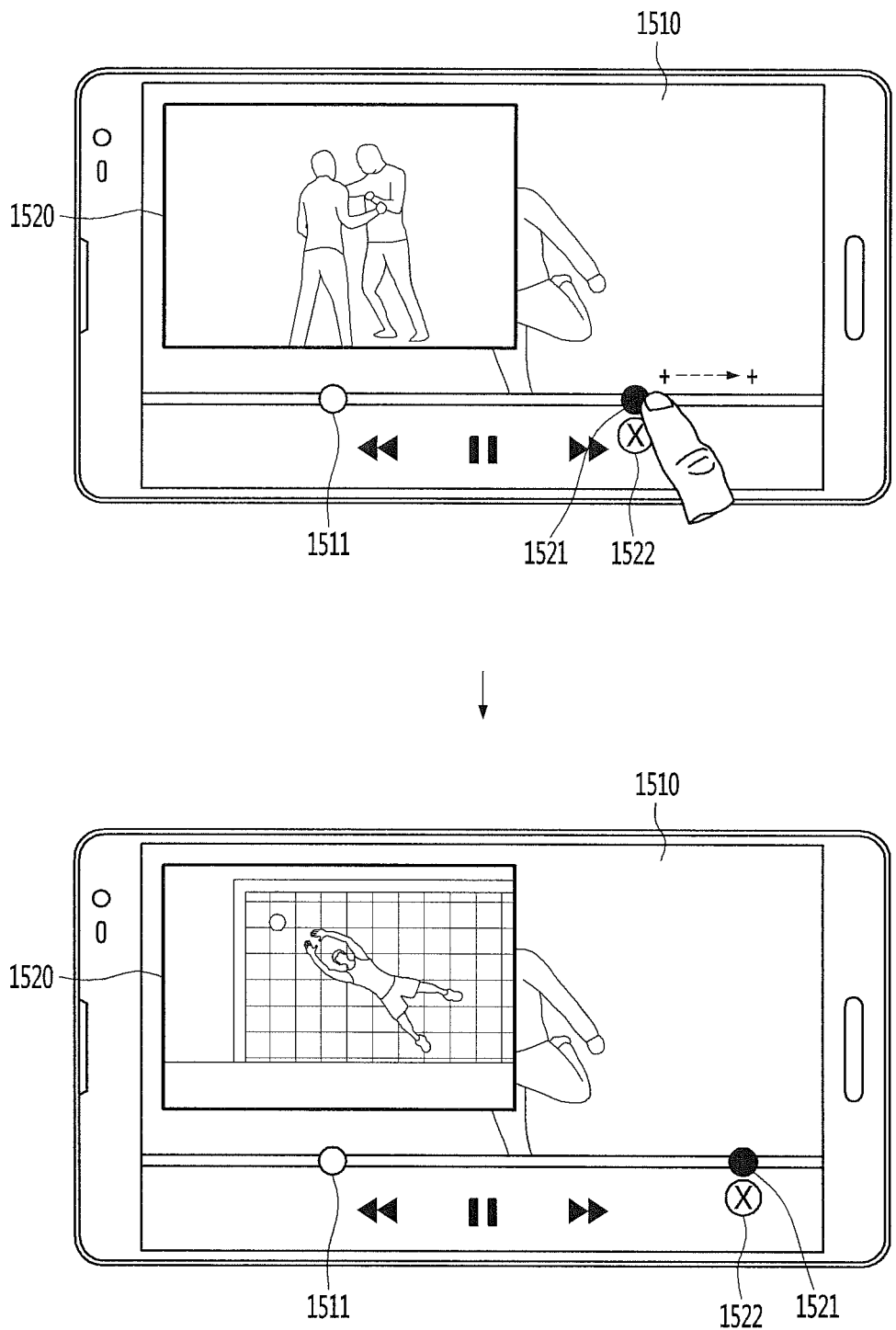

FIGS. 15A to 15C are views of playing an image at a recommended playing angle during the playback of a 360-degree video by a mobile terminal according to an embodiment of the present invention.

FIG. 15A illustrates a case of adjusting a playing angle in a PIP screen.

The mobile terminal 100 may display an image at an optimized viewing angle missed during playback as a PIP screen 1520. An image displayed on the PIP screen 1520 may be an image that is played past from the current time point.

When displaying the PIP screen 1520, the mobile terminal 100 may display a time point indicator 1521 corresponding to the PIP screen 1520 and an end indicator 1522 on a progress bar.

When the time point indicator 1521 corresponding to the PIP screen 1520 is moved to the left/right on the progress bar, in correspondence thereto, the playback time of the PIP screen 1520 may be changed. Thereby, an image displayed on a PIP screen 1520 may be changed.

The end indicator 1522 may end the PIP screen 1520.

The playing angle of the PIP screen 1520 may be adjusted in correspondence to an input signal. When the playing angle is adjusted, the mobile terminal 100 may display an image displayed at the adjusted playing angle on the PIP screen 1520.

Moreover, the current 360-degree video is played at a predetermined playing angle. In this case, the mobile terminal 100 may display an image corresponding to a predetermined playing angle on a main screen 1510. When an image is displayed on the main screen 1510, the mobile terminal 100 may display a time point indicator 1511 corresponding to the main screen 1510 on the progress bar.

When the time point indicator 1511 corresponding to the main screen 1510 is moved to the left/right on the progress bar, in correspondence thereto, the playback time of the main screen may be changed. Thereby, an image displayed on the main screen 1510 may be changed.

In FIG. 15A, the mobile terminal 100 displays the main screen 1510 for displaying an image played at a predetermined playing angle and the PIP screen 1520 for displaying a missed image at an optimized viewing angle.

In this case, in correspondence to an input signal, the playing angle of the PIP screen 1520 may be changed. Since the PIP screen 1520 is in a stop state, in relation to an image displayed on the PIP screen 1520, only a playing angle at the same time point is adjusted and a playback time is not changed. Accordingly, the time point indicator 1521 corresponding to the PIP screen 1520 is not moved on the progress bar.

Moreover, the main screen 1510 is played continuously. Accordingly, as a time elapses, an image displayed on the main screen 1510 is changed and the time point indicator 1511 corresponding to the main screen 1510 displayed on the progress bar is moved to the right.

As shown in FIG. 15B, a main screen and a PIP screen may be interchanged mutually.

For this, a switch indicator 1523 for providing a swap function between an image of the main screen 1510 and an image of the PIP screen 1520 may be displayed on the PIP screen 1520. When an input signal for selecting the switch indicator 1523 is detected, the mobile terminal 100 displays an image played on the main screen 1510, on the PIP screen 1520 and an image displayed on the PIP screen 1520, on the main screen 1510.

When the image of the main screen 1510 and the image of the PIP screen 1520 are mutually switched, in correspondence thereto, the position of the time point indicator 1511 corresponding to the main screen 1510 and the position of the time point indicator 1521 corresponding to the PIP screen 1520 may be switched mutually. In this case, the end indicator 1522 of the PIP screen 1520 may be displayed together at a position where the time point indicator 1521 corresponding to the PIP screen 1520 is displayed.

Referring to FIG. 15B, an image played at a predetermined playing angle is displayed on the main screen 1510 and a missed image at an optimized viewing angle is displayed on the PIP screen 1520.

In this state, an input signal for selecting the switch indicator 1523 is detected. In this case, a playback image displayed on the main screen 1510 is displayed on the PIP screen 1520 and continuously played. An image displayed on the PIP screen 1520 is displayed on the main screen 1510.

Since an image displayed on the PIP screen 1520 is in a stop state, a stop image is displayed on the main screen 1510.

Additionally, in correspondence thereto, the position of the time point indicator 1511 corresponding to the main screen 1510 and the position of the time point indicator 1521 corresponding to the PIP screen 1520 are switched mutually.

In such a way, an image of the main screen 1510 and an image of the PIP screen 1520 may be switched mutually. Thereby, a user may watch an image that the user currently watches and an image that the user misses by using a desired screen among the main screen 1510 and the PIP screen 1520.

When the time point indicators 1511 and 1521 respectively corresponding to the main screen 1510 and the PIP screen 1520 are manipulated, the playback times of the main screen 1510 and the PIP screen 1520 may be changed. In more detail, the time point indicators 1511 and 1521 may be moved in the left or right direction on the progress bar. When the time point indicators 1511 and 1521 are moved to the right direction on the progress bar, the playback time is moved forward and when the time point indicators 1511 and 1521 are moved to the left direction, the playback time is moved backward. In this case, the mobile terminal 100 displays an image displayed at a changed playback time on the corresponding main screen 1510 and PIP screen 1520.

As shown in FIG. 15C, the time point indicator 1521 corresponding to the PIP screen 1520 is moved to the right direction on the progress bar. Thereby, the playback time of an image displayed on the PIP screen 1520 is moved forward and accordingly, an image played at a forward playback time is displayed. The playback time of the main screen 1510 may be adjusted in a similar way.

Moreover, in this case, since a still image is displayed on the main screen 1510, an image displayed on the main screen 1510 is not changed and the time point indicator 1511 corresponding to the main screen 1510 is not moved on the progress bar.

By manipulating a time point indicator in such a way, a user may check a missed image at an optimized viewing angle or a playback time. Additionally, a missed image at an optimized viewing angle is switched to a main screen and in this state, it is possible to check an image or a playback time.

Recommendation of Image During Playing Angle Change of Content

Figure 16:
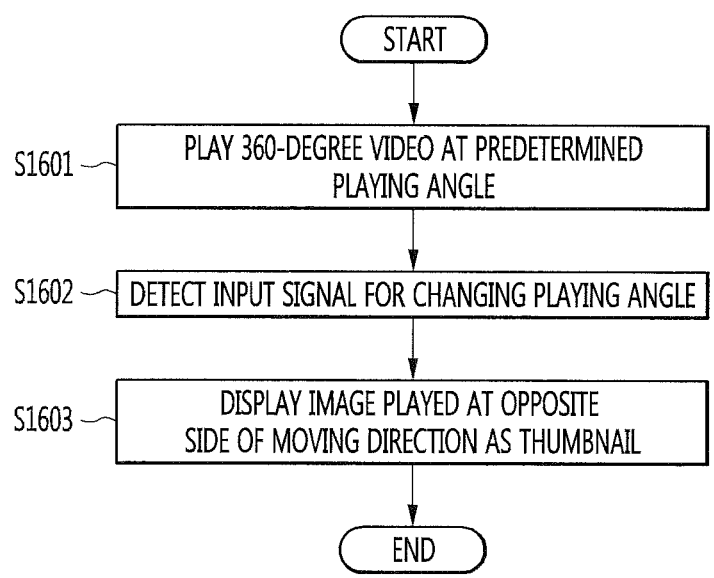
FIG. 16 is a flowchart illustrating a process for recommending an image during a playing angle change of a 360-degree video by a mobile terminal according to an embodiment of the present invention.

FIG. 16 is a flowchart illustrating a process for recommending an image during a playing angle change of a 360-degree video by a mobile terminal according to an embodiment of the present invention.

When a playing angle is changed and a screen is moved during the playback of a 360-degree video, the mobile terminal 100 may display an image played at the opposite side of a direction that the screen is moved in a thumbnail form. The image of a thumbnail form may be displayed at the opposite side of a screen moving direction.

In such a way, when a playing angle is changed and a screen is moved, an image in a thumbnail form may be displayed in one of an upper end area, lower end area, left area, and right area of a screen. When an image displayed at the opposite side of a moving direction is displayed in a thumbnail form, a user may obtain the field of view broader based on a thumbnail image.

The mobile terminal 100 plays a 360-degree video at a predetermined playing angle in operation S1601.

The mobile terminal 100 detects an input signal for changing a playing angle in operation S1602.

An input signal for changing a playing angle may include various types of touches such as short (or tap) touch, long touch, multi touch, drag touch, flick touch, pinch-in touch, pinch-out touch, swipe touch, and hovering touch on a touch area.

The mobile terminal 100 displays an image played at the opposite side of a moving direction in a thumbnail in operation S1603.

An image played at the opposite side of a screen moving direction may be displayed in a thumbnail form. In more detail, when a screen is moved from the left direction to the right direction, an image shown in the left direction may be displayed, and when a screen is moved from the right direction to the left direction, an image shown in the right direction may be displayed. Additionally, when a screen is moved from the top direction to the bottom direction, an image shown in the top direction may be displayed, and when a screen is moved from the bottom direction to the top direction, an image shown in the bottom direction may be displayed.

The image of a thumbnail form may be displayed at the opposite side of a screen moving direction. In more detail, when a screen is moved from the left direction to the right direction, an image in a thumbnail form is displayed in the left direction, and when a screen is moved from the right direction to the left direction, an image in a thumbnail form may be displayed in the right direction. Additionally, when a screen is moved from the top direction to the bottom direction, an image may be displayed in the top direction, and when a screen is moved from the bottom direction to the top direction, an image may be displayed in the bottom direction.

FIGS. 17A to 17E are views of recommending an image during a playing angle change of a 360-degree video by a mobile terminal according to an embodiment of the present invention.

Figure 17B:
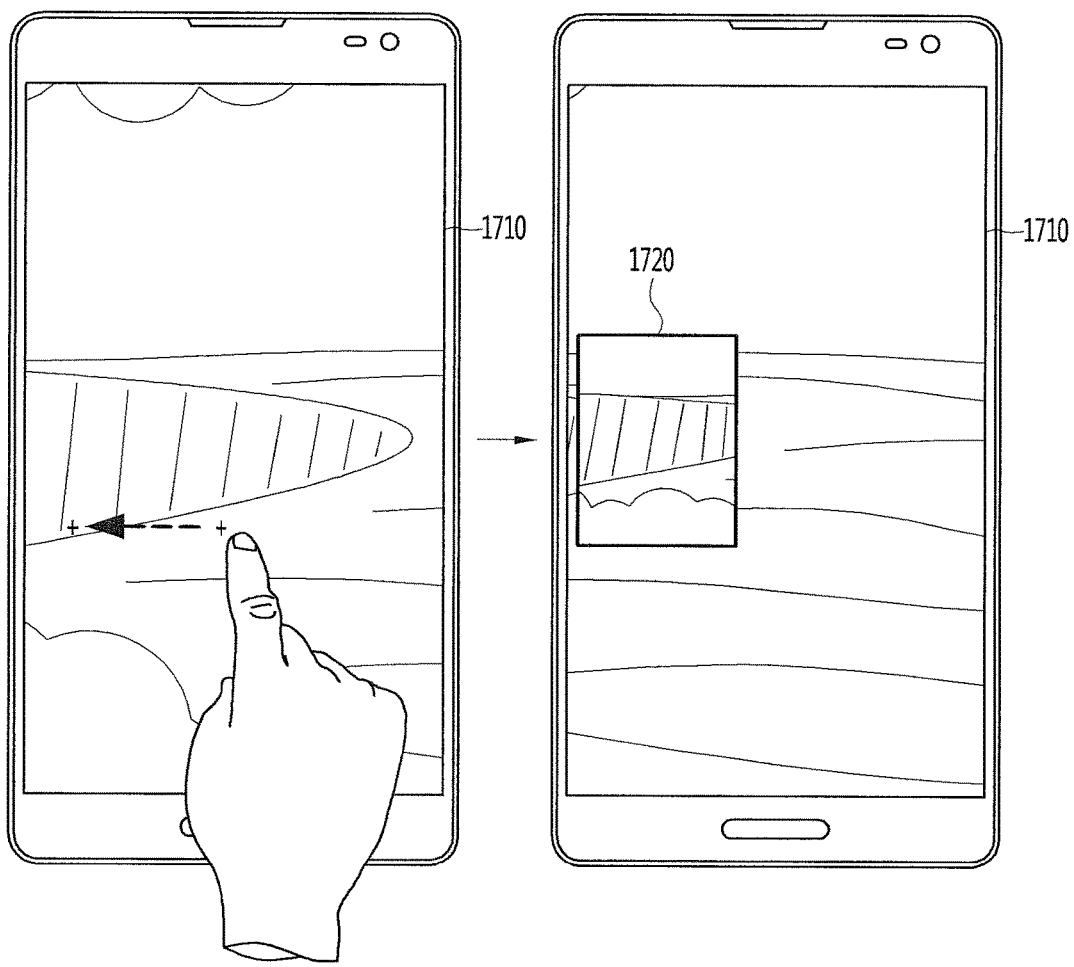

FIG. 17A illustrates a 360-degree video and a predetermined playback area of the 360-degree video displayed on the mobile terminal 100. The 360-degree video shown at the top is identical to that shown in FIG. 5C. Currently, the second playback area 522 of such a 360-degree video is displayed on the screen 1710 of the mobile terminal 100. Hereinafter, for convenience of description, it is assumed in FIGS. 17B to 17E that an image played at a playing angle corresponding to the second playback area 522 is displayed on the screen 1710 of the mobile terminal 100 currently.

When the screen 1710 of the mobile terminal 100 is moved from the left direction to the right direction, the mobile terminal 100 may display an image shown in the left direction in a thumbnail form. In more detail, as shown in FIG. 17B, when an input signal for swiping a 360-degree image from the right to the left is detected, the screen of the mobile terminal 100 is moved from the left direction to the right direction. When the screen is moved to the right direction, an image shown in the left direction is displayed as a thumbnail 1720 in the screen left direction. Thereby, even when the screen 1710 is moved in the right direction and an image shown in the left direction cannot be seen, a user may watch an image shown in the left direction based on a thumbnail image.

Figure 17C:
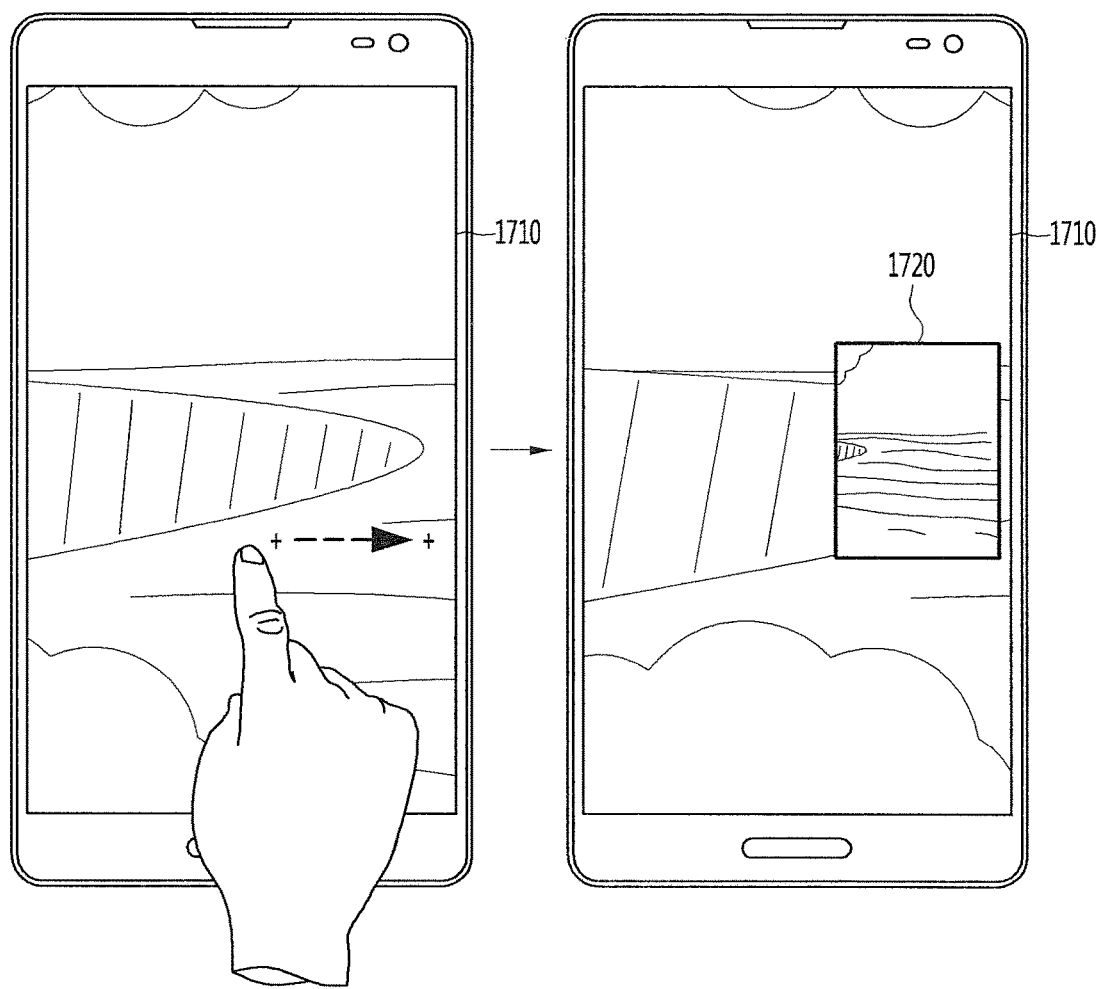

When the screen 1710 of the mobile terminal 100 is moved from the right direction to the left direction, the mobile terminal 100 may display an image shown in the right direction in a thumbnail form. In more detail, as shown in FIG. 17C, when an input signal for swiping a 360-degree image from the left to the right is detected, the screen of the mobile terminal 100 is moved from the right direction to the left direction. When the screen is moved to the left direction, an image shown in the right direction is displayed as a thumbnail 1720 in the screen right direction. Thereby, even when the screen 1710 is moved in the left direction and an image shown in the right direction cannot be seen, a user may watch an image shown in the right direction based on a thumbnail image.

Figure 17D:
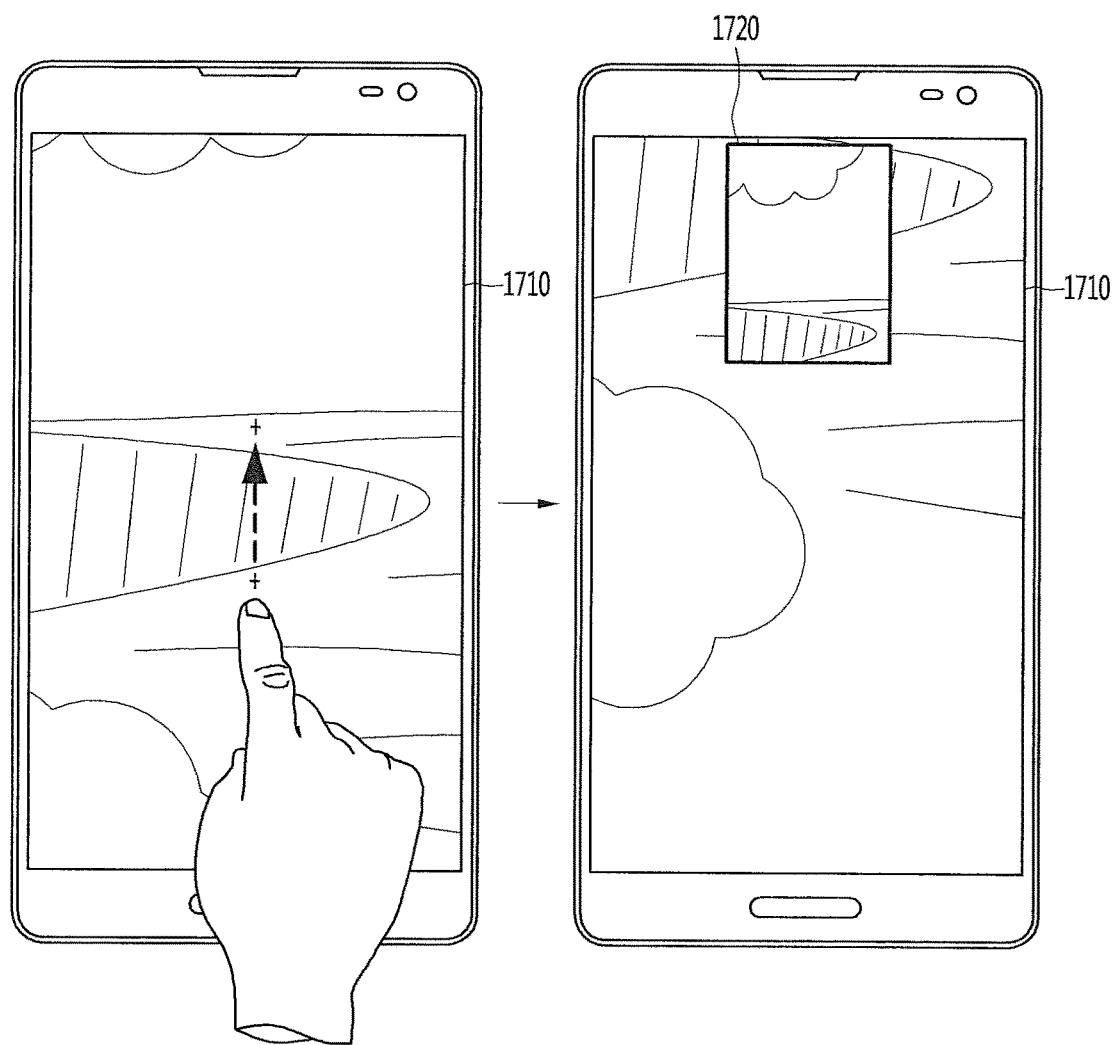

When the screen 1710 of the mobile terminal 100 is moved from the top direction to the bottom direction, the mobile terminal 100 may display an image shown in the top direction in a thumbnail form. In more detail, as shown in FIG. 17D, when an input signal for swiping a 360-degree image from the bottom direction to the top direction is detected, the screen of the mobile terminal 100 is moved from the top direction to the bottom direction. When the screen is moved to the bottom direction, an image shown in the top direction is displayed as a thumbnail 1720 in the screen top direction. Thereby, even when the screen 1710 is moved in the bottom direction and an image shown in the top direction cannot be seen, a user may watch an image shown in the top direction based on a thumbnail image.

Figure 17E:
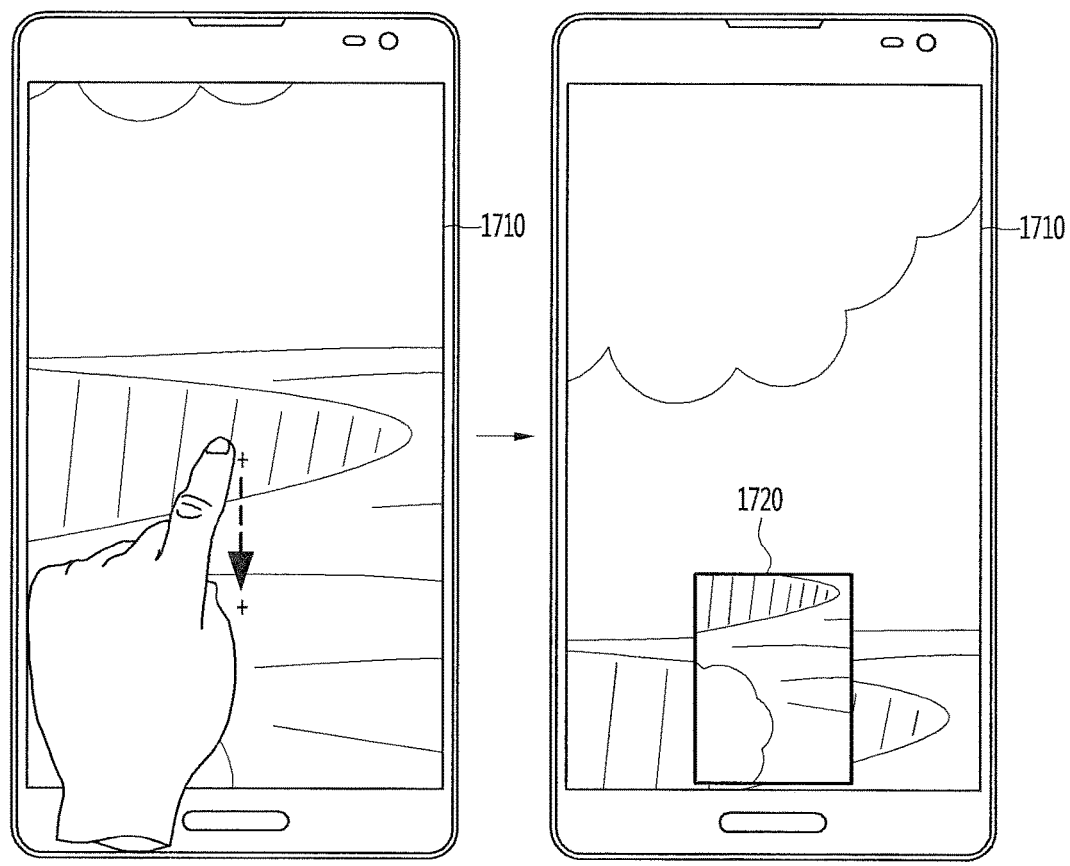

When the screen 1710 of the mobile terminal 100 is moved from the bottom direction to the top direction, the mobile terminal 100 may display an image shown in the bottom direction in a thumbnail form. In more detail, as shown in FIG. 17E, when an input signal for swiping a 360-degree image from the top direction to the bottom direction is detected, the screen of the mobile terminal 100 is moved from the bottom direction to the top direction. When the screen is moved to the top direction, an image shown in the bottom direction is displayed as a thumbnail 1720 in the screen bottom direction. Thereby, even when the screen 1710 is moved in the top direction and an image shown in the bottom direction cannot be seen, a user may watch an image shown in the bottom direction based on a thumbnail image.

Generation of Thumbnail or PIP Screen During Content Playback

Figure 18A:
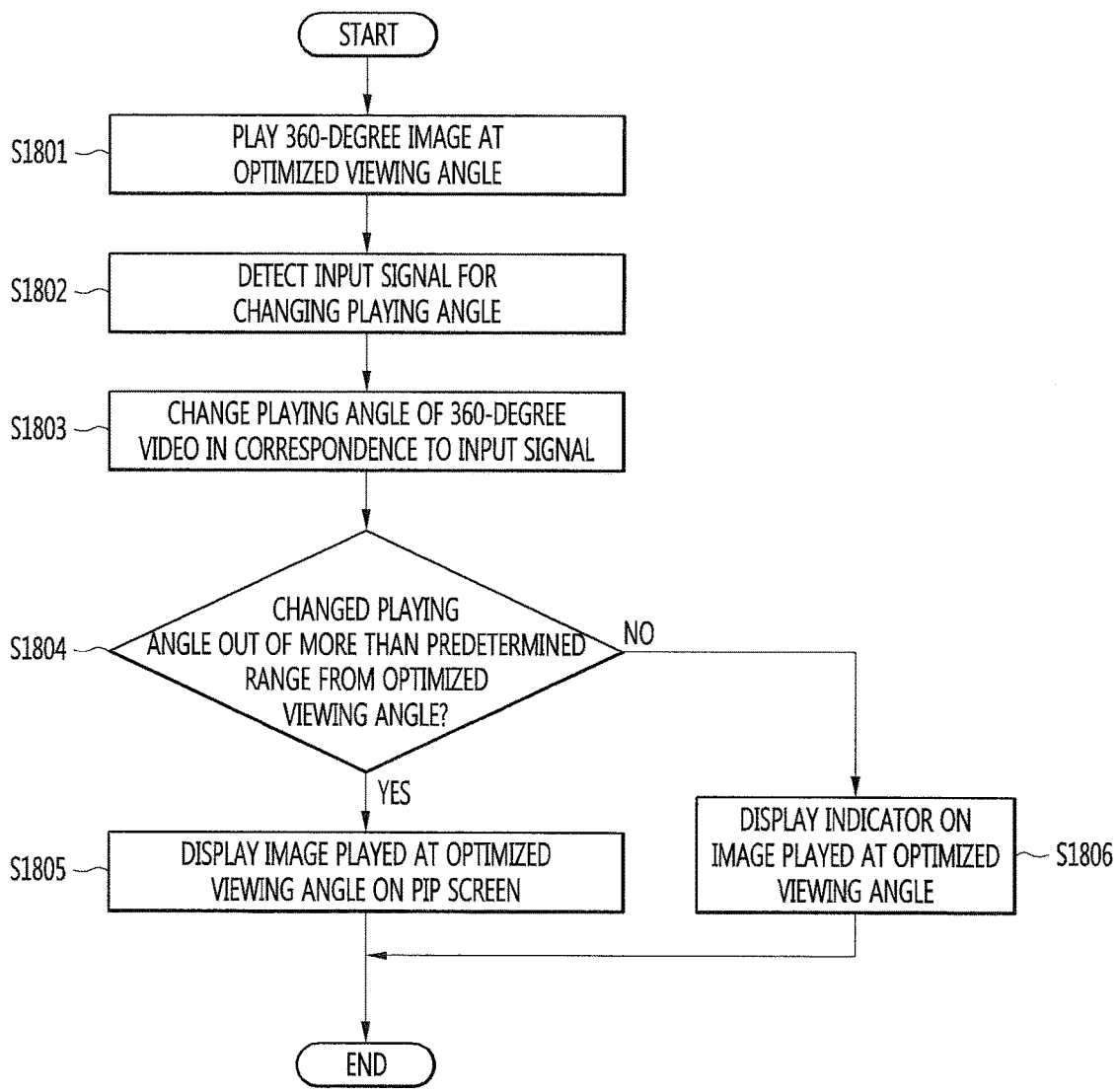
FIG. 18A is a flowchart illustrating a process for generating a thumbnail or a PIP screen during a playing angle change of a 360-degree video by a mobile terminal according to an embodiment of the present invention.

FIG. 18A is a flowchart illustrating a process for generating a thumbnail or a PIP screen during a playing angle change of a 360-degree video by a mobile terminal according to an embodiment of the present invention.

When the playing angle of a 360-degree video is changed, the mobile terminal 100 may display an indicator or a PIP screen on the basis of a degree that the changed playing angle is out of an optimized viewing angle. In more detail, when the changed playing angle is within a predetermined range from an optimized viewing angle, only an indicator is displayed to allow a user to recognize this, and when the changed playing angle is more than a predetermined range from an optimized viewing angle, a PIP screen is displayed to allow a user to watch an image that is not displayed on a main screen.

The mobile terminal 100 plays a 360-degree video at an optimized viewing angle in operation S1801.

The mobile terminal 100 detects an input signal for changing a playing angle in operation S1802.

Herein, an input signal for changing a playing angle may include various types of touches such as short (or tap) touch, long touch, multi touch, drag touch, flick touch, pinch-in touch, pinch-out touch, swipe touch, and hovering touch on a touch area.

The mobile terminal 100 may change the playing angle of a 360-degree video in correspondence to an input signal in operation S1803.

The mobile terminal 100 determines whether the changed playing angle is out of a predetermined range from an optimized viewing angle in operation S1804.

When it is determined in operation that the changed playing angle is out of a predetermined range from an optimized viewing angle in operation S1804—Yes, the mobile terminal 100 displays an image played at an optimized viewing angle in a PIP screen in operation S1805.

In more detail, when the changed playing angle is out of a predetermined range from an optimized viewing angle, an image played at an optimized viewing angle may not be displayed on the main screen of the mobile terminal 100. Accordingly, in this case, the mobile terminal 100 may display an image played at an optimized viewing angle on a PIP screen to allow a user to watch it.

On the other hand, when it is not determined in operation S1804—No that the changed playing angle is out of a predetermined range from an optimized viewing angle, the mobile terminal 100 displays an indicator on an image played at an optimized viewing angle in operation S1806.

In more detail, when the changed playing angle is within a predetermined range from an optimized viewing angle, an image played at an optimized viewing angle may be displayed at a portion of the screen of the mobile terminal 100. Accordingly, in this case, the mobile terminal 100 may display an indicator on an image played at an optimized viewing angle to notify this to a user.

A specific example for displaying an indicator and a PIP screen is described with reference to FIG. 19.

Figure 19:
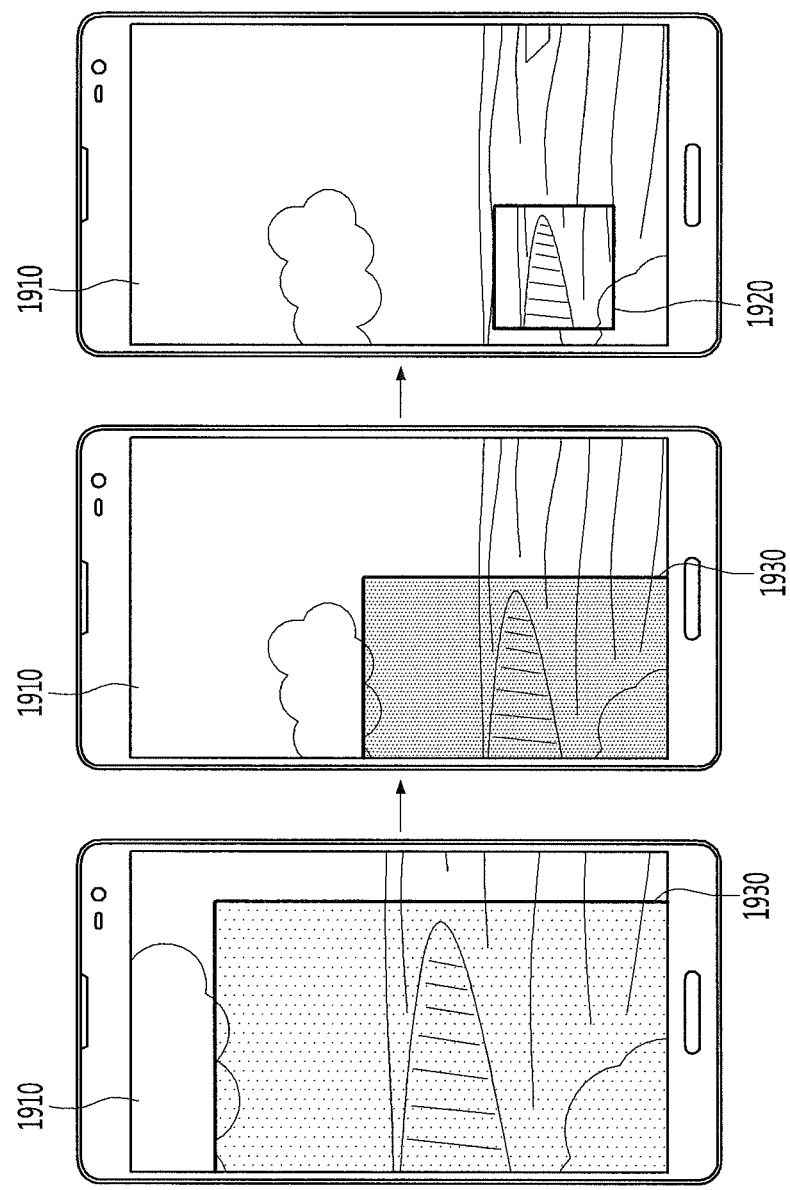
FIG. 19 is a view of generating a thumbnail or a PIP screen during a playing angle change of a 360-degree video by a mobile terminal according to an embodiment of the present invention.

FIG. 19 is a view of generating a thumbnail or a PIP screen during a playing angle change of a 360-degree video by a mobile terminal according to an embodiment of the present invention.

The main screen 1910 of the mobile terminal 100 may include an image played at an optimized viewing angle. In more detail, an image played at an optimized viewing angle may be displayed in a partial area of the main screen 1910 and an image played at a playing angle out of an optimized viewing angle may be displayed in the remaining area.

In this case, a visual effect may be given to an image played at an optimized viewing angle in order to allow a user to recognize an area for the image played at the optimized viewing angle. In more detail, a shade may be displayed on an image played at an optimized viewing angle, or a glow effect may be given, or the boundary area of an image may be displayed flickeringly. However, a visual effect is not limited thereto and various modifications are possible according to embodiments.

When an image played at an optimized viewing angle is dragged or the mobile terminal 100 is moved, a playing angle may be changed.

When a playing angle is changed within a predetermined range from an optimized viewing angle, a portion of an image played at an optimized viewing angle is displayed on the main screen of the mobile terminal 100. In this case, a shade may be displayed in an image area 1930 played at an optimized viewing angle. As a playing angle is away from an optimized viewing angle, the shade of the image area 1930 played at an optimized viewing angle may be thicken. Therefrom, a user may easily know a degree of being out of an optimized viewing angle.

When a playing angle is further changed and becomes out of a predetermined range from an optimized viewing angle, the mobile terminal 100 may display an image played at an optimized viewing angle in the form of a PIP screen 1920. When a playing angle is out of more than a predetermined range from an optimized viewing angle, an image played at an optimized viewing angle may not be displayed on a screen. Accordingly, a user may watch an image played at an optimized viewing angle from the PIP screen 1920.

As shown in FIG. 19, a shade is displayed on an image played at an optimized viewing angle. As a playing angle is away from an optimized viewing angle, the shade of an image played at an optimized viewing angle becomes darkened. Then, when a playing angle is out of more than a predetermined range from an optimized viewing angle, the PIP screen 1920 including an image played at an optimized viewing angle is displayed.

Figure 18B:
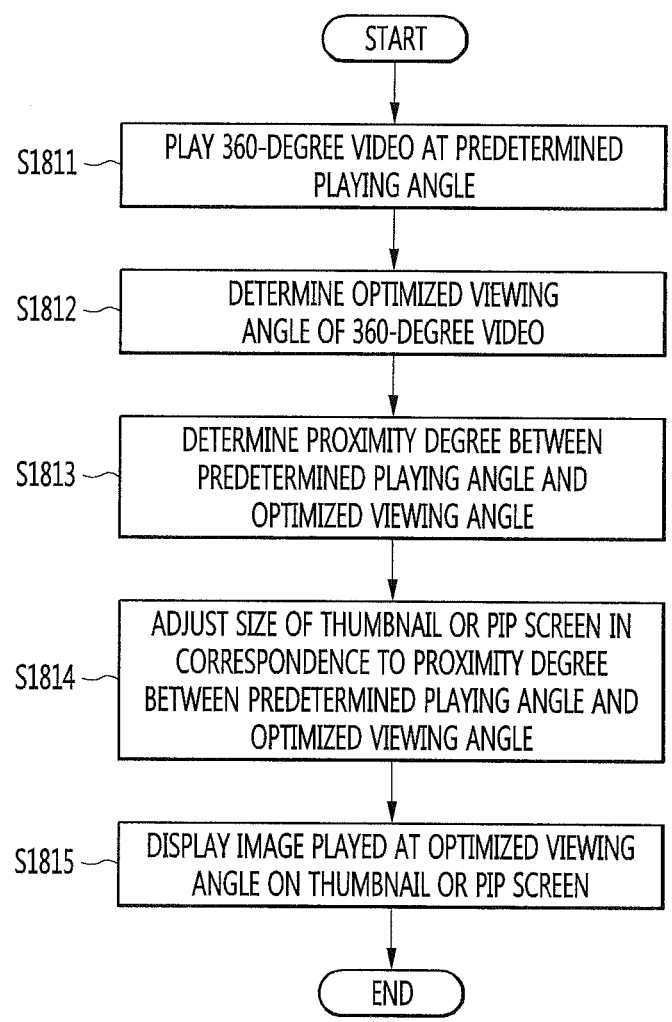
FIG. 18B is a flowchart illustrating a process for changing the size of a thumbnail or a PIP screen according to a viewing angle during a playing angle change of a 360-degree video by a mobile terminal according to an embodiment of the present invention.

Size Change of Thumbnail or PIP Screen According to Viewing Angle During Content Playback FIG. 18B is a flowchart illustrating a process for changing the size of a thumbnail or a PIP screen according to a viewing angle during a playing angle change of a 360-degree video by a mobile terminal according to an embodiment of the present invention.

The size of a thumbnail or PIP screen displayed during a playing angle change of a 360-degree video may be changed according to a viewing angle. In more detail, as a viewing angle is closer to an optimized viewing angle, the size of a thumbnail or a PIP screen becomes larger and as a viewing angle is away from an optimized viewing angle, the size of a thumbnail or a PIP screen becomes smaller.

The mobile terminal 100 plays a 360-degree video at a predetermined playing angle in operation S1811.

The mobile terminal 100 determines the optimized viewing angle of a 360-degree video in operation S1812.

The mobile terminal 100 determines a proximity degree between a predetermined playing angle and an optimized viewing angle in operation S1813.

The mobile terminal 100 adjusts the size of a thumbnail or a PIP screen in correspondence to a proximity degree between a predetermined playing angle and an optimized viewing angle in operation S1814.

The mobile terminal 100 displays an image played at an optimized viewing range on a thumbnail or a PIP screen in operation S1815.

Hereinafter, a specific example for changing the size of a thumbnail or a PIP screen according to a viewing angle is described with reference to FIGS. 20A to 20C.

FIGS. 20A to 20C are views of changing the size of a thumbnail or a PIP screen according to a viewing angle during a playing angle change of a 360-degree video by a mobile terminal according to an embodiment of the present invention.

For convenience of description, it is assumed that a thumbnail is displayed in FIGS. 20A to 20C.

FIG. 20A is a case that a viewing angle overlaps a portion of an optimized viewing angle.

The current viewing angle is a playing angle of a 360-degree video that a user watches currently.

A Suggested angle means an optimized viewing angle.

In this case, the current viewing angle and the Suggested angle overlap by an area a. For example, as shown in FIG. 20A, the current viewing angle and the Suggested angle may overlap within a range of about 0° to about 15°, and the size of the thumbnail 2020 and a PIP screen may be displayed in about 30% of the size of a main screen.

FIG. 20B is a case that there is no area where a viewing angle and an optimized viewing angle overlap and they are spaced by less than a predetermined angle.

The current viewing angle and the Suggested angle have no overlapping area. For example, as shown in FIG. 20B, the current viewing angle and the Suggested angle may be spaced from each other by less than 90°, and in this case, the size of the thumbnail 2020 and a PIP screen may be displayed in about 20% of the size of a main screen.

FIG. 20C is a case that there is no area where a viewing angle and an optimized viewing angle overlap and they are spaced by more than a predetermined angle.

The current viewing angle and the Suggested angle have no overlapping area. For example, as shown in FIG. 20C, the current viewing angle and the Suggested angle may be spaced from each other by more than 90°, and in this case, the size of the thumbnail 2020 and a PIP screen may be displayed in about 10% of the size of a main screen.

In such a way, referring to FIGS. 20A to 20C, as a viewing angle is away from an optimized viewing angle, the size of the thumbnail 2020 or a PIP screen is displayed small. However, the present invention is not limited thereto and as a viewing angle is away from an optimized viewing angle, the size of a thumbnail or a PIP screen may become larger. Additionally, the size of a thumbnail or a PIP screen is just exemplary in FIGS. 20A to 20C, and the size ratio of a thumbnail or a PIP screen to a main screen may be set variously according to an embodiment.

End of Recommended Image During Content Playback

FIGS. 21A to 21D are views of ending a recommended image during the playback of a 360-degree video by a mobile terminal according to an embodiment of the present invention.

When an input signal for ending a recommended image is detected, the mobile terminal 100 may end an image recommended in a thumbnail or PIP screen form.

Herein, an input signal for ending a recommended image may be set through various methods. In more detail, an input signal for ending a recommended image may occur in correspondence to a user's gesture for flicking a recommended image and dragging out of a main screen. Alternatively, the input signal may be a signal for inputting an end button displayed on a recommended image. Furthermore, it is possible to turn on/off the generation period and end of a recommended image through a setting. If there is no such input signals during a specific time, a recommended image may disappear automatically.

For convenience of description, it is assumed that a recommended image is displayed in a PIP screen form in FIGS. 21A to 21D. However, it is apparent to those skilled in the art that a recommended image may be displayed in a thumbnail form.

Figure 21A:
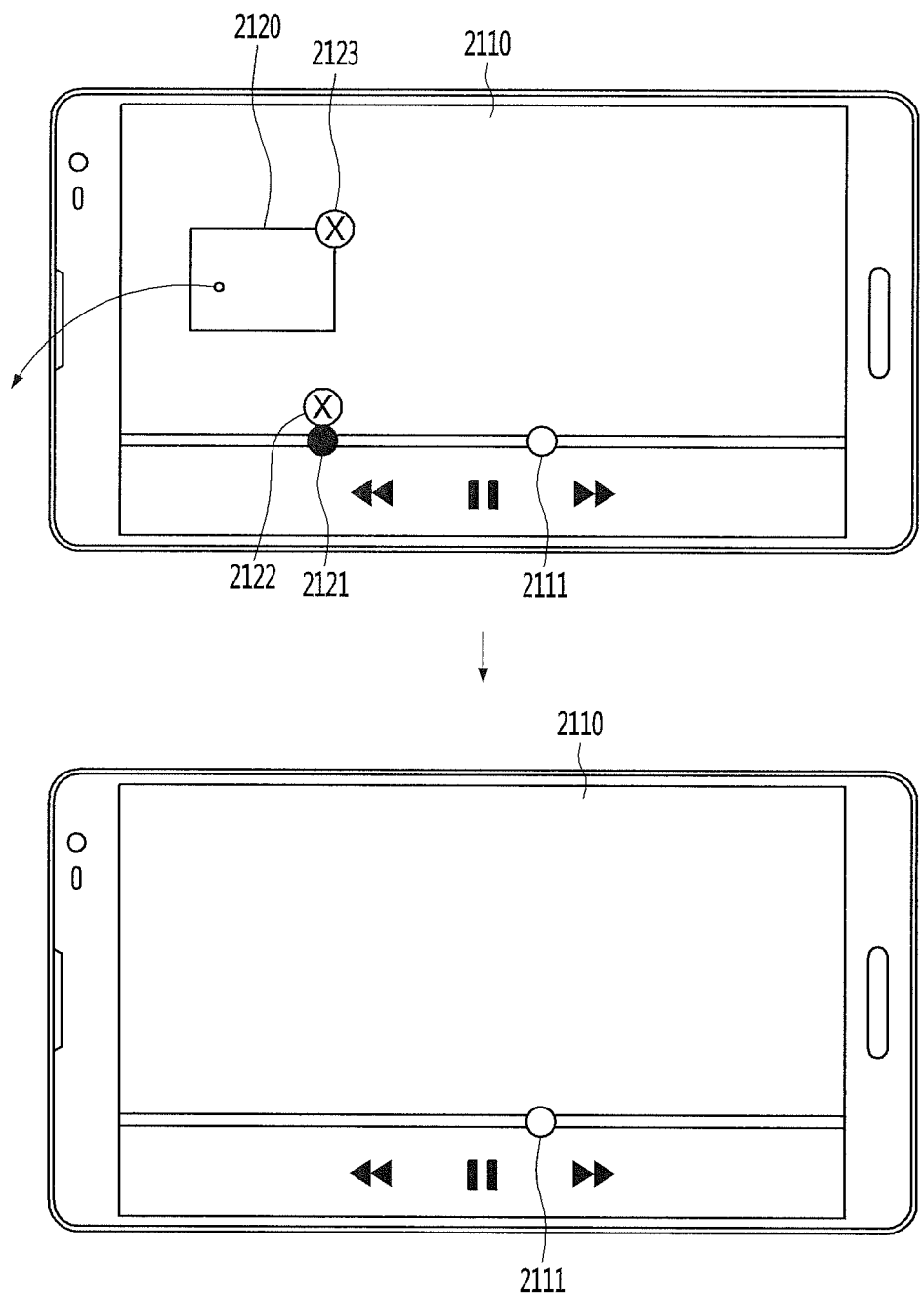
FIGS. 21A to 21D are views of ending a recommended image during the playback of a 360-degree video by a mobile terminal according to an embodiment of the present invention.

As shown in FIG. 21A, a PIP screen 2120 is displayed on a main screen 2110. A time point indicator 2111 corresponding to the main screen 2110 and a time point indicator 2121 corresponding to a PIP screen 2120 are displayed on a progress bar. In this case, an end indicator 2122 for ending the PIP screen 2120 may be displayed on the progress bar and an end button 2123 for ending the PIP screen 2120 may be displayed on the PIP screen 2120.

When an input signal for selecting the end indicator 2122 or the end button 2123 is detected, the PIP screen 2120 may be ended.

Additionally, as shown in FIG. 21A, when an input signal for flicking the PIP screen 2120 and dragging to the left is detected, the mobile terminal 100 may end the PIP screen 2120. In this case, the PIP screen 2120 is removed from the main screen 2110, and the time point indicator 2121 corresponding to the PIP screen 2120, the end indicator 2122, and the end button 2123 disappear from the screen.

Figure 21B:
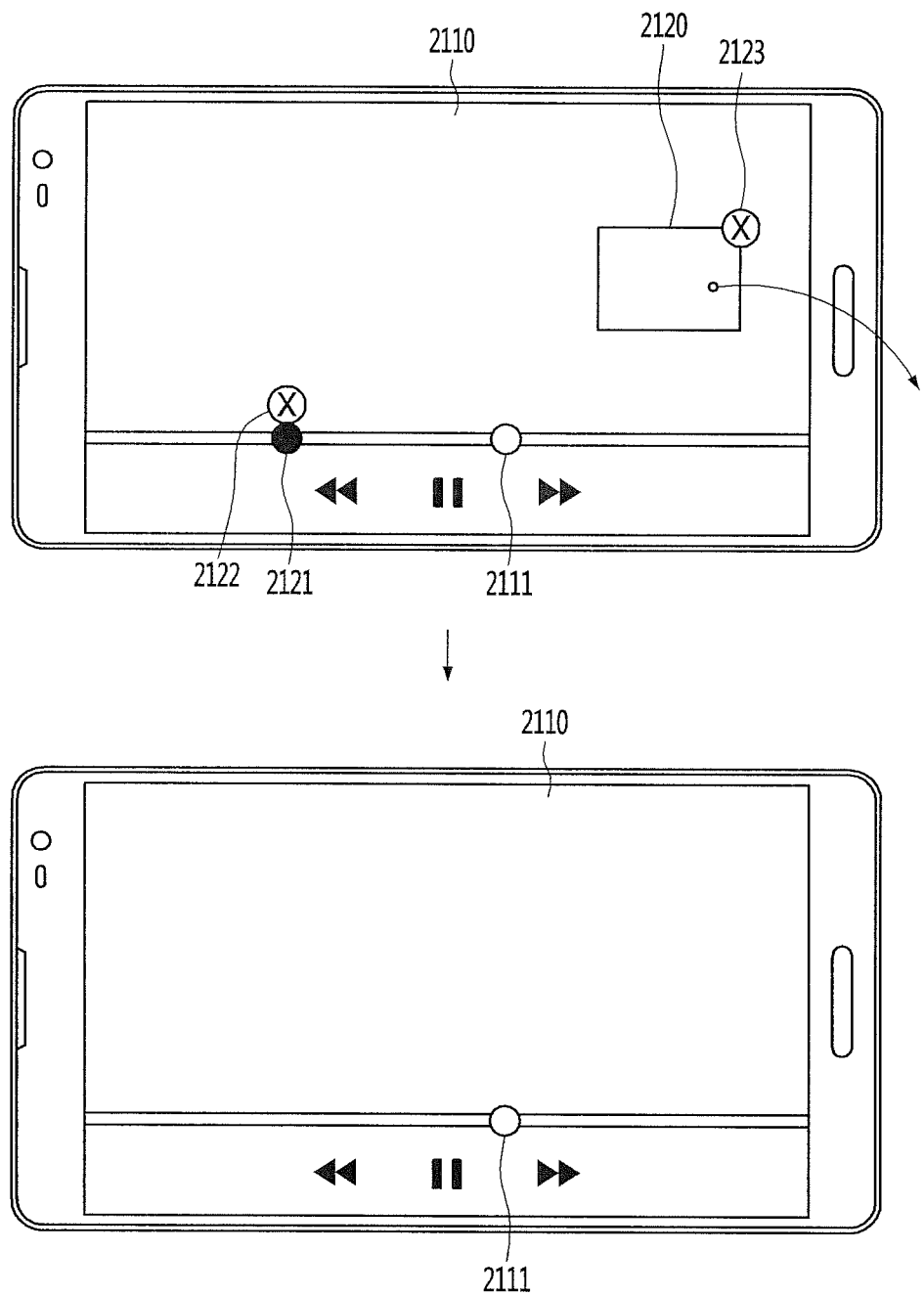

As shown in FIG. 21B, when an input signal for flicking the PIP screen 2120 and dragging to the right is detected, the mobile terminal 100 may end the PIP screen 2120. In this case, the PIP screen 2120 is removed from the main screen 2110, and the time point indicator 2121 corresponding to the PIP screen 2120, the end indicator 2122, and the end button 2123 disappear from the screen.

Figure 21C:
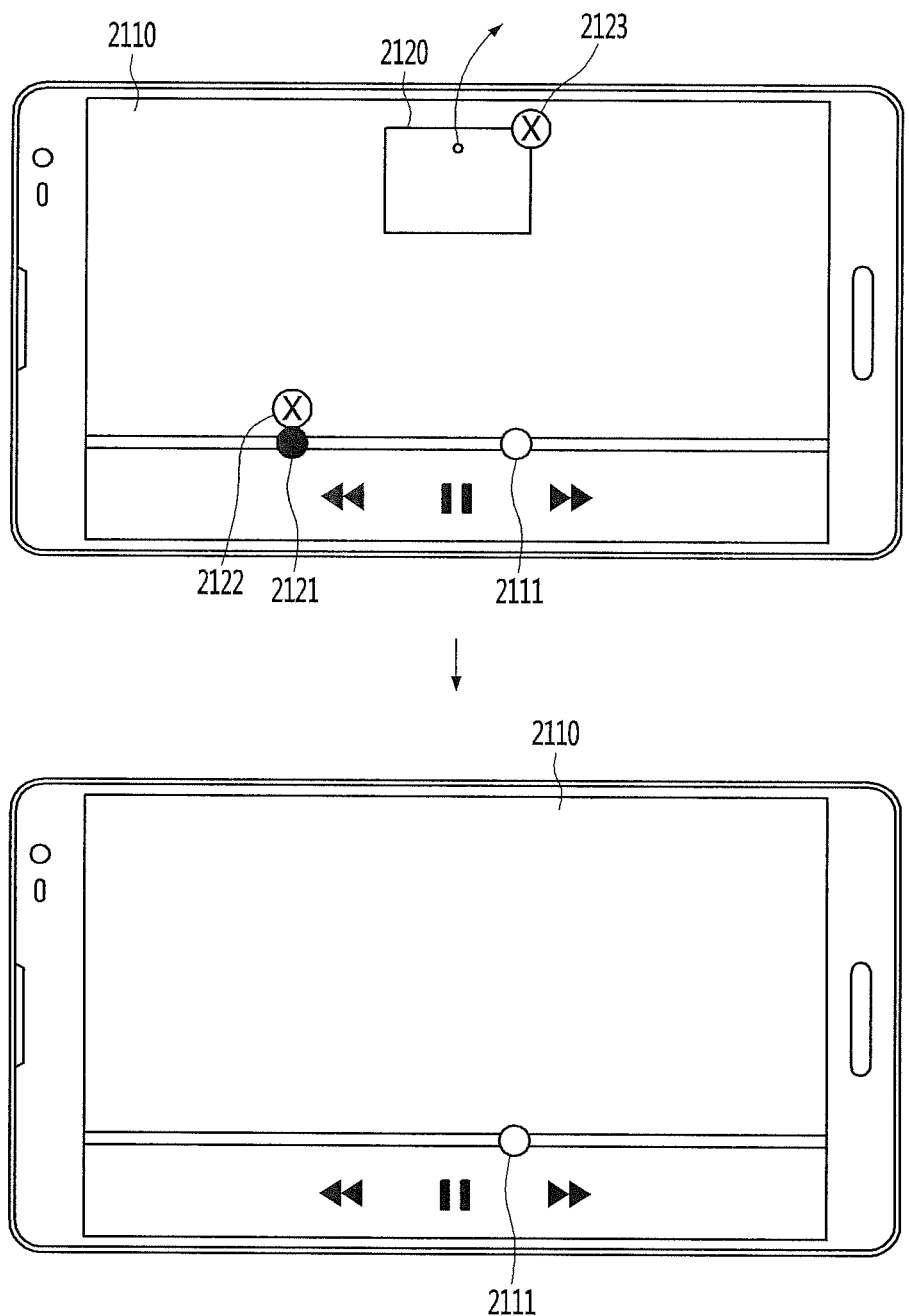

As shown in FIG. 21C, when an input signal for flicking the PIP screen 2120 and dragging to the top is detected, the mobile terminal 100 may end the PIP screen 2120. In this case, the PIP screen 2120 is removed from the main screen 2110, and the time point indicator 2121 corresponding to the PIP screen 2120, the end indicator 2122, and the end button 2123 disappear from the screen.

Figure 21D:
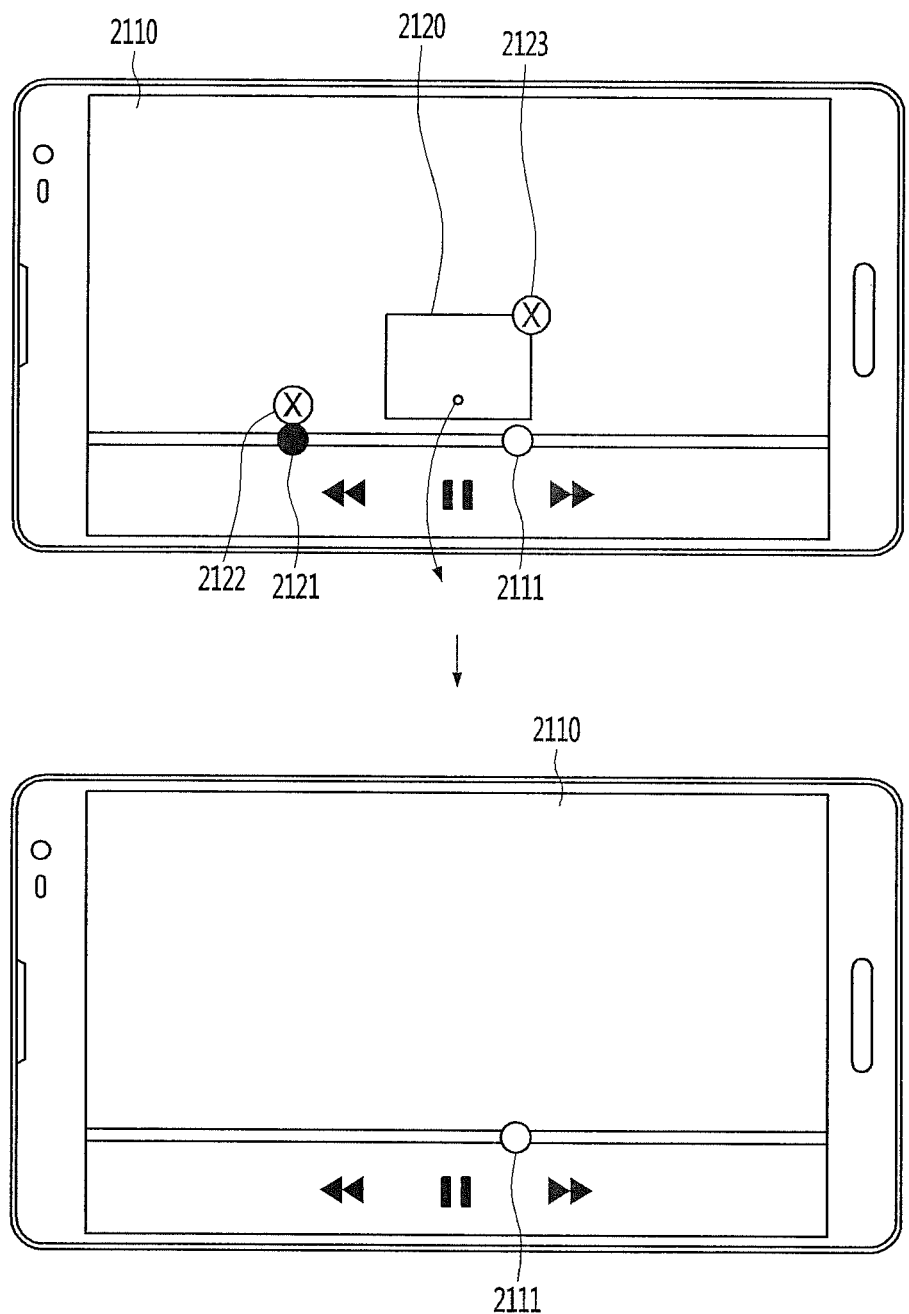

As shown in FIG. 21D, when an input signal for flicking the PIP screen 2120 and dragging to the bottom is detected, the mobile terminal 100 may end the PIP screen 2120. In this case, the PIP screen 2120 is removed from the main screen 2110, and the time point indicator 2121 corresponding to the PIP screen 2120, the end indicator 2122, and the end button 2123 disappear from the screen.

Switch to Playing Angle of Recommended Image

FIG. 22 is a view of switching to a playing angle of a recommended image during the playback of a 360-degree video by a mobile terminal according to an embodiment of the present invention.

When an input signal for selecting a recommended image is detected, a main screen may be switched to a playing angle of a recommended image and the recommended image may disappear from the main screen.

As shown in FIG. 22, a PIP screen 2220 is displayed on a main screen 2210. In this state, when an input signal for selecting the PIP screen 2220 is detected, the mobile terminal 100 switches an image of the main screen 2210 to an image played at a playing angle of the PIP screen 2220. In this case, the PIP screen 2220 may disappear from on the main screen 2210.

Figure 23:
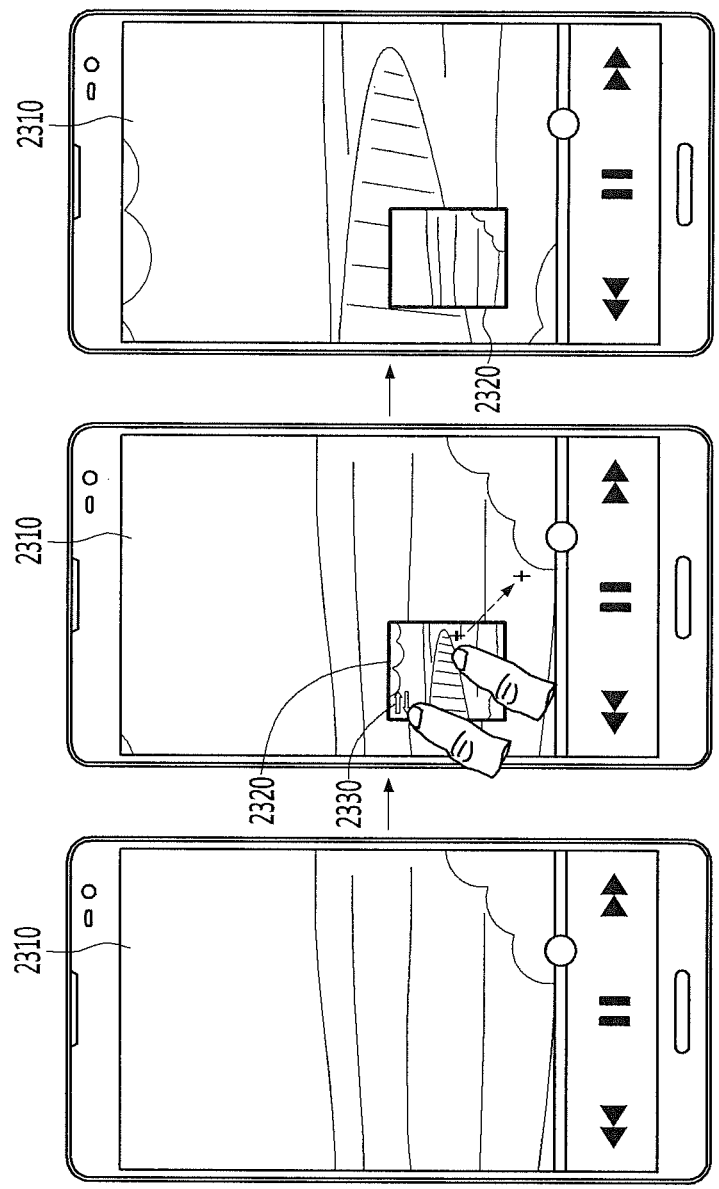
FIG. 23 is a view of switching to a recommended viewing angle during the playback of a 360-degree video by a mobile terminal according to an embodiment of the present invention.

FIG. 23 is a view of switching to a recommended viewing angle during the playback of a 360-degree video by a mobile terminal according to an embodiment of the present invention.

The playing angle of the main screen 2310 may be switched to a recommended viewing angle. In more detail, when the main screen 2310 is switched to a recommended image 2320, the main screen 2310 may be displayed at a recommended viewing angle. In this case, the main screen 2310 is changed into an image displayed at a recommended viewing angle and a PIP screen for an image displayed at the playing angle of the main screen 2310 may be displayed on the main screen 2310.

According to an embodiment, when an input signal for dragging the recommended image 2320 to the main screen 2310 or an input signal for dragging the image of the main screen 2310 to a recommended image 2320 is detected, the mobile terminal 100 may switch the image of the main screen 2310 and the recommended image 2320 each other and display them.

According to another embodiment, when a switch indicator 2330 is displayed on the recommended image 2320 and an input signal for selecting the switch indicator 2330 is detected, the mobile terminal 100 may switch the image of the main screen 2310 and the recommended image 2320 each other and display them. For this, the mobile terminal 100 may display the switch indicator 2330 on the recommended image 2320.

As shown in FIG. 23, the PIP screen 2320 is displayed on the main screen 2310. In this state, when an input signal for dragging the PIP screen 2320 to the main screen 2310 is detected or an input signal for selecting the switch indicator 2330 is detected, the mobile terminal 100 switches the main screen 2310 and the PIP screen 2320 each other. An image displayed on the PIP screen 2320 starts to be displayed on the main screen 2310, and an image displayed on the main screen 2310 starts to be displayed on the PIP screen 2320.

Providing Replay Function Relating to Recommended Image after Content End

Figure 24A:
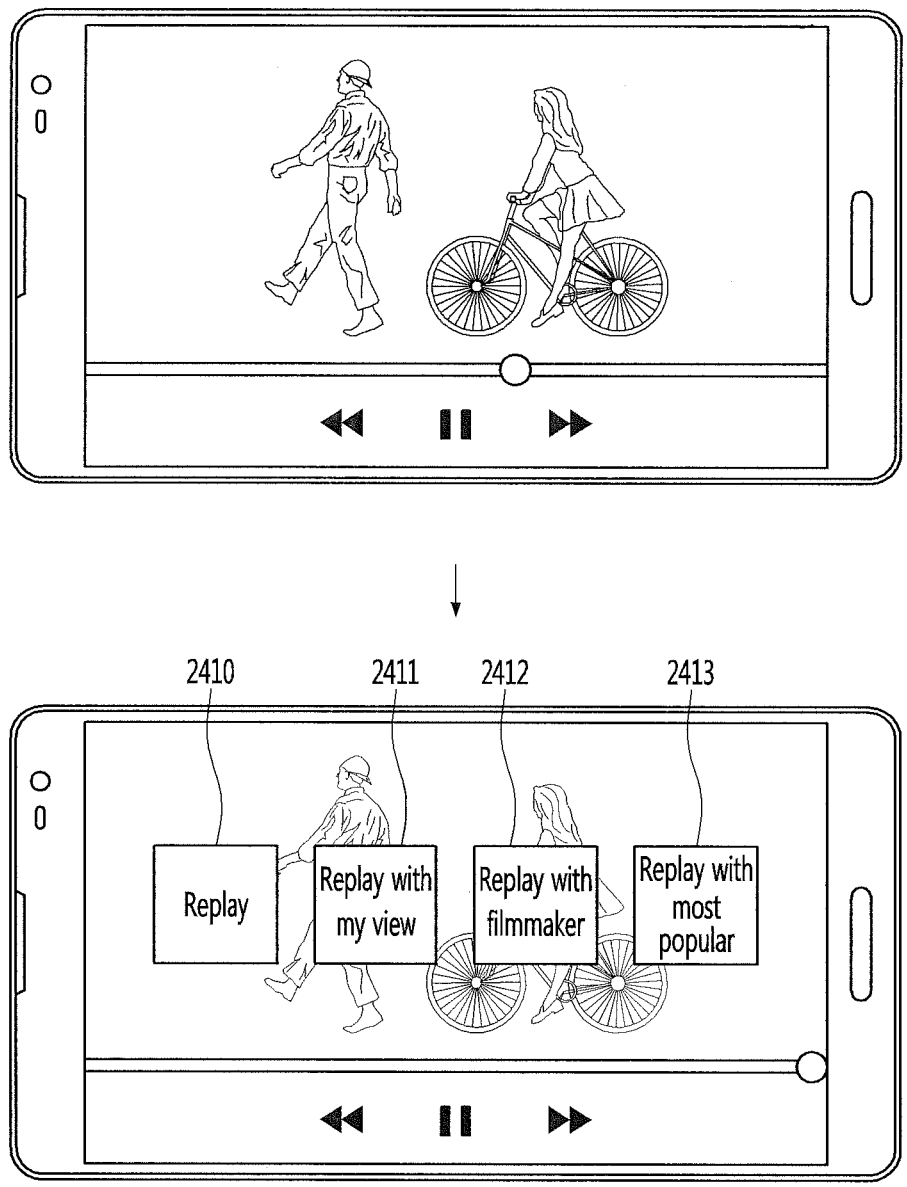

FIGS. 24A and 24B are views of providing a replay function relating to a recommended image after the playback of a 360-degree video ends by a mobile terminal according to an embodiment of the present invention.

After content ends, the mobile terminal 100 may automatically provide a replay function. In this case, the replay function may relate to a recommended image. The mobile terminal 100 provides an auto replay function so as to provide an option for selecting and viewing various kinds of images that are not selected by a user.

In more detail, the mobile terminal 100 may provide only an image at an optimized viewing angle intended by an original producer as replay, or provide only an image watched by a user as replay, or provide only an image that is the most watched by viewers as replay.

As shown in FIG. 24A, when content ends, a replay function is displayed automatically on a screen. In this case, the replay function may include a Replay function 2410, a Replay with my view function 2411, a Replay with filmmaker function 2412, and a Replay with most popular function 2413.

The Replay function 2410 is a general replay function.

The Replay with my view function 2411 stores a playing angle manipulated by a user and displays only an image displayed at a corresponding playing angle.

The Replay with filmmaker function 2412 displays only an image played at an optimized viewing angle intended by an original producer.

The Replay with most popular function 2413 displays only an image played at the most popular playing angle that are the most watched by viewers.

FIG. 24B illustrates a screen when an auto replay is executed.

When an auto replay is executed, a back button 2420 and a more view button 2430 are displayed on a screen. When an input signal for selecting the back button 2420 is detected, the mobile terminal 100 may end an auto replay function. Additionally, when an input signal for selecting the more view button 2430 is detected, the mobile terminal 100 may display an image together, which is played by another replay function instead of the selected replay function.

Referring to FIG. 24B, when an input signal for selecting the more view button 2430 is detected in a state that a replay image is displayed by the Replay with my view function 2411, the mobile terminal 100 may display an image displayed by the Replay with filmmaker function 2412 and the Replay with most popular function 2413 at the screen right together.

According to at least one of embodiments of the present invention, when a 360-degree video is played at an angle out of an optimized viewing angle, an screen of optimized viewing angle display may be effectively provided to a user.

Additionally, switching between an optimized viewing angle screen and a main screen may be performed easily.

Furthermore, according to at least one of embodiments of the present invention, an image played at a specific playing angle in a 360-degree video may be easily found.

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

What is claimed is:

1. A mobile terminal comprising:
a display unit;
a sensing unit configured to detect an input signal; and
a control unit configured to:
detect, through the sensing unit, a first input signal for playing a 360-degree video at a first playing angle;
based on detecting the first input signal for playing the 360-degree video at the first playing angle, control the display unit to display a first image of the 360-degree video at the first playing angle;
detect, through the sensing unit, a second input signal for changing a playing angle of the 360-degree video to a second playing angle different from the first playing angle;
based on detecting the second input signal for changing the playing angle of the 360-degree video to the second playing angle different from the first playing angle:
display, as a main display area on the display unit, a second image of the 360-degree video at the second playing angle, and
display, as a portion of the main display area on the display unit, the first image of the 360-degree video played at the first playing angle;
determine that the second playing angle is outside of a predetermined angular range from the first playing angle; and
based on a determination that the second playing angle is outside of the predetermined angular range from the first playing angle, display the first image of the 360-degree video played at the first playing angle as a picture-in-picture (PIP) display within the main display area.

2. The mobile terminal of claim 1, wherein the control unit is further configured to determine that the first playing angle has been designated as an optimized viewing angle by an original producer of the 360-degree video.

3. The mobile terminal of claim 2, wherein the control unit is further configured to determine that the first playing angle is within a predetermined angular range from the optimized viewing angle.

4. The mobile terminal of claim 1, wherein the control unit is further configured to:
based on the sensing unit detecting a fourth input signal for switching the display of the main display area and the display of the portion of the main display area with each other, control the display unit to switch the display of the second image played at the second playing angle as the main display area with the display of the first image played at the first playing angle displayed as the portion of the main display area with each other.

5. The mobile terminal of claim 1, wherein the control unit is further configured to:
based on a degree to which the second playing angle differs from the first playing angle, control the display unit to change a size of the portion of the main display area displayed on the display unit.

6. The mobile terminal of claim 1, wherein the first image played at the first playing angle that is displayed as the portion of the main display area is a still image at a first view point; and
   the control unit is further configured to:
      based on the sensing unit detecting the second input signal for changing the playing angle of the 360-degree video to the second playing angle different from the first playing angle, control the display unit to switch the display of the first image to a display of a third image displayed at a third playing angle different from the first playing angle of the first view point.

7. The mobile terminal of claim 1, wherein the first playing angle is a playing angle that comprises a view of a first content of the 360-degree video that satisfies a viewing frequency criterion for a duration of a playback time of the 360-degree video, and
   the control unit is further configured to:
      based on a determination that the first content has not been displayed on the display unit for more than a predetermined duration of time, control the display unit to display the first image played at the first playing angle as the portion of the main display area on the display unit.

8. The mobile terminal of claim 1, wherein the first playing angle is a playing angle that satisfies a viewer recommendation criterion, and
   the control unit is further configured to:
      based on a determination that the first playing angle has not been displayed on the display unit for more than a predetermined duration of time, control the display unit to display the first image played at the first playing angle as the portion of the main display area on the display unit.

9. The mobile terminal of claim 1, wherein the first image played at the first playing angle displayed on the portion of the main display area is a still image at a first time point, and
   the control unit is further configured to:
      display a progress bar representing a playback time of the main display area on the display unit; and
      based on a detection of an input signal for disposing the first image on the displayed progress bar, initiate a playback of the first image displayed as the portion of the main display area.

10. The mobile terminal of claim 9, wherein the control unit is further configured to:
   based on the detection of the input signal for disposing the first image on the displayed progress bar, display, on the displayed progress bar, a playback time point indicator corresponding to the first image.

11. The mobile terminal of claim 9, wherein the control unit is further configured to:
   based on a detection of an input signal for moving the first image out of the displayed progress bar, terminate the playback of the first image as the portion of the main display area.

12. The mobile terminal of claim 1, wherein the first playing angle is designated as an optimized viewing angle by an original producer of the 360-degree video, and
   the control unit is further configured to:
      based on a determination of a degree by which the second playing angle differs from the first playing angle, adjust a transparency of the portion of the main display area that displays the first image.

13. The mobile terminal of claim 1, wherein the control unit is further configured to:
   based on a determination that the display of the first image played at the first playing angle is moved on the display unit as the first playing angle changes to the second playing angle, display, as a thumbnail on the display unit, an image played at a side that is opposite of a direction in which the display of the first image moves on the display unit.

14. The mobile terminal of claim 1, wherein the control unit is further configured to:
   based on the sensing unit detecting a third input signal for selecting the portion of the main display area in which the first image is displayed, control the display unit to replace, as the main display area, the display of the second image played at the second playing angle with a display of the first image played at the first playing angle.

15. The mobile terminal of claim 14, wherein the control unit is further configured to:
   based on replacing the display of second image as the main display area with the display of the first image played at the first playing angle as the main display area, control the display unit to terminate the display of the first image as the portion of the main display area.

16. A method of operating a mobile terminal, the method comprising:
   detecting, via a sensing unit, a first input signal for playing a 360-degree video at a first playing angle;
   based on a detection of the first playing angle, displaying, via a control unit, a first image of the 360-degree video at the first playing angle;
   detecting, via the sensing unit, a second input signal for changing a playing angle of the 360-degree video to a second playing angle different from the first playing angle;
   based on a detection of the second input signal for changing the playing angle of the 360-degree video to the second playing angle, displaying, via the control unit, a second image of the 360-degree video at the second playing angle as a main display area on a display unit; and
   displaying, via the control unit, the first image of the 360-degree video played at the first playing angle as a portion of the main display area,
   wherein displaying the first image of the 360-degree video played at the first playing angle as the portion of the main display area comprises:
      determining that the second playing angle is outside of a predetermined angular range from the first playing angle; and
      based on a determination that the second playing angle is outside of the predetermined angular range from the first playing angle, displaying the first image of the 360-degree video played at the first playing angle as a picture-in-picture (PIP) display within the main display area.

17. The method of claim 16, wherein the first playing angle is designated as an optimized viewing angle by an original producer of the 360-degree video.

18. The method of claim 16, further comprising:
   based on a detection of an input signal for selecting the portion of the main display area, replacing, as the main display area, the display of the second image played at the second playing angle with a display of the first image played at the first playing angle.

* * * * *